United States Patent
Yang et al.

(10) Patent No.: US 10,203,933 B2
(45) Date of Patent: Feb. 12, 2019

(54) CONTEXT-BASED COMMAND SURFACING

(71) Applicant: Microsoft Technology Licensing, LLC, Redmond, WA (US)

(72) Inventors: Chenguang Yang, Redmond, WA (US); Annie Y. Bai, Seattle, WA (US); Julie C. Seto, Duvall, WA (US); James R. Fullmer, Redmond, WA (US); Julianne M. Emmons, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 317 days.

(21) Appl. No.: 14/826,935

(22) Filed: Aug. 14, 2015

(65) Prior Publication Data

US 2016/0132342 A1 May 12, 2016

Related U.S. Application Data

(63) Continuation-in-part of application No. 14/826,968, filed on Aug. 14, 2015, which is a continuation-in-part of application No. 14/814,038, filed on Jul. 30, 2015, now Pat. No. 9,922,098, which is a continuation-in-part of application No.
(Continued)

(51) Int. Cl.
*G06F 3/00* (2006.01)
*G06F 3/16* (2006.01)
*G06F 3/0488* (2013.01)
*G06F 17/28* (2006.01)
*G06F 17/27* (2006.01)
*G10L 15/22* (2006.01)
*G06F 9/451* (2018.01)

(52) U.S. Cl.
CPC .......... *G06F 3/167* (2013.01); *G06F 3/04883* (2013.01); *G06F 9/453* (2018.02); *G06F 17/2785* (2013.01); *G06F 17/28* (2013.01); *G10L 15/22* (2013.01); *G10L 2015/223* (2013.01); *G10L 2015/228* (2013.01)

(58) Field of Classification Search
CPC .................................................. G06F 3/04883
USPC ....................................................... 715/708
See application file for complete search history.

(56) References Cited

U.S. PATENT DOCUMENTS 5,875,429 A   2/1999   Douglas
6,377,913 B1  4/2002   Coffman et al.
(Continued)

FOREIGN PATENT DOCUMENTS

AU   2013205590 A1   5/2013
CN   102792320 A     11/2012
(Continued)

OTHER PUBLICATIONS

Second Written Opinion for International Patent Application No. PCT/US2015/059358, dated Sep. 19, 2016, date of filing: Nov. 6, 2015, 6 pages.
(Continued)

*Primary Examiner* — William D Titcomb
(74) *Attorney, Agent, or Firm* — Christopher J. Volkmann; Kelly, Holt & Christenson, PLLC

(57) ABSTRACT

A computing device receives a trigger to surface commands. A possible set of commands is identified and broken into categories. A category is surfaced for user interaction.

20 Claims, 60 Drawing Sheets

Related U.S. Application Data

14/700,319, filed on Apr. 30, 2015, now Pat. No. 9,646,611.

(60) Provisional application No. 62/085,852, filed on Dec. 1, 2014, provisional application No. 62/076,281, filed on Nov. 6, 2014.

(56) References Cited

U.S. PATENT DOCUMENTS

| | | | |
|---|---|---|---|
| 6,581,033 | B1 | 6/2003 | Reynar et al. |
| 7,233,792 | B2 | 6/2007 | Chang |
| 7,260,588 | B2 | 8/2007 | Werner |
| 7,447,989 | B2 | 11/2008 | Rousselle et al. |
| 7,672,512 | B2 * | 3/2010 | Cohen .................... G06F 3/002 345/173 |
| 7,760,191 | B2 * | 7/2010 | Cohen .................... G06F 3/002 345/156 |
| 8,055,713 | B2 | 11/2011 | Simske et al. |
| 8,069,186 | B2 | 11/2011 | Farnham et al. |
| 8,102,383 | B2 * | 1/2012 | Cohen ................ G06F 3/04883 345/179 |
| 8,219,027 | B2 | 7/2012 | Appleby et al. |
| 8,229,734 | B2 | 7/2012 | Bennett |
| 8,266,148 | B2 | 9/2012 | Guha et al. |
| 8,365,080 | B2 | 1/2013 | Karlson |
| 8,375,320 | B2 | 2/2013 | Kotler et al. |
| 8,452,451 | B1 | 5/2013 | Francis, Jr. et al. |
| 8,537,003 | B2 | 9/2013 | Khachaturov et al. |
| 8,543,407 | B1 | 9/2013 | Gagnon et al. |
| 8,676,589 | B2 | 3/2014 | Agarwal et al. |
| 8,706,505 | B1 | 4/2014 | Bringert et al. |
| 8,766,793 | B2 | 7/2014 | Elumalai et al. |
| 8,812,316 | B1 | 8/2014 | Chen |
| 8,818,981 | B2 | 8/2014 | Aftab et al. |
| 8,887,062 | B2 | 11/2014 | Rajagopal |
| 8,903,858 | B2 | 12/2014 | Ramaswamy |
| 9,646,611 | B2 | 5/2017 | Vogel et al. |
| 9,922,098 | B2 | 3/2018 | Vogel et al. |
| 2003/0210275 | A1 | 11/2003 | Draschwandtner et al. |
| 2004/0268260 | A1 | 12/2004 | Rockey et al. |
| 2005/0108354 | A1 | 5/2005 | Lisitsa et al. |
| 2006/0001650 | A1 | 1/2006 | Robbins et al. |
| 2009/0013250 | A1 | 1/2009 | Hsieh et al. |
| 2010/0004005 | A1 | 1/2010 | Pereira et al. |
| 2010/0134844 | A1 | 6/2010 | Ito |
| 2010/0217604 | A1 | 8/2010 | Baldwin et al. |
| 2010/0312547 | A1 | 12/2010 | Van os et al. |
| 2012/0016678 | A1 | 1/2012 | Gruber et al. |
| 2012/0022909 | A1 | 1/2012 | Ayatollahi et al. |
| 2012/0150863 | A1 | 6/2012 | Fish et al. |
| 2013/0019174 | A1 | 1/2013 | Gil et al. |
| 2013/0024453 | A1 | 1/2013 | Duke |
| 2013/0110520 | A1 | 5/2013 | Cheyer et al. |
| 2013/0145024 | A1 | 6/2013 | Cao et al. |
| 2013/0346068 | A1 | 12/2013 | Salem et al. |
| 2014/0026055 | A1 | 1/2014 | Cohn et al. |
| 2014/0088970 | A1 | 3/2014 | Kang |
| 2014/0180697 | A1 | 6/2014 | Torok et al. |
| 2014/0201763 | A1 | 7/2014 | Kosonovsky |
| 2014/0215340 | A1 | 7/2014 | Shetty et al. |
| 2014/0223273 | A1 | 8/2014 | Chung |
| 2014/0272821 | A1 | 9/2014 | Pitschel et al. |
| 2014/0297284 | A1 | 10/2014 | Gruber et al. |
| 2014/0365209 | A1 | 12/2014 | Evermann |
| 2014/0370841 | A1 | 12/2014 | Roberts et al. |
| 2015/0089354 | A1 | 3/2015 | Abrahami et al. |
| 2015/0149428 | A1 | 5/2015 | Smith |
| 2016/0070342 | A1 | 3/2016 | Taylor et al. |
| 2016/0132291 | A1 | 5/2016 | Bai et al. |
| 2016/0132568 | A1 | 5/2016 | Vogel et al. |
| 2016/0133254 | A1 | 5/2016 | Vogel et al. |
| 2018/0239803 | A1 | 8/2018 | Vogel et al. |

FOREIGN PATENT DOCUMENTS

| | | |
|---|---|---|
| WO | 2014055181 A1 | 4/2014 |
| WO | 2014083389 A1 | 6/2014 |

OTHER PUBLICATIONS

Second Written Opinion for International Patent Application No. PCT/US2015/059355, dated Sep. 12, 2016, date of filing: Nov. 6, 2015, 5 pages.

Non-Final Office Action for U.S. Appl. No. 14/700,319, dated Sep. 29, 2016, 6 pages.

International Search Report and Written Opinion for International Patent Application No. PCT/US2015/059355, dated Jan. 21, 2016, date of filing: Nov. 6, 2015, 12 pages.

Hearst, Marti A., "Natural Search User Interfaces", Communications of the ACM, vol. 54, No. 11, Nov. 2011, 8 pages.

Smith, Josh, "41 Siri Tips, Tricks and Hidden Features", Published on: Aug. 3, 2014; Available at http://www.gottabemobile.com/2014/03108/41-hidden-siri-features/.

Haddock, Nick, "Search and Information Retrieval", Published on : Aug. 8, 2009 Available at http://www.nickhaddock.com/projects.html.

Lancet, Yaara, "OK, Google: 20+ Useful Things You Can Say to Your Android Phone", Published on: Nov. 15, 2013 Available at: http://www.makeuseof.com/tag/ok-google-20-useful-things-you-can-say-to-your-android-phone/.

Ugerleidner, Neal, "The Race to Be the Ultimate Siri Killer", Published on: Aug. 6, 2014 Available at: http://www.fastcolabs.com/3034067/the-race-to-be-the-ultimate-siri-killer.

Warren, Tom, "The story of Cortana, Microsoft's Siri killer", Published on: Apr. 2, 2014, Available at: http://www.theverge.com/2014/4/2/5570866/cortana-windows-phone-8-1-digital-assistant.

U.S. Appl. No. 62/076,281, Vogel, et al., "Context-Based Control System", filed Nov. 6, 2014.

"Dual Writer", Published on: Sep. 18, 2014 Available at: http://www.dualwriter.com/dictation.html.

Jiang, et al., "Automatic Online Evaluation of Intelligent Assistants", In Proceedings of 24th International World Wide Web Conference, May 18, 2015, 11 pages.

Newman, Jared, "Office Web Apps Cuts through Clutter with a New Look and Helpful Feature-Finder Tool", Published on: Jan. 23, 2014 Available at: http://www.pcworld.com/article/209052/office-web-apps-cuts-through-clutter-with-a-new-look-and-helpful-fearture-finder-tool.html.

U.S. Appl. No. 62/086,852, Seto, et al., "Context-based Actions for People, Mail, Calendar by Voice, Text", filed Dec. 1, 2014.

International Search Report and Written Opinion for International Patent Application No. PCT/US2015/059358, dated Feb. 4, 2016, date of filing: Nov. 6, 2015, 11 pages.

Rhodes, B J et al.:"Just-In-Time Information Retrieval Agents", IBM Systems Journal, IBM Corp., Armonk, New York, US, vol. 39. No. 3/04, Jan. 1, 2000, 20 pages.

Schmidt, A: "Interactive Context-Aware Systems Interacting with Ambient Intelligence", Internet Citation, Jan. 1, 2005, 20 pages. Retrieved from the Internet URL:http://www.neurovr.org/emerging/book5/09_AMI_Schmidt.pdf Retrieved on: Feb. 1, 2012.

Amendment for U.S. Appl. No. 14/700,319 dated Nov. 30, 2016, 11 pages.

International Preliminary Report an Patentability for International Patent Application No. PCT/US2015/059358, dated Dec. 19, 2016, date of filing: Nov. 6, 2015, 7 pages.

International Preliminary Report on Patentability for International Patent Application No. PCT/US2015/059366, dated Nov. 21, 2016, date of filing: Nov. 6, 2015, 9 pages.

Prosecution History for U.S. Appl. No. 14/700,319 including: Issue Notification dated Apr. 19 2017 and Notice of Allowance dated Jan. 9, 2017, 9 pages.

"Google Docs 1.3.352.11 by Google LLC", Retrieved From <<https://www.apkmirror.com/?post_type=app_release&searchtype=apk&page=9&s=google+docs>>, Release Date: Oct. 2, 2014, 10 Pages.

(56) References Cited

OTHER PUBLICATIONS

"Non-Final Office Action Issued in U.S. Appl. No. 14/814,038", dated Sep. 8, 2017, 10 Pages.
"Notice of Allowance Issued in U.S. Appl. No. 14/814,038", dated Nov. 21, 2017, 7 Pages.
"Non-Final Office Action Issued in U.S. Appl. No. 14/826,968", dated Dec. 14, 2017, 12 Pages.
"Remind me, Cortana", Retrieved From: https://web.archive.org/web/20160313020456/www.windowsphone.com/en-US/how-to/wp8/cortana/remind-me-cortana, Aug. 11, 2014, 3 Pages.
"Final Office Action Issued in U.S. Appl. No. 14/826,968", dated Jul. 12, 2018, 11 Pages.
"Non Final Office Action Issued in U.S. Appl. No. 15/925,287", dated Jul. 9, 2018, 12 Pages.
"Office Action Issued in European Patent Application No. 15795307.6", dated Jun. 5, 2018, 6 Pages.
Devale, et al., "Time and Location Based Reminder System", In Proceedings of National Level Paper Presentation Excelsior, Jan. 2009, 7 Pages.
Devanbu, et al., "LaSSIE: A Knowledge-Based Software Information System", In Proceedings of 12th International Conference on Software Engineering, Mar. 26, 1990, pp. 249-261.
Little, et al., "Translating Keyword Commands Into Executable Code", In Proceedings of 19th Annual ACM Symposium on User Interface Software and Technology, Oct. 15, 2006, pp. 135-144.
"Summon to Attend Oral hearing Issued in European Patent Application No. 15795307.6", Mailed Date: Oct. 23, 2018, 8 Pages.

\* cited by examiner

Scroll, scroll, scroll

Predictive UI appears

"I want to format all my pictures."

Single tap

Single tap

CONTEXT-BASED COMMAND SURFACING

CROSS-REFERENCE TO RELATED APPLICATION

The present application is based on and claims the benefit of U.S. patent application Ser. No. 14/700,319, filed Apr. 30, 2015, and claims the benefit of U.S. provisional patent application Ser. No. 62/076,281, filed Nov. 6, 2014, and claims the benefit of U.S. provisional patent application Ser. No. 62/085,852, filed Dec. 1, 2014, the content of which is hereby incorporated by reference in its entirety.

BACKGROUND

Computer systems are in wide use. Some such computer systems are deployed on devices that include desktop computers, laptop computers, tablet computers, smart phones, smart phones with large screens (e.g., phablets) and a variety of other mobile devices and other computing devices.

It is not uncommon for a user to operate multiple different computing devices. For instance, a user may have a desktop computer at work and another computer (such as a laptop computer) at home. The user may also have a mobile device (such as a smartphone) that the user uses for both work and personal use. The user may have other devices that are used for both professional and personal work as well.

In addition, there are many different locations where a user may generate and store relevant content. For instance, the user may generate and store content local to a device (such as on a smartphone, a laptop computer, a desktop computer, etc.). In a client/server environment, the user may generate and store information on the server. The user may also operate in environments where there are multiple different servers, and the user may generate and store information on any or all of those servers. Similarly, the user may use one or more cloud-based services, such as cloud-based storage, or other cloud-based services. If so, the user may generate and store content on the cloud as well.

In order to locate relevant content, a user is often found browsing through many different files in order to locate the particular document or file that they wish to locate. Similarly, where a user is in a meeting and wishes to share a document with others in the meeting, this normally entails the user locating the document himself, or herself, identifying all the different individuals in the meeting, identifying the electronic mail aliases for all of those individuals, composing an electronic mail message with all of the above information, then attaching the document and sending it to those individuals.

These current processes for locating and interacting with content are cumbersome and time consuming. In addition, especially with relatively small screen devices such as smartphones, they can be error prone.

The discussion above is merely provided for general background information and is not intended to be used as an aid in determining the scope of the claimed subject matter.

SUMMARY

A computing device receives a trigger to surface commands. A possible set of commands is identified and broken into categories. A category is surfaced for user interaction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 3B-1 is a flow diagram showing a more specific example of how relevant items of content are identified.

FIG. 5-1 is a flow diagram of a more detailed example of how commands can be surfaced within an application.

DETAILED DESCRIPTION

Figure 1A:
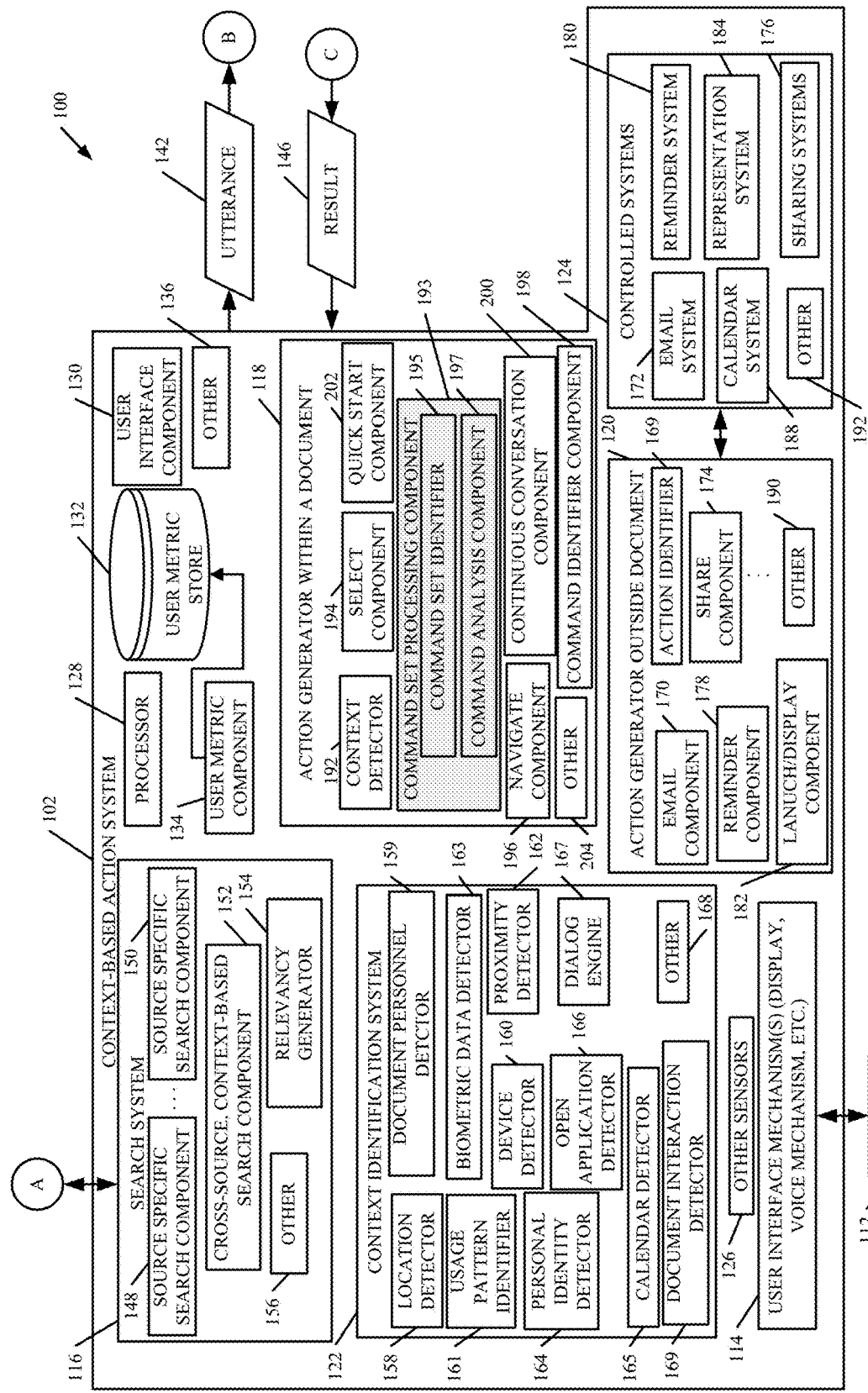
FIGS. 1A and 1B (collectively referred to herein as FIG. 1) show a block diagram of one example of a context-based command architecture.
Figure 1B:
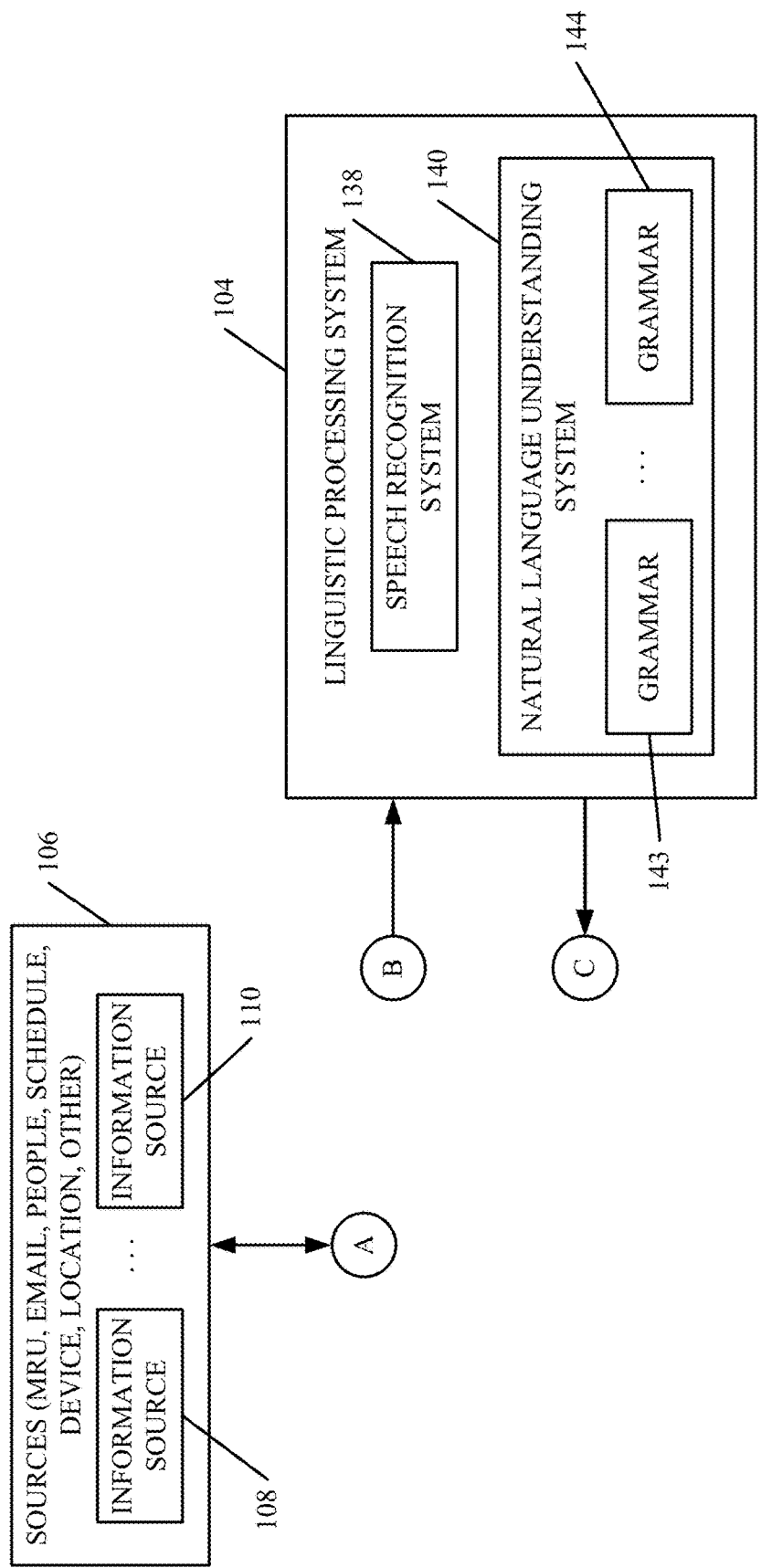

FIGS. 1A and 1B (collectively referred to herein as FIG. 1) show a block diagram of one example of a context-based command architecture 100. Architecture 100 illustratively includes a context-based action system 102 that interacts with a linguistic processing system 104 and a set of sources 106 that illustratively include a plurality of different information sources 108-110. Information sources 108-110 can, themselves, be sources of information such as a store of most recently used documents, electronic mail messages, contacts or people, schedule information (such as calendar information), documents or other information in a collaboration or presentation system, device information, location information, and a wide variety of other information.

Figure 3A:
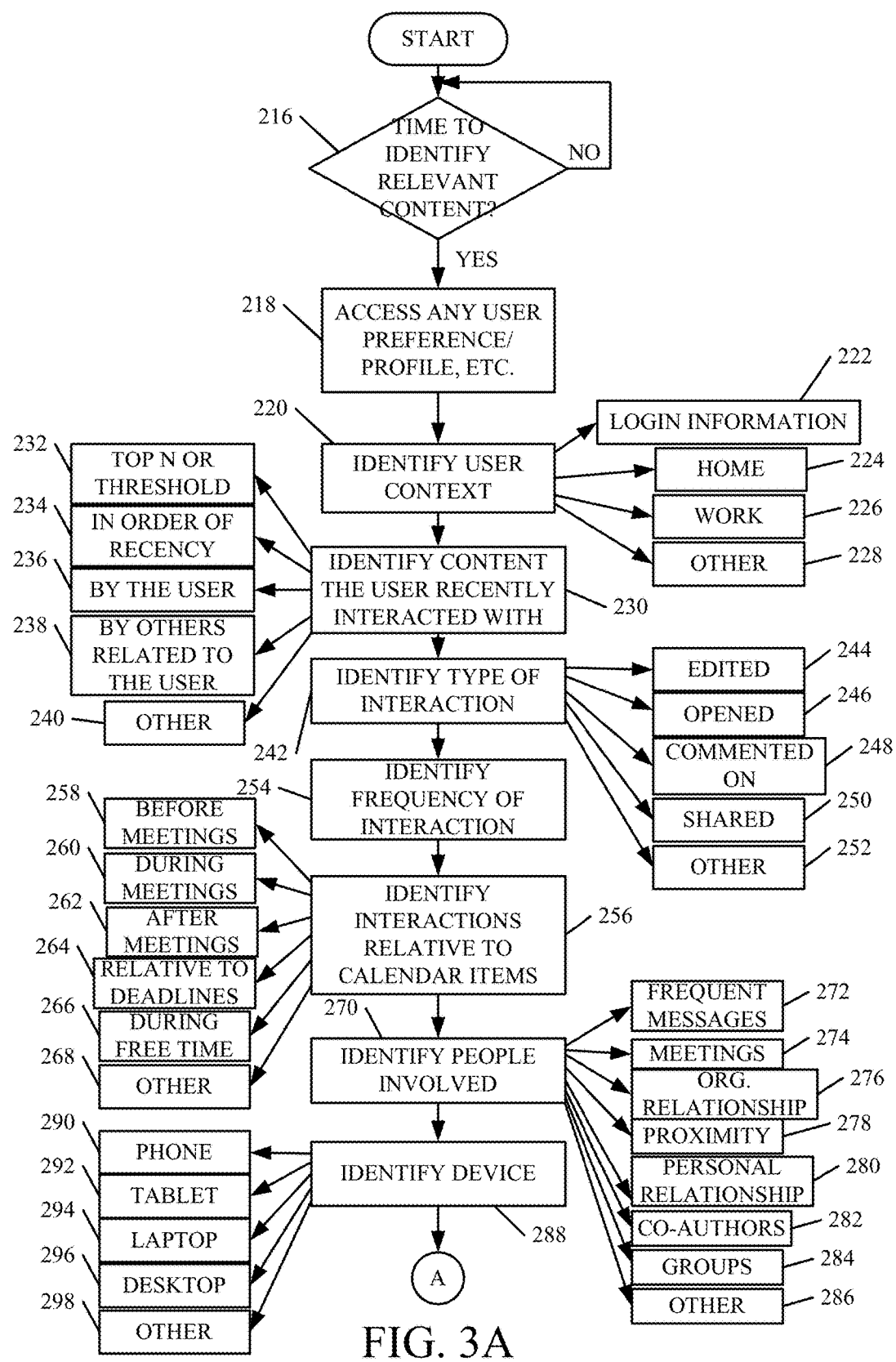
FIGS. 3A-3B (collectively referred to herein as FIG. 3) show a flow diagram illustrating one example of the operation of the architecture shown in FIG. 1 in identifying relevant content based on context information.
Figure 3B:
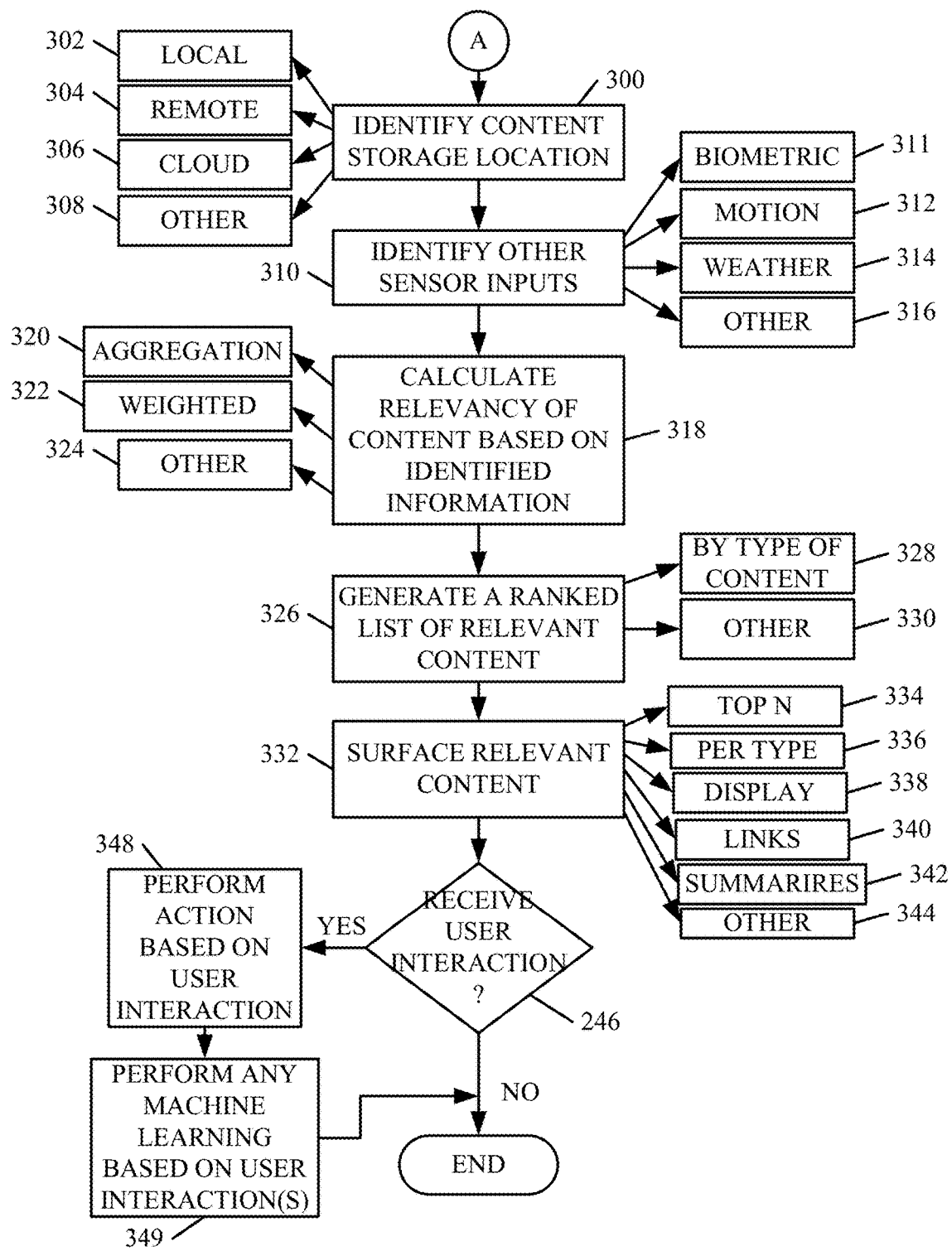
Figures 1, 3B:
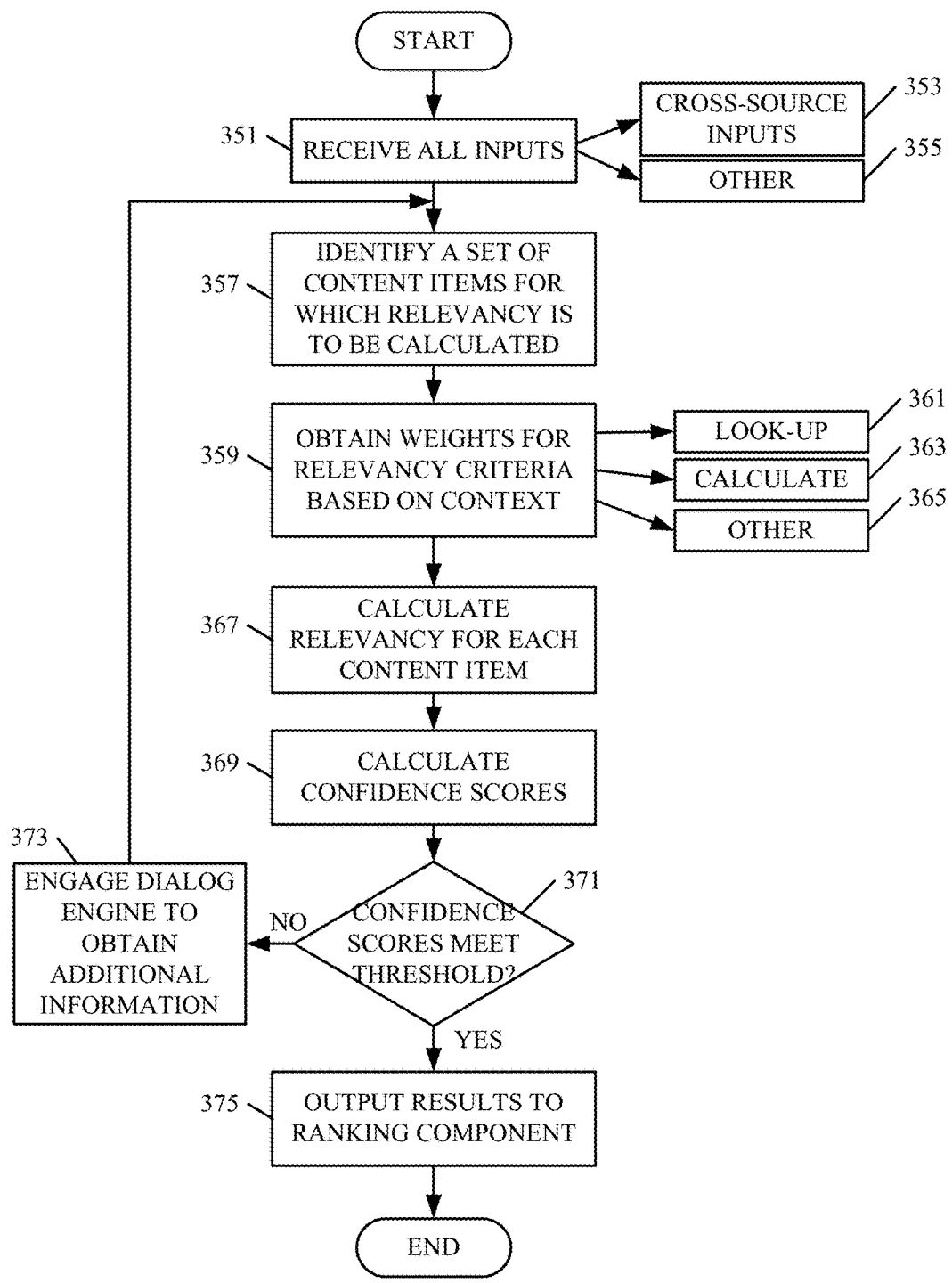

It will be noted that all of the items shown in FIG. 1 can be located on a single device or they can be distributed among a variety of different devices or locations. A number of different examples of this are described below with respect to FIGS. 7-9. In the example shown in FIG. 1, context-based action system 102 illustratively receives commands input by user 112 and interprets them in view of a variety of different contextual information. It can then generate a display, such as user interface mechanisms 114, for interaction by user 112. User 112 illustratively interacts with user interface mechanisms 114 in order to control and manipulate system 102. In one example, mechanisms 114 can include user interface display mechanisms, voice mechanisms that are actuated by voice inputs, buttons, keypads, etc., or a wide variety of other mechanisms.

In the example shown in FIG. 1, system 102 illustratively includes search system 116, that searches for information in sources 108-110, action generator 118 that generates actions when the user is already inside of a document, action generator 120 that generates actions when the user is not interacting within a document, context identification system 122, controlled systems 124, a variety of other sensors 126, processor 128, user interface component 130, user metric store 132, user metric component 134, and it can include other items 136 as well.

In the example of architecture 100 shown in FIG. 1, linguistic processing system 104 illustratively includes speech recognition system 138 and natural language understanding system 140. Of course, it is also contemplated that either or both of these systems 138, 140 can be part of context-based action system 104 as well, and they are shown separately for the sake of example only.

Speech recognition system 138 can be any of a wide variety of different types of speech recognition systems that take a speech input (such as utterance 142 that may be generated by a microphone in response to user 112 speaking into the microphone) and generates a contextual representation of the utterance 142. For instance, system 138 can operate using acoustic models and language models in a Hidden Markov process. It can also operate using neural network-based recognition, or other types of recognition.

Natural language understanding system 140 illustratively receives the textual representation of utterance 142 and generates an interpretation of it. In one example, system 140 includes a plurality of different grammars 143-144 which have rules that are activated based upon the particular words identified in utterance 142. Natural language understanding system 140 generates the interpretation by identifying an intent and various arguments within utterance 142. The intent can be a command desired by user 112 or another type of action or task that user 112 is seeking to perform. The arguments include descriptor information that can identify the particular content on which the action is to be performed. Linguistic processing system 104 illustratively returns the textual representation, the intent and the arguments identified from utterance 142 as linguistic processing result 146. The result is described in greater detail below with respect to FIG. 2.

Before describing the overall operation of architecture 100 in more detail, a brief description of some of the items in architecture 100, and their corresponding operation, will first be provided. Search system 116 illustratively includes a plurality of different source-specific search components 148-150. In one example, each component 148-150 is configured to search a specific information source 108-110. For instance, where information source 108 is a source of word processing documents, then search component 148 may be configured to search word processing documents in source 108. Where information source 110 is an e-mail system that contains e-mail messages and recipients, etc., then search component 150 may be configured to search the source of information 110 that comprises the e-mail system. Where a source 108-110 is a calendar or contacts directory, a corresponding search component 148-150 can be used. Sources 106 can be local to system 102, or remote therefrom (such as in the cloud). They can be personal or work-related sources, etc.

In another example, cross-source context-based search component 152 can, either on its own, or by controlling components 148-150, identify (based on the intent and arguments in the result returned by system 104) a plurality of different information sources 108-110 that are to be searched for relevant content, and can search those sources 108-110 (or control the corresponding components 148-150 to search them) to generate a set of cross-source, search results. Relevancy generator 154 illustratively obtains a wide variety of different contextual information and generates a relevancy score for each of the items of content returned by search system 116. The relevancy score can be used to generate a ranked list of content (or links to that content) among other things. Search system 116 can include other items 156 as well.

Context identification system 122 illustratively includes a plurality of different context detectors that each detect a different type of contextual information. For instance, location detector 158 can illustratively be a positioning system (such as a GPS sensor or other location identifying system) that generates an output indicative of a current location of the device that includes context-based action system 102 (and being used by the user). Document personnel detector 159 can detect different people who are related to documents and the nature of the relationship. Device detector 160 obtains contextual information about the device upon which it is located (or that user 112 is using), such as whether it is a mobile device, desktop computer, etc. Usage pattern identifier 161 identifies different patterns of use that the user engages in with respect to different documents. Proximity detector 162 detects a proximity of the device (e.g., the device carried by user 112) to other items, such as other individuals, the user's work location, the user's home location, etc. Biometric data detector 163 can detect any of a wide variety of different types of biometric data (such as heart rate, respiration, blood alcohol level, temperature, etc.). Personal identity detector 164 illustratively detects the personal identity of user 112 (assuming that the user has opted in or otherwise assented to this type of detection). Calendar detector 165 can detect a current time of day, week, month, fiscal period, year, etc. It can also illustratively identify past, current or future items on the user's calendar. This may include for instance, when the user was in a meeting, the attendees at the meeting, documents presented at the meeting, etc. This information can be provided to relevancy generator 154 or it can be separately generated. Open application detector 166 detects information, such as what applications are currently (or were recently) open on the device being used by user 112, or other devices used by the user. Dialog engine 167 can be used to obtain additional information from the user through a suitable dialog. Document interaction detector 169 detects different interactions with various documents. Context identification system 122 can include a wide variety of other detectors 168 that detect a wide variety of other context information as well.

Action generator 120 illustratively includes an action identifier 169 that identifies actions to take based on the context information and based on the intent and arguments. Action generator 120 also includes a set of components that can perform the actions, either by themselves or using controlled systems 124, based upon the context information, intent and arguments expressed by user 112 in result 146. For instance, the utterance 142 may be "send the current specification to the attendees of the meeting I am in". In that case, the intent expressed in utterance 142 will include a number of steps, such as to identify the "current spec", attach it to an e-mail, (or attaching or otherwise including a link to the document), address the e-mail to the attendees of the "current meeting" that user 112 is in, perhaps adjusting recipient access control rights or permissions, and then send that e-mail to the attendees. Thus, action generator 120 includes items such as e-mail component 170 that can control e-mail system 172 in controlled systems 124. Share component 174 can illustratively perform actions to share content on various sharing systems 176 in controlled systems 124. For instance, it may be that share component 174 posts an item of content to another user's social network site or work network site, shares it with a work group on a collaboration site, or posts it to a blog, etc. Action generator 120 can also include such items as reminder component 178 that controls a reminder system 180 in controlled systems 124. For instance, it may be that utterance 142 indicates that user 112 wishes to be sent a reminder under certain circumstances. In that case, the intent will be to send a reminder and the arguments will identify the particular circumstances under which the reminder is to be sent. Reminder component 178 thus determines this and performs actions using reminder system 180 to send the desired reminder. Launch/display component 182 can control presentation system 184 or a wide variety of other applications so that it can launch desired applications and generate one or more desired displays, based upon the intent received in result 146. The various components in generator 120 can also control such things as calendar system 188. For instance, the items in action generator 120 can insert an appointment for user 112 or send a meeting request to other meeting invitees on calendar system 188. In addition, where the attendees of a meeting are to be known (such as where user 112 wishes to send an e-mail to all the attendees of a meeting), items in action generator 120 can interact with calendar system 188 to identify the attendees or invitees at the given meeting or to identify other information (such as presentations presented at a given meeting, etc.) and use that information in performing actions. Of course, action generator 120 can include a wide variety of other components 190 that control a wide variety of other controlled systems 192, in order to perform desired actions.

Action generator 118 illustratively includes a set of components and detectors that can detect a context within an already-opened document and perform actions, or suggest actions, based upon the context information and based upon various user inputs. For instance, context detector 192 can detect the context of the document that is open. Where the document is a word processing document, it can detect the particular page that is currently being displayed. It may also detect a wide variety of other metadata, such as the different sections in the document, the different authors or commenters on the document, the various revision dates for the document, document formatting, access control permissions, etc. Command set processing component 193 can include command set identifier 195 (that identifies a set of available commands, given the context of the application) and command analysis component 197 (that organizes and classifies the commands in the set for user interaction). Select component 194 controls interactions by user 112 that indicate that the user wishes to select various items in the open document. Navigation component 196 controls navigation interactions with the document. Command identifier component 198 identifies a subset of commands that have corresponding user input mechanisms that are displayed to the user so the user can quickly execute any of the subset of commands. Continuous conversation component 200 illustratively processes various results 146 or other inputs from user 112, within the context of previous commands that were already identified. Quick start component 202 controls the application that is displaying the document during startup or initial authoring of a document. Of course, action generator 118 can include a wide variety of other items 204 that can be used to perform a wide variety of other actions as well.

Figure 2:
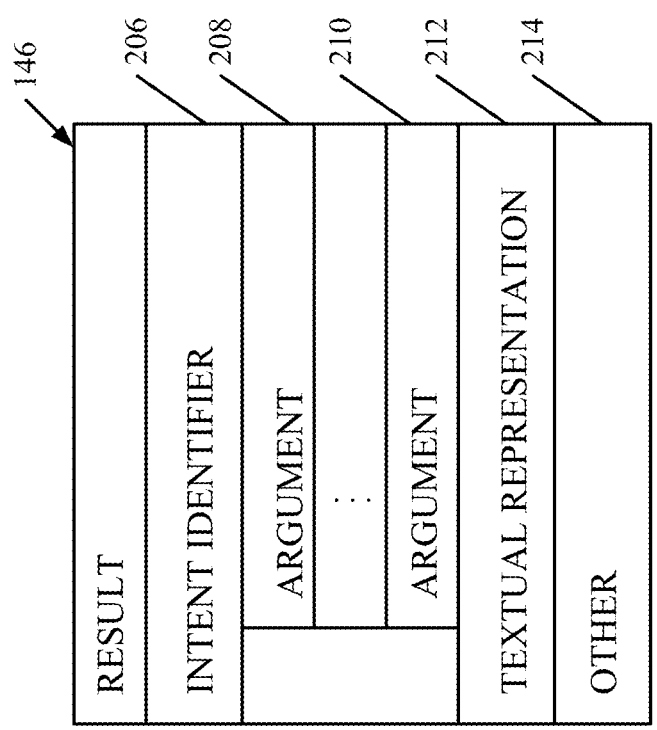
FIG. 2 is a block diagram of one example of a speech processing result.

FIG. 2 shows a block diagram of one example of a processing result 146 generated by linguistic processing system 104. It can be seen that result 146 illustratively includes an intent identifier 206 that identifies the intent found in utterance 142. It also includes a set of arguments 208-210 that were recognized in utterance 142. In addition, result 146 can include the textual representation 212 generated from utterance 142 by speech recognition system 138. It can of course include other items 214 as well.

FIGS. 3A and 3B (collectively referred to herein as FIG. 3) illustrate one example of the operation of system 102 (and relevancy generator 154) in identifying items of content from sources 106 and displaying them for user 112. The relevancy of content can be determined at any desired time, such as when the user first opens or launches system 102, or in response to any desired trigger, such as when the user requests that system 102 refresh the relevancy of the documents being displayed, or automatically based on changes in context information, for example. The triggers can also change based on context. For instance, if a person is working in an office, then it may be the person's proximity to another worker that is a trigger. However, if a person is working remotely, then it may be the person's calendar events that are triggers. These are examples only.

System 102 thus first determines that it is time to determine which relevant content is to be surfaced for the user. This is indicated by block 216. When it is time to identify relevant content, relevancy generator 154 can access any user preferences or profile information that may be used in the relevancy calculation. This is indicated by block 218. For instance, it may be that the user prefers certain content to be shown first, or otherwise. It also accesses context identification system 122 and identifies user context. This is indicated by block 220. For instance, personal identity detector 164 can provide the personal identity of user 112 based on login information 222 (again, assuming that the user has assented to this). Location detector 158 and device detector 160 can be used to determine whether user 112 is at home 224 or at work 226, or elsewhere, and what device(s) the user is using. For instance, the user may access a workout log each time he or she is at the gym. Even though the document may not have been accessed in 24 hours, the system senses the user's physical presence at the gym and uses this in the relevance calculation.

Other user context information 228 (such as usage patterns, etc.) can be identified as well. Relevancy generator 154 can use usage pattern detector 169 to identify temporal or other usage patterns. For instance, it may be close to tax time. The user's previous tax returns may not therefore be surfaced as relevant based on recency or other information alone. However, detector 169 recognizes a pattern in that each year, at this time, the user accesses old tax returns. This pattern can be used in the relevancy calculation. This is only one example.

Relevancy generator 154 can also use document interaction detector 169 to identify the items of content that the user has recently interacted with. This is indicated by block 230. For instance, it may be that one of the information sources 106 is a list of the most recently used documents or items of content. Relevancy generator 154 can thus identify the items from that source. It can identify the top n (or a threshold number) of items of content, as indicated by block 232. It can identify the items of content in order of recency as indicated by block 234. It can identify items of content that were most frequently accessed by the user as indicated by block 236 or by other individuals that are related to the user, as indicated by block 238. For instance, the documents can have metadata that defines who accessed documents and when they were accessed. Where the user is accessing information from work, and the user belongs to one or more work groups, or where the user is on one or more teams, or has a supervisor, that information can all be obtained from the various information sources 108-110. Relevancy generator 154 can then identify the various most recently accessed (or most frequently accessed) documents by those other users as well. This is one example only, and the items of content that were most recently interacted with can be identified in other ways as well, and this is indicated by block 240.

Relevancy generator 154 can also use document interaction detector 169 to identify the type of interaction. This is indicated by block 242. For instance, it may be that some types of interaction are deemed more important than others. Thus, generator 154 can identify where the interaction was to edit the item of content 244, to simply open it 246, to comment on it 248, to share it 250 or whether the interaction was another type of interaction 252.

Generator 154 can also identify the frequency of the different types of interaction by user 112 or the other users. This is indicated by block 254.

In addition, generator 154 can user calendar detector 165 to identify what the interactions were, relative to calendar items. This is indicated by block 256. For instance, if the user always accessed a certain item of content in a given recurring meeting, and that meeting is about to occur again, then relevancy generator 154 may determine that particular item of content is particularly relevant at this time. Thus, generator 154 can determine whether the items of content were interacted with before meetings 258, during meetings 260, after meetings 262, relative to various deadlines (such as immediately before certain types of deadlines) 264, during the user's free time 266, or relative to other calendar items 268.

Generator 154 can also use document personnel detector 159 to identify the various people involved with user 112, as indicated by block 270. For instance, identification system 122 can identify the various individuals that user 112 frequently messages. This is indicated by block 272. It can identify the various individuals that user 112 is frequently in meetings with as indicated by block 274. It can identify individuals that are closely related to user 112 on an organization relationship chart. This is indicated by block 276. It can identify other users that are in close physical proximity to user 112, as indicated by block 278. It can identify various people that are personally related to user 112 (such as from social network sites in sources 106, etc.) as indicated by block 280. It can identify individuals that user 112 was a co-author with, as indicated by block 282. It can identify the various work groups or social groups or other groups 284 that the user is a member of, and it can identify other people in other ways as well, and this is indicated by block 286.

Further, it can identify the nature of the interactions among people. For instance, if a user simply passes another user in a hallway, that can be detected as an insignificant interaction. However, if the two are in a same location for an extended period, or exchange information, etc., that can be detected as well.

Generator 154 can use device detector 160 to identify the particular device that user 112 is currently using. This is indicated by block 288. For instance, it can determine whether the user is using a phone 290, a tablet 292, a laptop computer 294, a desktop computer 296, or another type of device 298. It can also determine or detect patterns on device usage. For example work documents might be more relevant on a desktop computer because that is where the user normally accesses them. There may be other documents (like a gas mileage tracker spreadsheet) that are more relevant on a phone because they are mostly used on the phone.

In evaluating the relevancy of various items of content, generator 154 can use the various search components 148-152 to identify the content storage location where the items of content are stored. This is indicated by block 300. For instance, they may be stored locally on a local data store as indicated by block 302. They might be stored on a server or otherwise remotely as indicated by block 304. They may be stored on a particular cloud service 306, or in other locations 308.

Generator 154 can also use other sensors 126 to identify other sensor inputs 310. For instance, other sensors 126 can include biometric sensors. If a user's heartrate is high, this can indicate the user is working out, so the user's workout log may be relevant. If the user's body temperature is high for an extended period, and the user has recently been to an area where certain sicknesses are common, this may indicate the user is running a fever, so medical data on certain sicknesses may be relevant. Biometric data is indicated by block 311. Where the other sensors 126 include an accelerometer, generator 154 can determine whether user 112 is currently in motion. This is indicated by block 312. It can also determine the weather where user 112 is located as indicated by block 314, or it can include a wide variety of other sensor inputs 316.

Relevancy generator 154 then calculates the relevancy of the various items of content that have been identified, based upon all of the information that has been obtained. This is indicated by block 318. For instance, each item of contextual or other information that is obtained relative to an item of content can be assigned a value. The relevancy calculation may be simply aggregating all of those values. This is indicated by block 320.

It may also be that different items of information are deemed to be more or less important than others. Therefore, the items of information can be weighted based upon their importance, as indicated by block 322. The weighting may change dynamically based on the context information as well. For instance, if the user is at work, then the weights may be set in one way. If the user is at home, the weights may be set differently. This is but one example. There are a wide variety of other types of calculations that can be performed based upon the relevancy and contextual information that was obtained. This is indicated by block 324.

Relevancy generator 154 can then generate a ranked list of relevant content. This is indicated by block 326. There can also be multiple different types of lists for each different type of content. This is indicated by block 328. For instance, it may be that a certain type of content is a "presentation" in a presentation system (such as a slide presentation system).

Thus, the most relevant slide presentations to the user (given the various contextual information) may be ranked in order of relevancy and surfaced for the user in one section of a display. However, it may be that other types of content include electronic mail messages or spreadsheet documents. Those items of content may be ranked based on their relevance and the ranked list for mail messages and the ranked list for spreadsheets can each be surfaced for the user in another, separately scrollable, portion of the user interface display. These are examples only, and the ranked list of relevant content can be generated in other ways as well, and this is indicated by block 330.

Generator 154 then uses user interface component 130 to surface the relevant content. This is indicated by block 332. For instance, it can surface the top N items of content as indicated by block 334. It can surface relevant content and divide it out on the display device based on content type. This is indicated by block 336. It can display the content itself as indicated by block 338 or links (e.g., hyperlinks) to the content as indicated by block 340. It can also employ summarization components to generate summaries of the relevant content and display those summaries. This is indicated by block 342. It can surface the relevant content in other ways as well, and this is indicated by block 344.

System 102 can then receive user interaction with the items of content. This is indicated by block 346. It then performs actions based on the user interactions. This is indicated by block 348, and a number of examples of user interactions are described in greater detail below. System 102 can also perform machine learning, as indicated by block 349. For instance, if the user clicks on an item of content in the surfaced list, the system can use this information to increase or decrease weights in the relevancy calculation. Similarly, if the user does not click on a highly ranked document, but instead begins scrolling through the surfaced list, this can also be used to adjust weights in the relevancy calculation.

FIG. 3B-1 is a flow diagram that illustrates one way of identifying relevant content, in more detail. It corresponds to block 318 in FIG. 3B. Relevancy generator 154 receives all the inputs from the various context sensors and the other context inputs, as described above. This is indicated by block 351. As noted above, the inputs can be from a variety of sources and the sources can be located in a variety of different places. They can be local sources, cloud-based sources, work sources, personal sources, etc. The cross-source inputs are indicated by block 353. They can be other inputs 355 from other sources as well.

Search system 116 then identifies a set of content for which relevancy is to be calculated. This is indicated by block 357. This can be done in various ways, depending on a trigger that has triggered the system to surface relevant content. For instance, if the user has input a search query, then the system 116 will identify matching search results, based on the query. If the system is automatically triggered, then the search can be performed based on the automated trigger. These are examples only.

Relevancy generator 154 then obtains a set of weights for a set of relevancy criteria. This is indicated by block 359. In one example, the particular criteria used will vary with context. In another example, the criteria remain unchanged, but their weights vary with context. In yet another example, the weights and criteria can vary.

The weights can be obtained in various ways as well. They weights can be fixed, or they can vary. They can be obtained by doing a look-up in a look-up table that has weight values indexed against certain context information or otherwise. This is indicated by block 361. In another example, the weights can be dynamically calculated based on the context information. This is indicated by block 363. They can be obtained in other ways as well, as indicated by block 365.

Relevancy generator 154 then calculates the relevancy of the items identified at block 357, using the weighted relevancy criteria. This is indicated by block 367. In one example, each relevancy value also has a confidence value associated with it. The confidence value can reflect how confident generator 154 is in the relevancy score just calculated. The confidence score can be calculated in a wide variety of different ways, and is indicated by block 369.

In one example, if the confidence score does not meet a threshold value, then the system can obtain additional information, in order to increase the confidence in returning relevant documents. For instance, the system can engage dialog engine 167 (in FIG. 1) to ask the user for additional information to increase the confidence scores. This is indicated by block 373. As an example, of the user is looking for a document, the dialog engine might ask the user "Where did you last work on the document?" or "Is it a word processing document?" etc. These are only examples of dialogs that can be used and a wide variety of others can be used, depending on context and triggers, as well.

If, at block 371, the confidence scores meet a given threshold, then there is no need for additional information. Instead, the results (documents, associated relevancy scores and confidence scores) can be output for ranking. This is indicated by block 375.

Figure 3C:
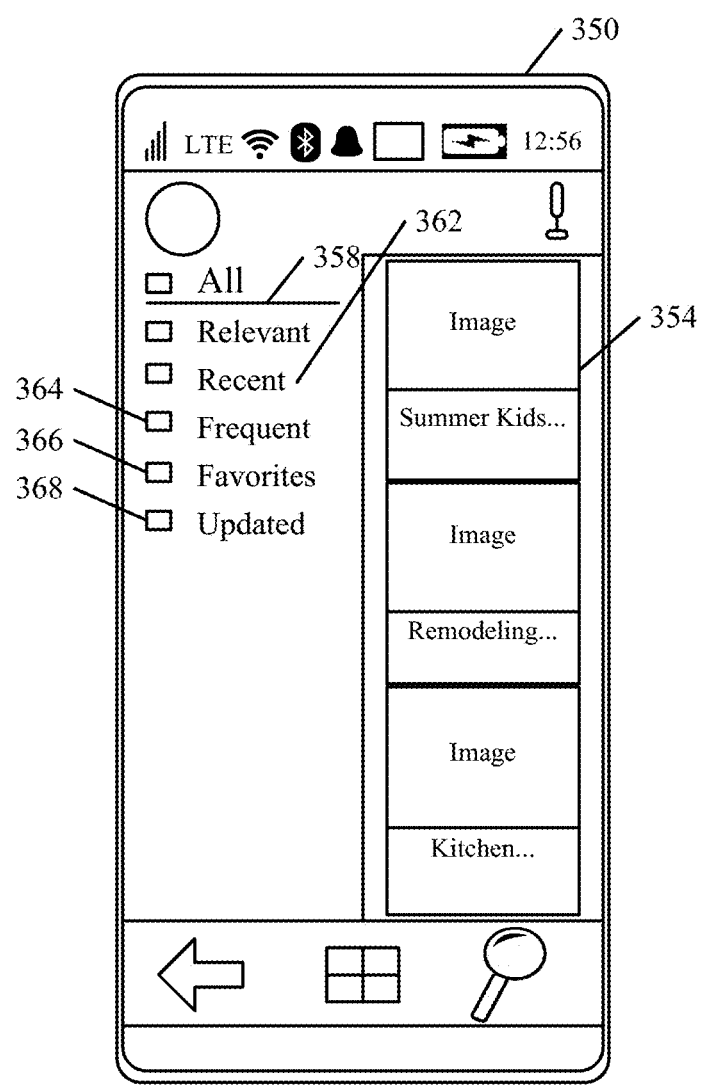
FIGS. 3C-3H show examples of user interface displays.
Figure 3D:
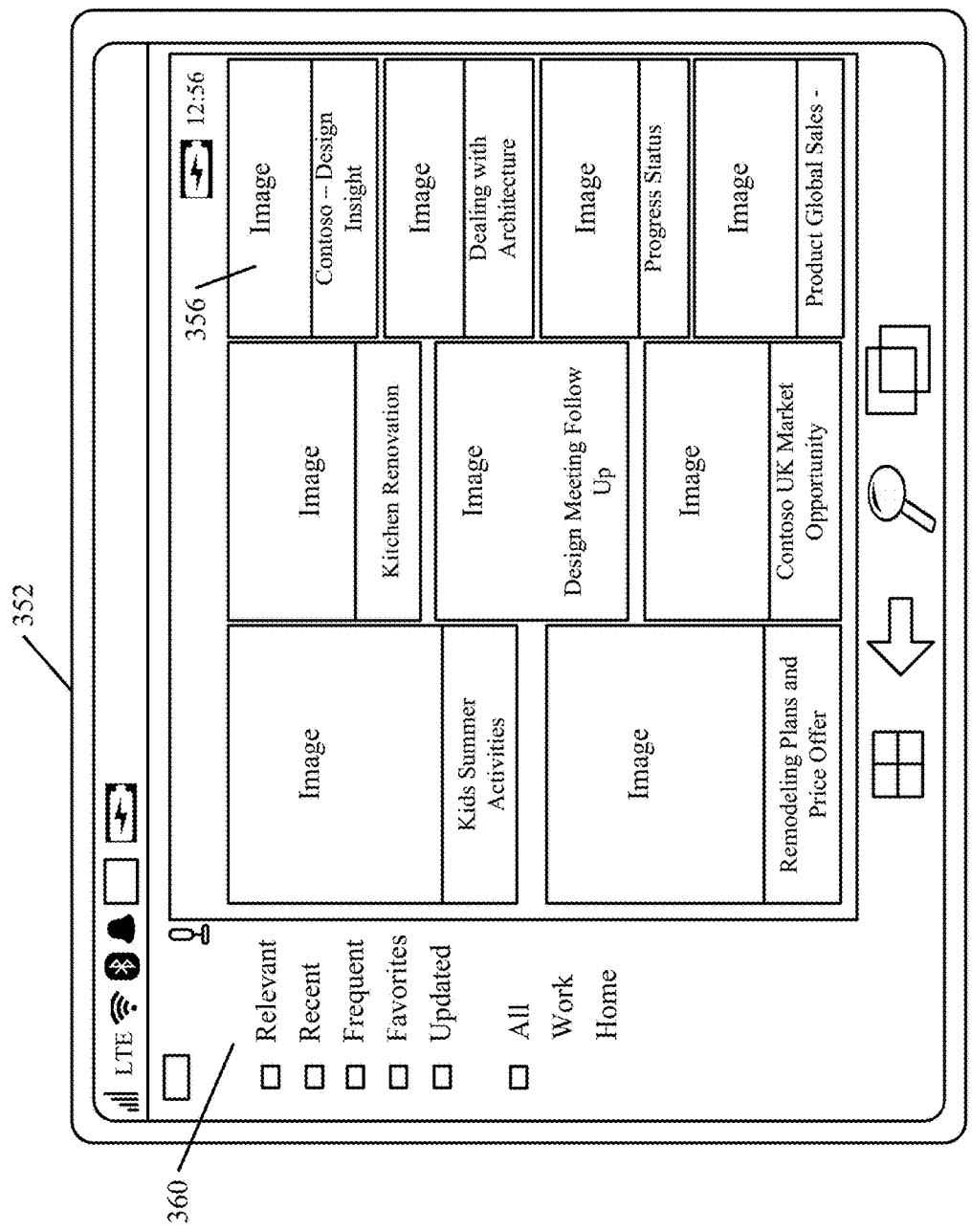

Before describing examples of user interactions, a number of examples of user interface displays will be described. FIGS. 3C and 3D show examples of how user interface displays may look on a phone 350 (or other mobile device) and on a tablet computer 352 (or laptop computer). It can be seen that each of the displays illustratively include a content display section 354 and 356, respectively, that either displays content or links to content that has been deemed relevant.

The displays also include a filter section 358 and 360 that have a set of user selectable filter mechanisms that can be actuated to filter the displayed content. For instance, the currently displayed content is filtered as being "relevant". However, the user can also actuate the "recent" user input mechanism 362 to filter the displayed content based on how recently it was accessed. The user can actuate the "frequent" user input mechanism 364 to filter the displayed content based on how frequently it is interacted with. The user can actuate the "favorites" user input mechanism 366 to filter the displayed content based upon what the user has deemed a favorite, and the user can actuate the "updated" user input mechanism 368 to update the relevant content.

Figure 3E:
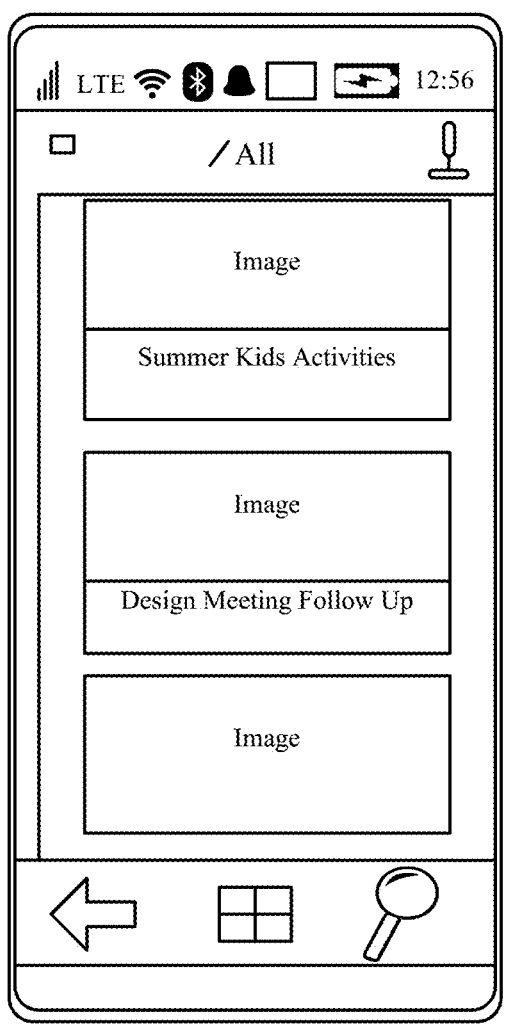
Figure 3F:
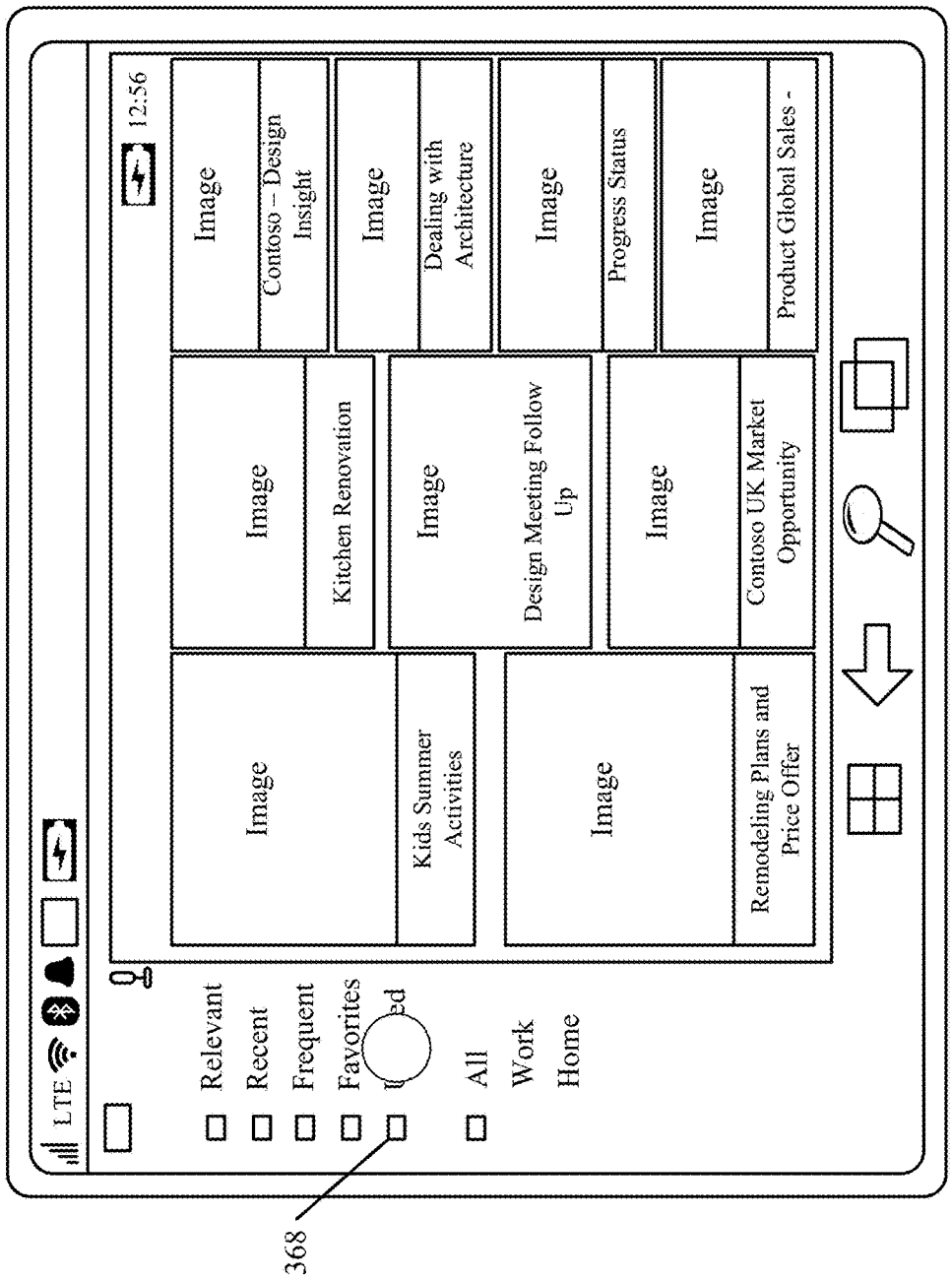
Figure 3G:
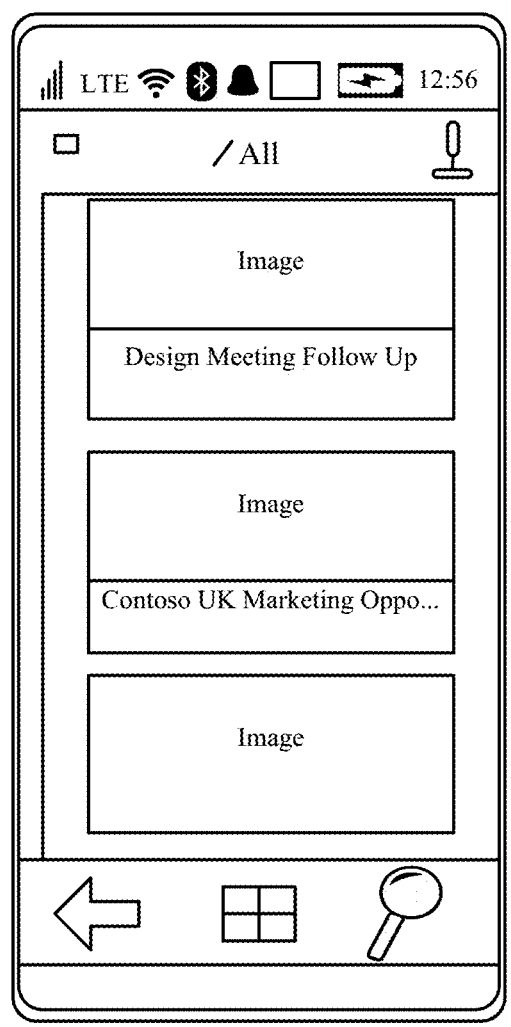
Figure 3H:
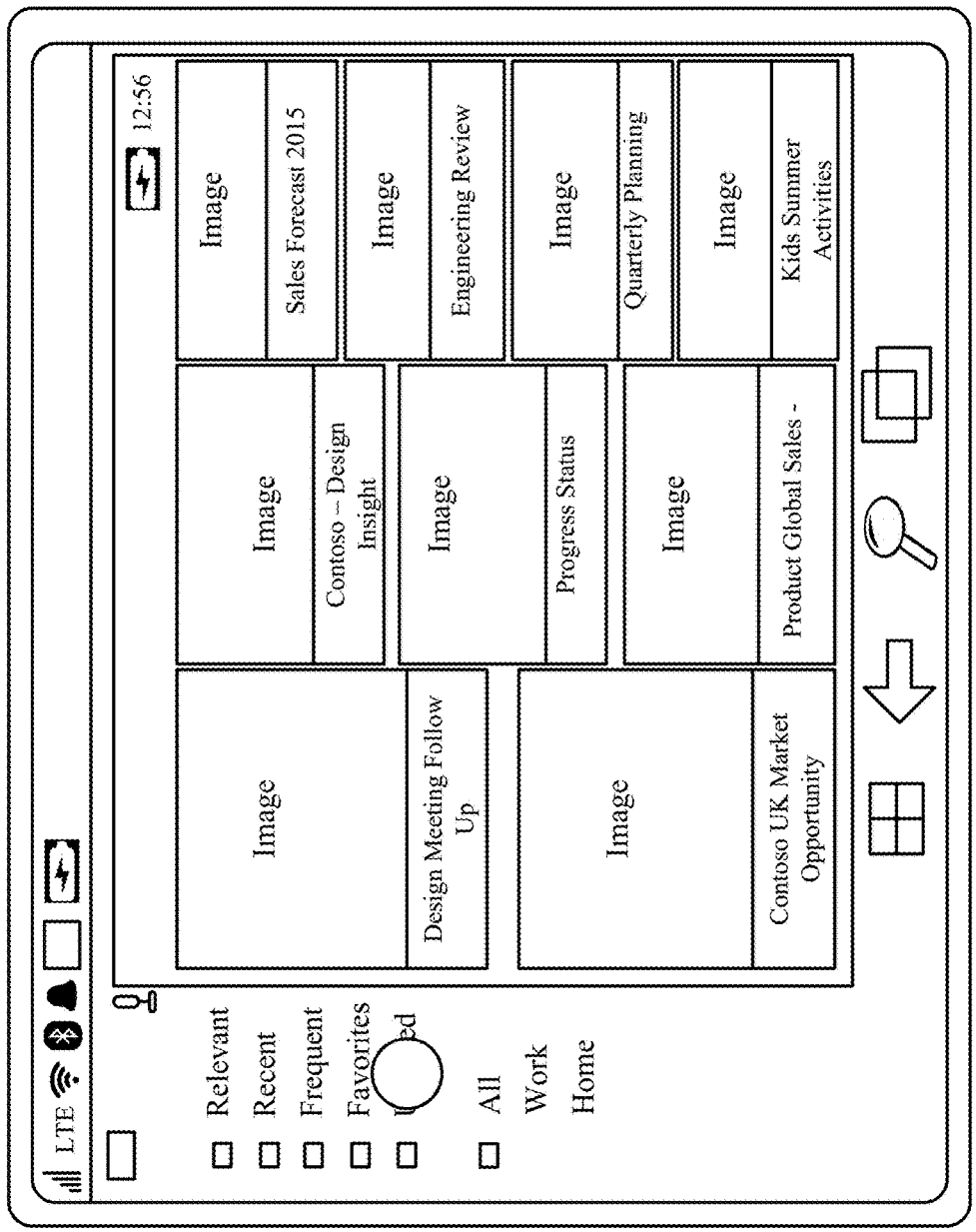

FIGS. 3E and 3F are similar to FIGS. 3C and 3D, except that the user is now actuating the "update" user input mechanism 368. FIGS. 3G and 3H show that relevancy generator 154 has received the input indicating that the user wishes to have it recalculate or update the relevancy of the various items of content. This may be, for instance, that the user has switched locations or is in a different meeting now (which is different from when the user last had the relevancy calculated) or otherwise. FIGS. 3G and 3H show that the relevant content that is being displayed has changed, because the user has changed physical locations.

For instance, in one example, relevancy generator 154 has used location detector 158 to detect that user 112 is now at work, instead of at home. Therefore, the relevancy of the various items of content has changed so that the work-related content is now more relevant, and is displayed higher in the list, than the personal or home-related content.

Figure 4:
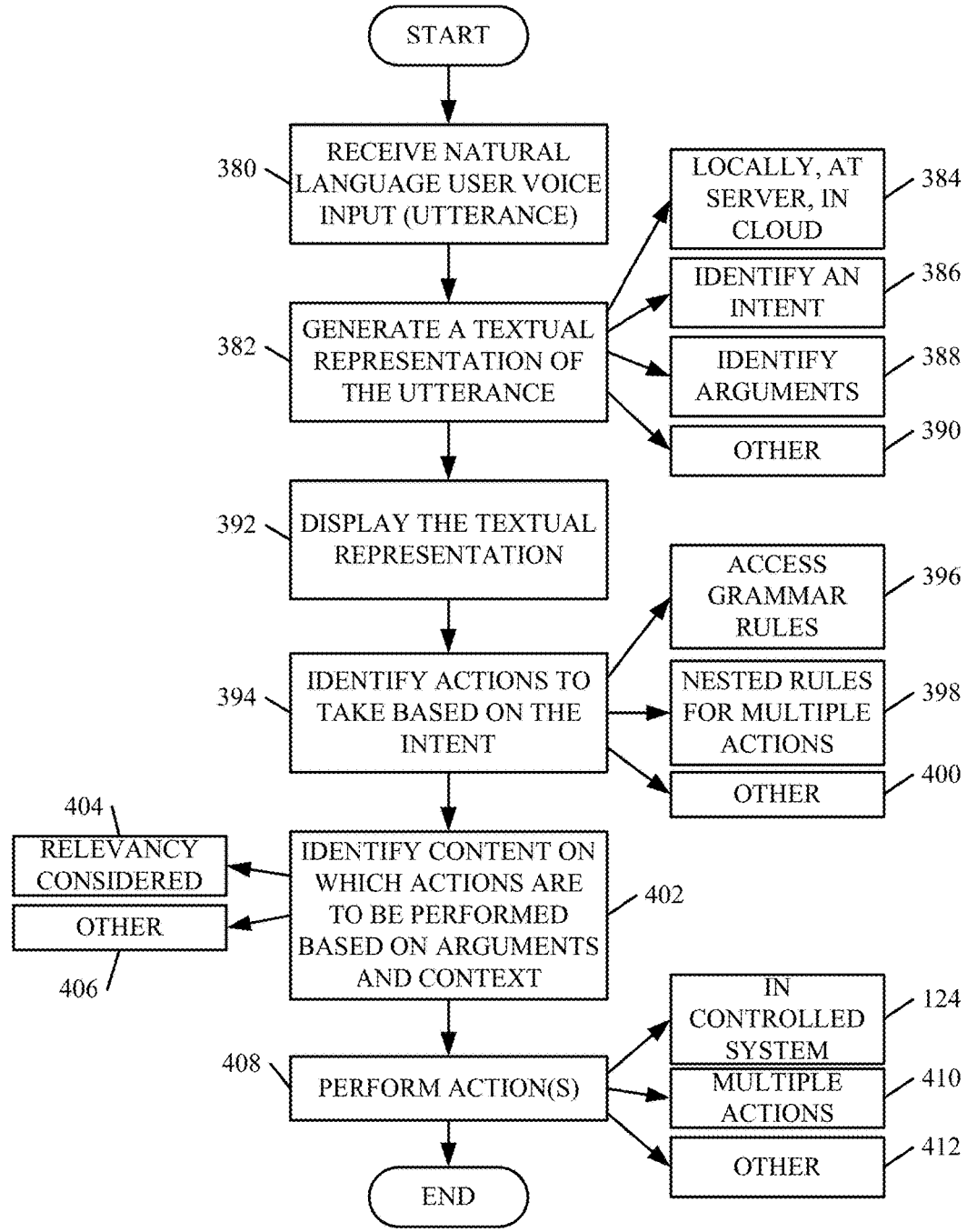
FIG. 4 is a flow diagram illustrating one example of the operation of the architecture shown in FIG. 1 in performing speech processing on a speech input signal.

FIG. 4 is a flow diagram illustrating one example of the operation of architecture 100 in processing a speech input (or utterance 142) received by user 112 at system 102. It is assumed for the sake of the present discussion that the user's device is currently displaying relevant content (such as that shown above with respect to FIGS. 3A-3H).

The user then illustratively provides an actuation input indicating that the user is about to provide a voice command. Alternatively, the device might always be listening and activated by a particular voice command. As one example, the user can touch a touch sensitive display screen or otherwise launch the speech recognition functionality of the system. System 102 then illustratively receives a natural language user voice input (or utterance 142). This is indicated by block 380 in FIG. 4. For instance, this can be received at a microphone on the user's device, or otherwise. System 102 then provides the utterance 142 to linguistic processing system 104. It should be noted that system 104, or the portions 138 and 140 of system 104, can be located locally on the user's device, at a server, in the cloud, in multiple different places, etc. For instance, it may be that the user's device has a relatively small and simple speech recognition system and natural language understanding system, so simple utterances are processed locally. The cloud or server may have a relatively large and comprehensive speech recognition system and natural language processing system so complex utterances are sent to the cloud. In another example, utterances can be processed both places and the result with the highest confidence score can be used. This is indicated by block 384.

Speech recognition system 138 generates a textual representation of the utterance, as indicated by block 382. Once a textual representation is generated, natural language understanding system 140 identifies an intent 386 in the utterance 142, based upon the textual representation. It also identifies arguments 388 from the textual representation as well. It can identify other information as well, and this is indicated by block 390.

The intent illustratively corresponds to an action that the user wishes to perform. For instance, the user may utter a phrase such as "share this document with Joe." In that case, natural language understanding system 140 will identify the word "share" as an action or command that the user wishes the system to perform. As an example, the word "share" may activate one or more rules in the various grammars 143-144. Those rules may activate other rules, each of which have a set of arguments that are to be matched before the rule fires. When the textual representation matches a given rule, the intent for that rule and the various arguments for the rule are output as part of result 146, along with the textual representation.

User interface component 130 then displays the textual representation to the user, as indicated by block 392. Action identifier 169 in action generator 120 identifies actions to take based upon the intent and it can also do this based on the context information and the arguments. This is indicated by block 394. For instance, it can access a set of rules 143-144 as well. The rules illustratively map the intent to a given action or set of actions. This is indicated by block 396.

The rules can be nested or arranged in a hierarchal or dependency structure in order to accomplish a task that requires multiple different commands or actions. Or, they can reference one another or interact in other ways. This is indicated by block 398. For instance, sending a document to a set of attendees at a meeting requires multiple different actions. First, it requires the document to be located. It also requires a set of attendees to be located. It then requires an e-mail to be generated with those attendees as recipients. It then requires that the located document be attached to the e-mail and that the e-mail be sent. All of these actions or commands can be identified through a sequence of rules that are active based upon the intent expressed in the utterance. The actions can be identified in other ways as well, and this is indicated by block 400.

Search system 116 then identifies the item of content on which the actions are to be performed based upon the arguments and context information. This is indicated by block 402. For instance, where the intent is to send an e-mail with attachments, the arguments will illustratively identify the attachment to the e-mail and the recipients of the e-mail. The arguments may explicitly identify the attachment and attendees or they may do so in an implicit way (such as where the attachment is identified as "the spec I revised this morning" or where the recipients are identified as "the attendees of this meeting"). In that case, search system 116 illustratively searches the various sources of information 106 to identify the attachment to be sent, as well as the recipients to the e-mail. As it searches the various sources of information 106, it will illustratively identify the most relevant search results (such as the most likely recipients, the most likely attachments, etc.). In doing so, it can use the relevancy generator to generate a relevancy score for each identified item, or it can generate relevancy or estimate the most likely recipients and attachment in other ways as well. Considering the relevancy is indicated by block 404. The item of content on which the action is to be performed can be identified in other ways 406 as well.

Once action generator 120 has identified the action to be taken, and has used search system 116 to identify the items of content needed to perform the action, it illustratively uses one of the components in action generator 120 to perform the action as indicated by block 408. It can do so by performing one or more actions in one of the controlled systems 124, such as by attaching a document to an e-mail in an email system, sending the e-mail and simultaneously sharing the document to a group or social network site, etc. Performing multiple actions is indicated by block 410. The actions can be performed in other ways as well, and this is indicated by block 412.

Figure 4A:
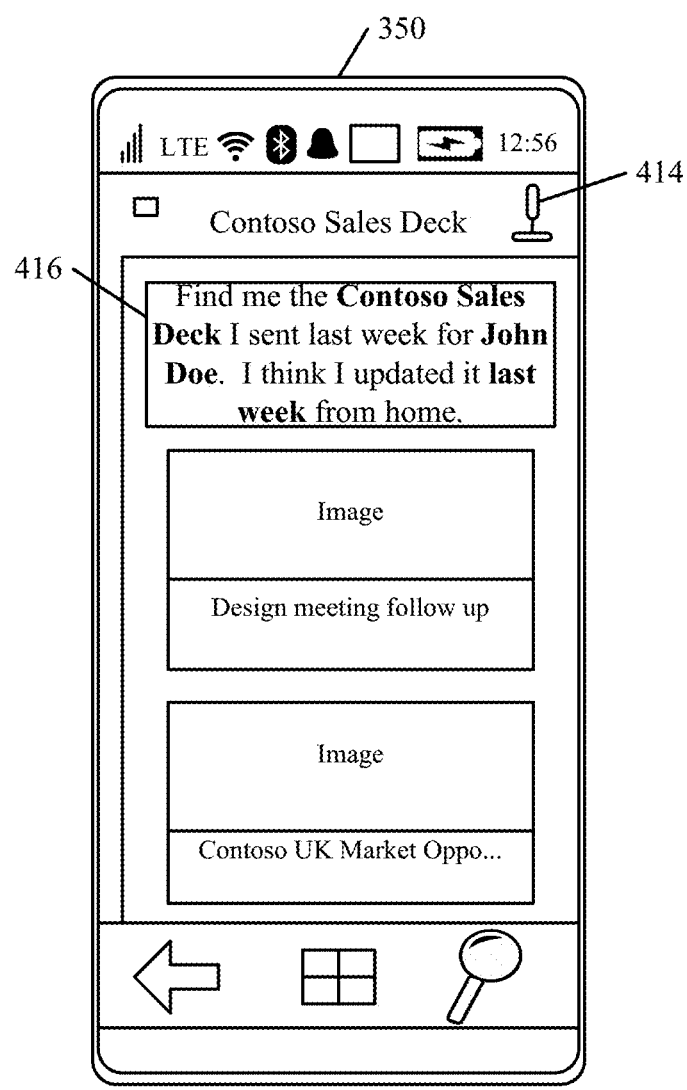
FIGS. 4A-4H show examples of user interface displays.
Figure 4B:
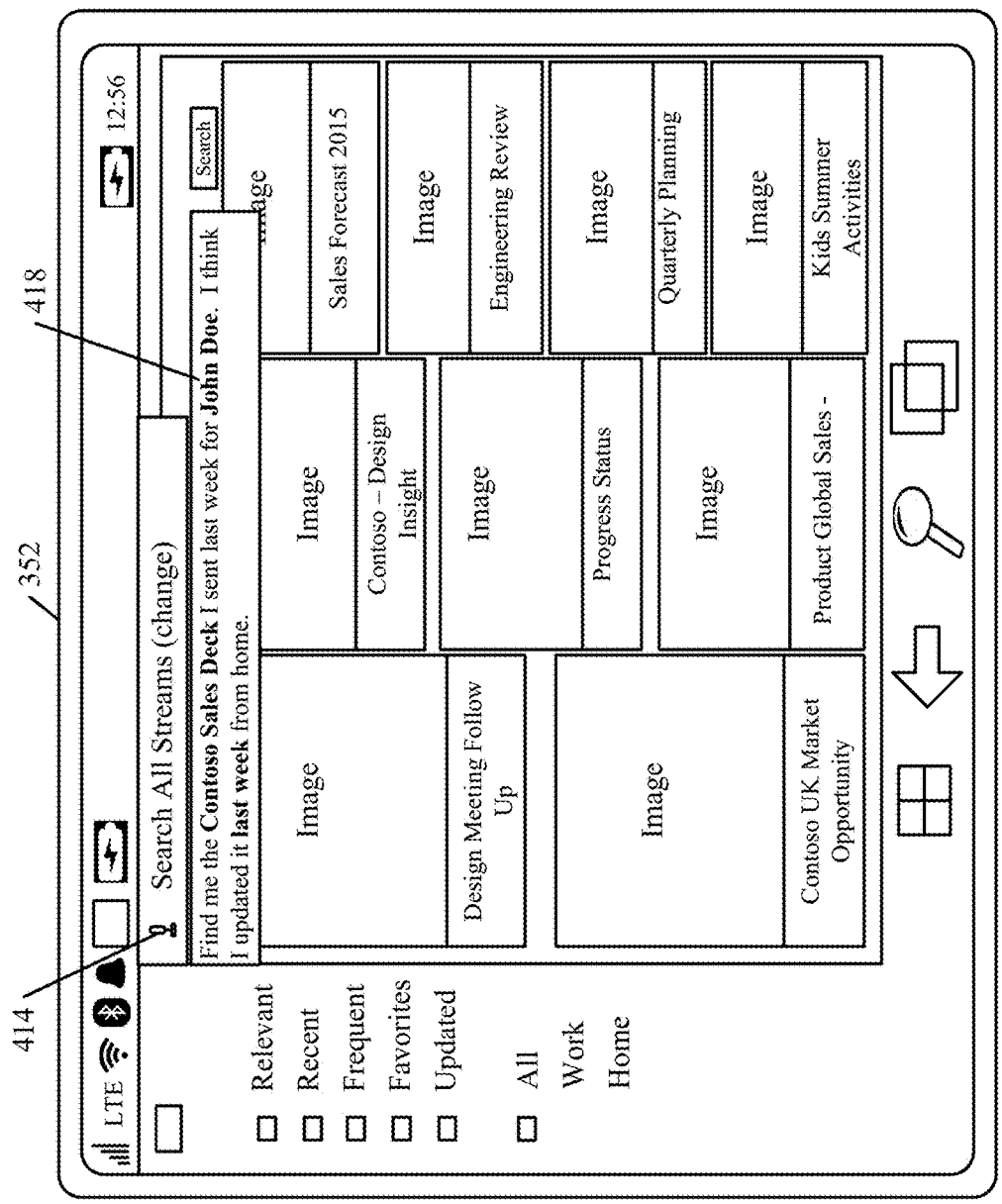

FIGS. 4A-4H show various examples of user interface displays that can be generated in performing commands based on a voice input. For instance, FIGS. 4A and 4B show examples of how user interface displays may be on the phone 350 and tablet computer 352, respectively. In the example illustrated, the user has provided a voice input of "Find me the Contoso sales deck I sent last week for Rob Young I think I updated it last week from home." In doing so, the user first illustratively actuates a user input mechanism (such as mechanism 414) to indicate to system 102 that the user is about to speak an utterance. The utterance was captured and sent to linguistic processing system 104 where speech recognition system 138 generates a textual representation of it. It is displayed on the corresponding user interface display, such as at block 416 or 418, respectively.

Figure 4C:
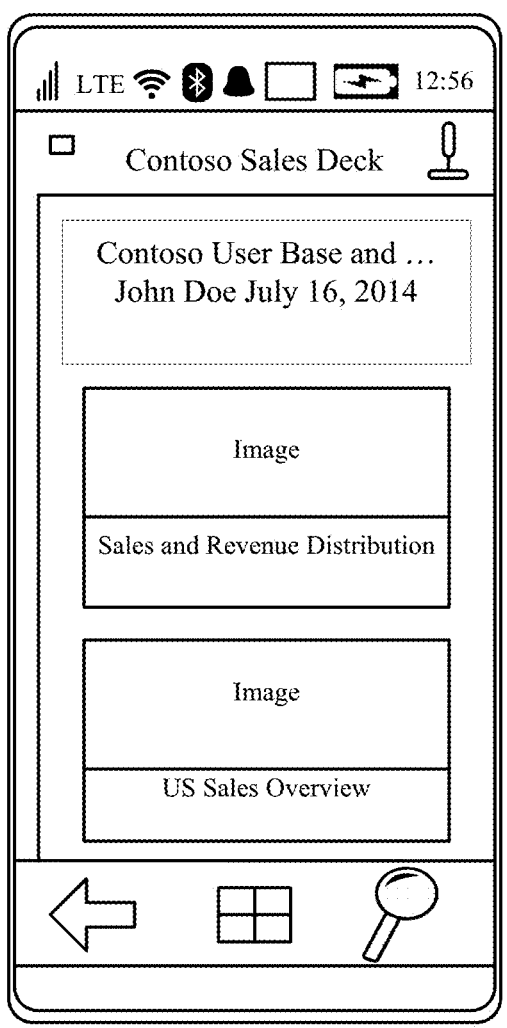
Figure 4D:
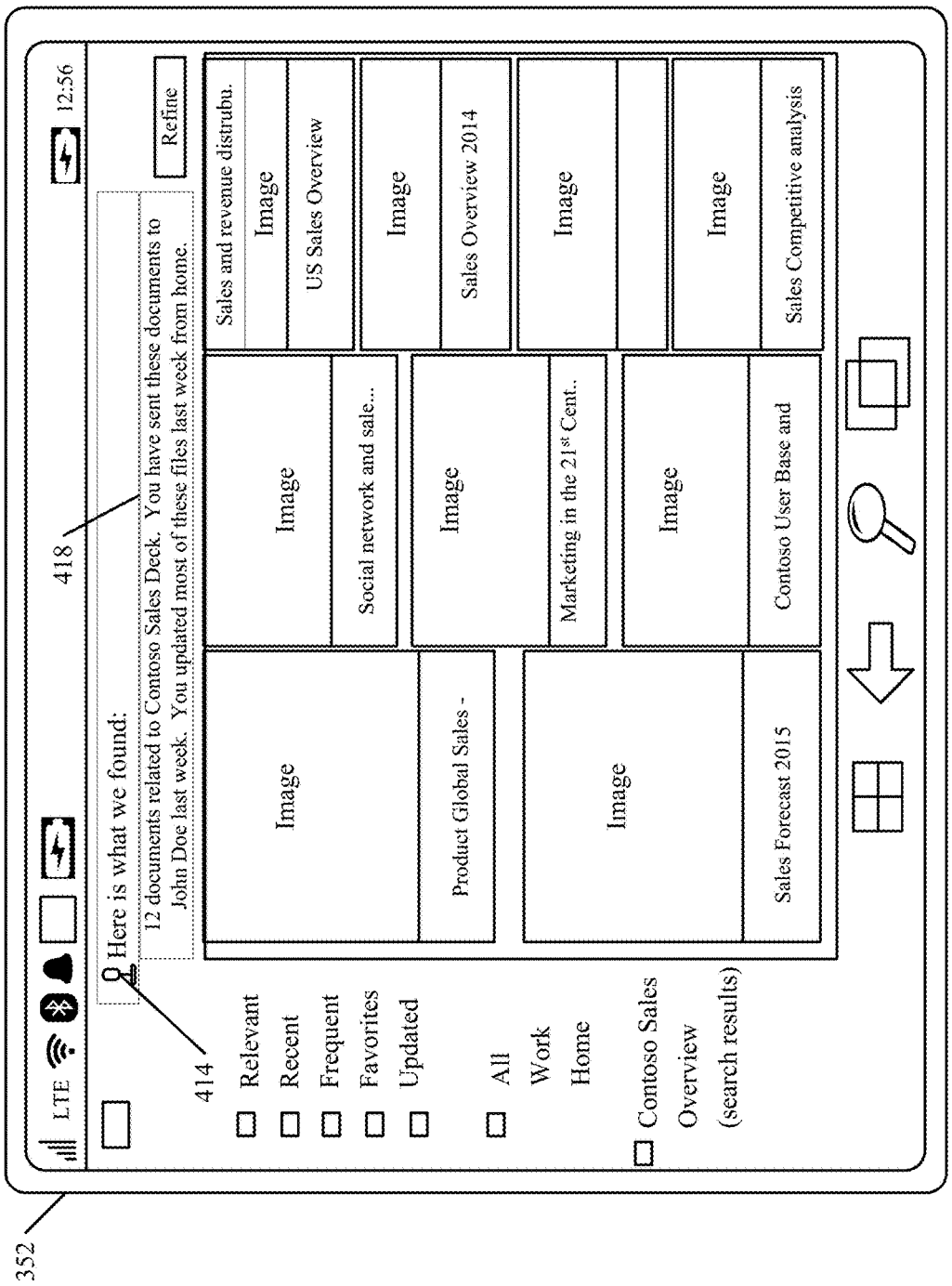

FIGS. 4C and 4D are similar to FIGS. 4A and 4B, except that it is seen that search system 116 has identified a number of different relevant items of content, that are relevant to the user's utterance. In order to do this, action generator 120 first received an indication that the intent in the utterance was to "find" a document. It then used search system 116 to locate documents relevant to the user's query. In doing so, it used arguments such as "Contoso sales deck", "last week", "Rob Young", and "home" to identify relevant documents. The displays shown in FIGS. 4C and 4D indicate that the displayed items of content are what was found in response to the user's query. They are illustratively displayed in order of relevance to the user's query, as determined either by relevancy generator 154, or in other ways. Display component 182 then generates the user interface displays on phone 350 and/or tablet 352 (whichever the user is using) and the relevant content is displayed.

Figure 4E:
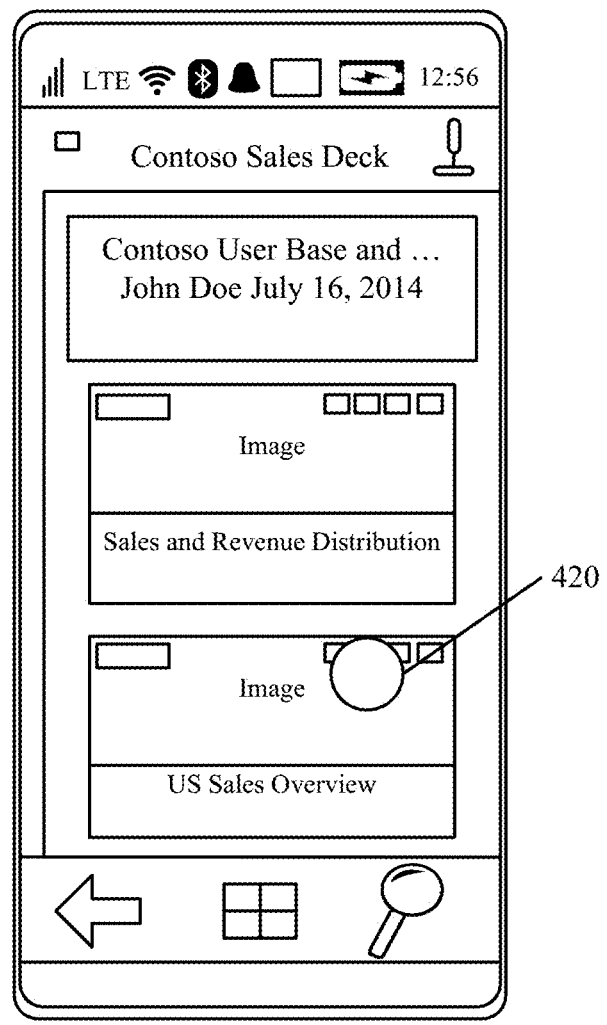
Figure 4F:
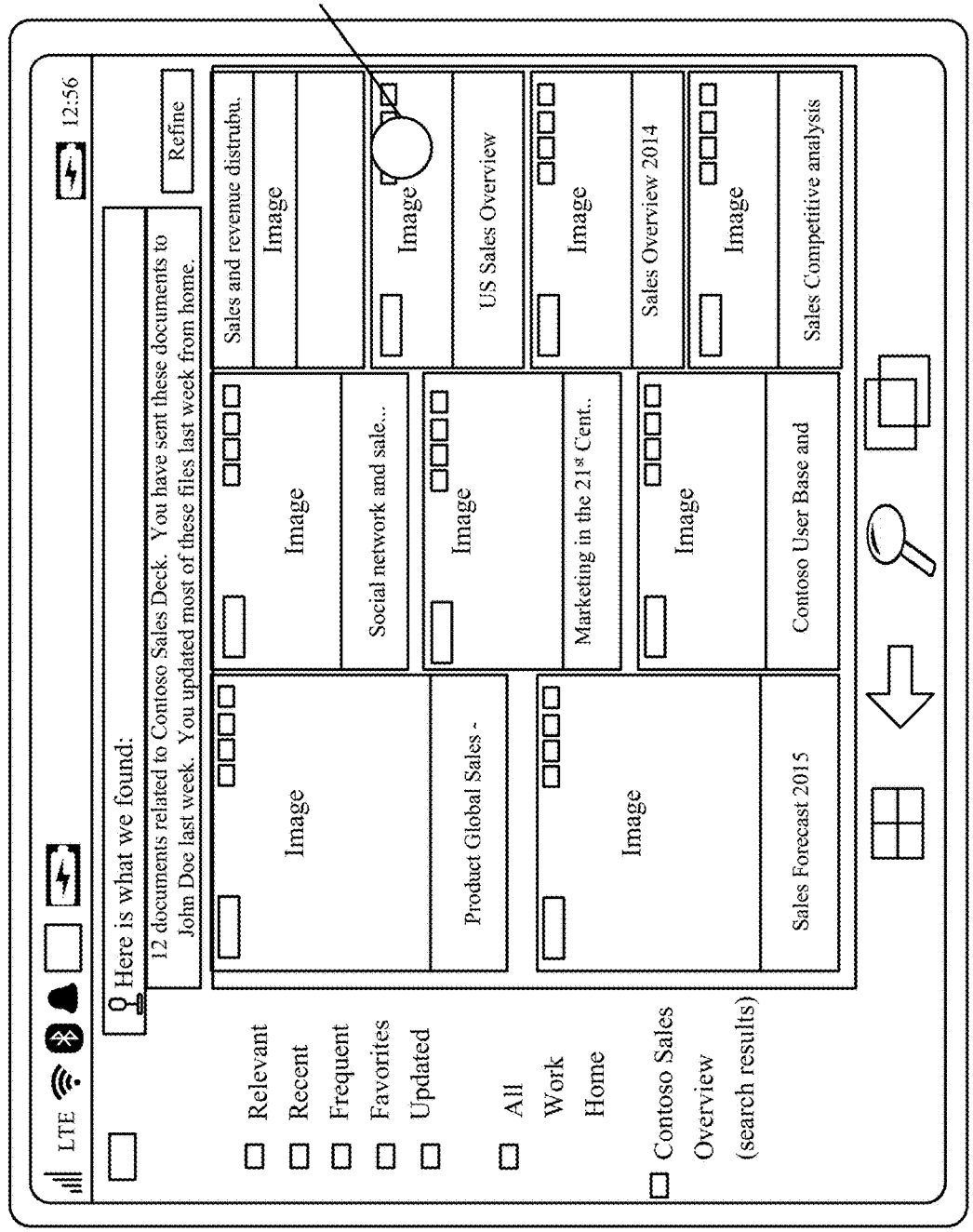

FIGS. 4E and 4F are similar to FIGS. 4C and 4D, except that they show that the user is now actuating a "share" user input mechanism 420 to share the document. This can be done, for instance, by touching the user input mechanism on a touch sensitive screen. Share component 174 then uses search system 116 to identify recommendations as to which people or groups the document should be shared with. This can be done based upon the contextual information of the user, the document, the other users or other context information as discussed above. Share component 174 then uses user interface component 130 to display the share recommendations to the user. This is illustrated in FIGS. 4G-4H.

Figure 4G:
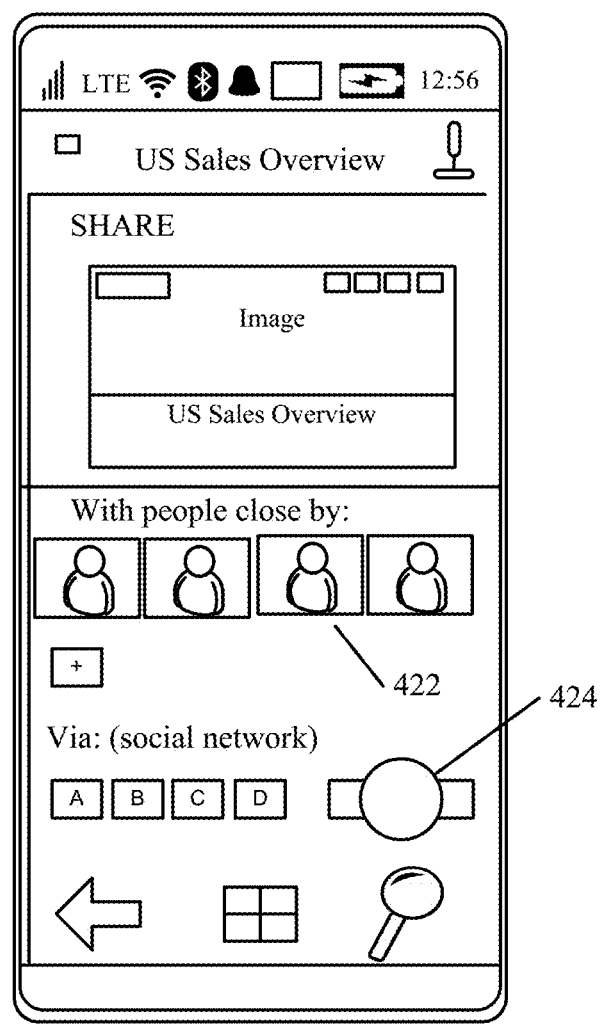
Figure 4H:
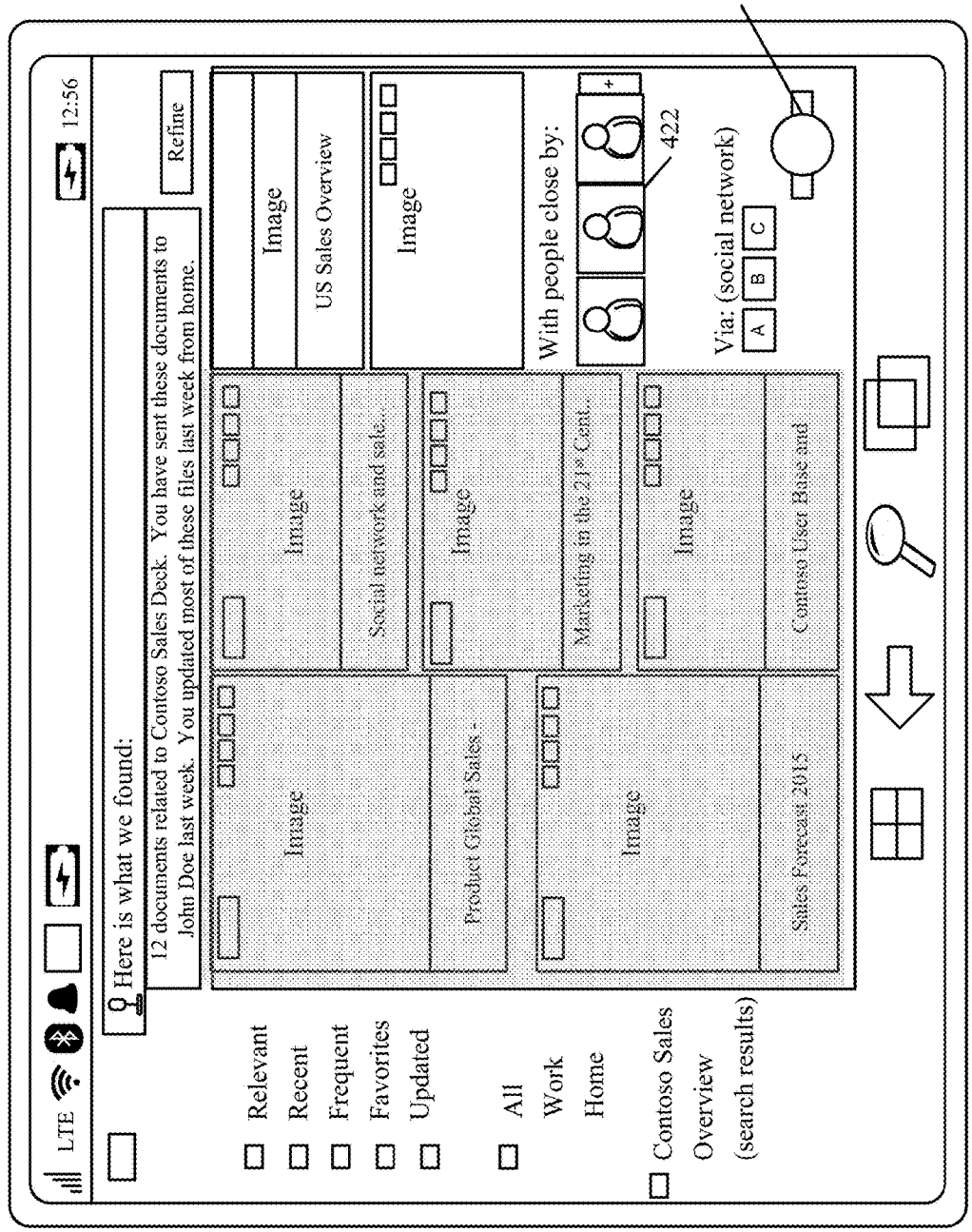

In the example shown in FIGS. 4G and 4H, the share recommendations 422 are displayed to the user for selection. In the example shown, the share recommendations were identified based upon a proximity of user 112 to the various people that were analyzed, and based upon other contextual information. This is but one example. If the share recommendations 422 are accurate, the user simply actuates the send user input mechanism 424 and the selected item of content is shared with the people identified in the share recommendation.

Some of the "intents" in the utterance described thus far represent commands or actions that are taken outside the context of any given document. For instance, the commands can include such things as open, download, print, share, create, send, schedule an appointment, delete, post, find, etc. These actions can be performed on documents or other objects across multiple different data sources (e.g., word processing documents, presentations, emails, etc.) and across different devices (e.g., the command "open, on my desktop, the documents I received from Nicole yesterday." may be input by the user on a mobile device, but the document may be opened on the user's desktop).

Figure 5:
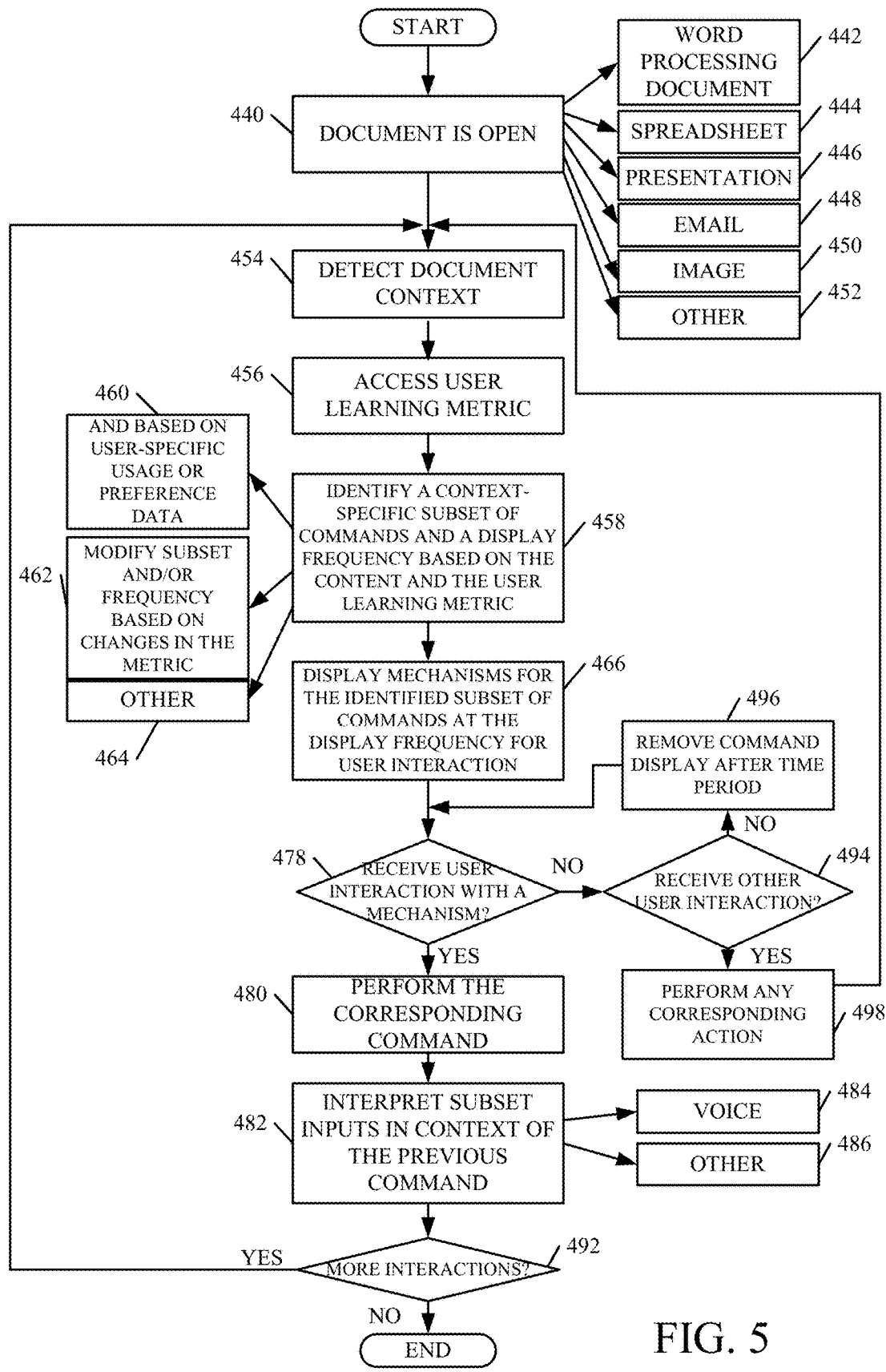
FIG. 5 is a flow diagram illustrating one example of the operation of the architecture shown in FIG. 1 in processing command inputs within an already-opened document.
Figures 1, 5:
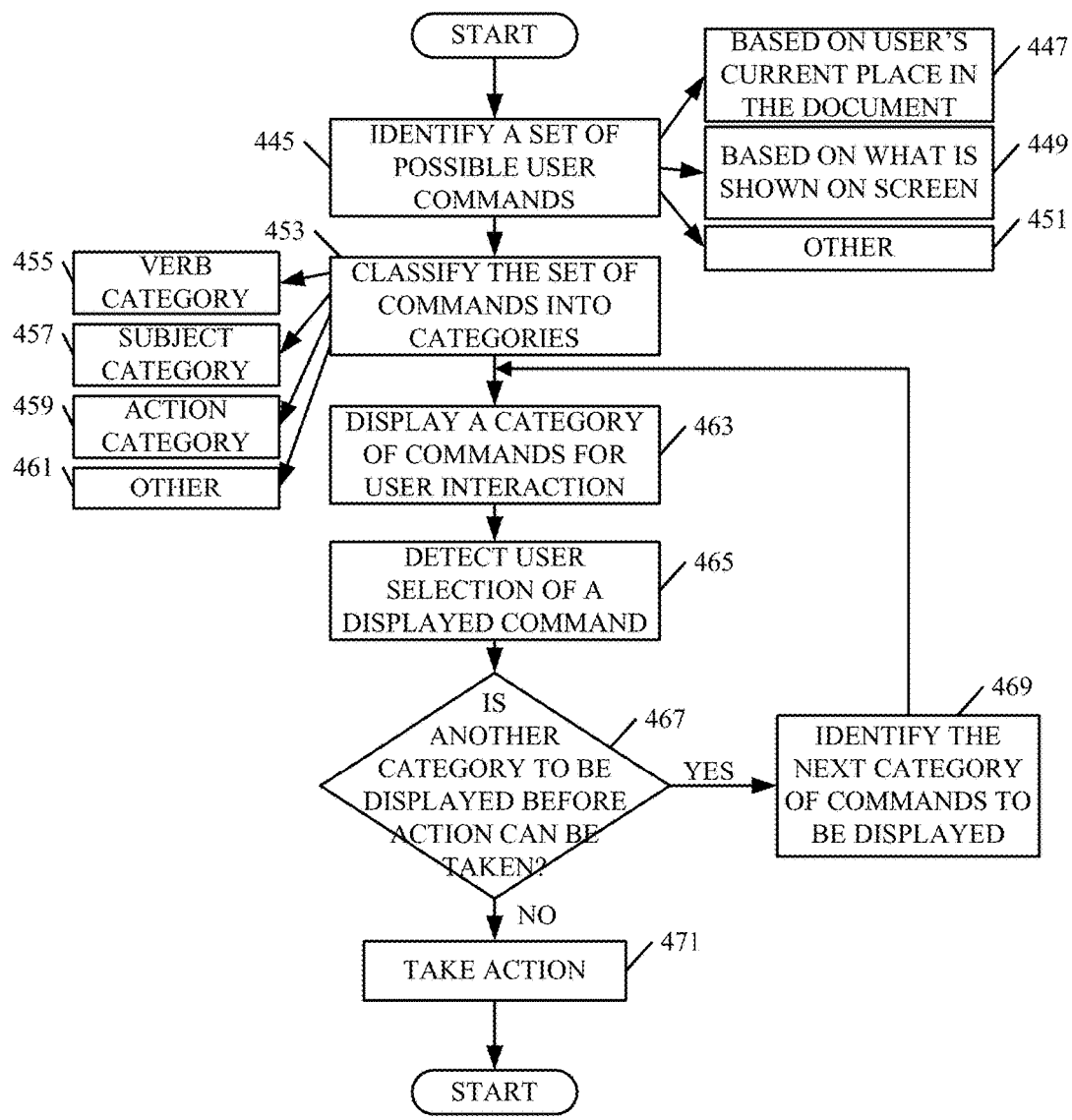

It should also be noted that system 102 can perform actions on a document, when the user has a document open. For instance, the system can perform actions within the document (such as navigation actions, formatting actions, selecting actions, etc.). FIG. 5 is a flow diagram illustrating the operation of system 102 in doing this. It is first assumed that the user has a document open. This is indicated by block 440. The document may, for instance, be a word processing document 442, a spreadsheet 444, a presentation document (such as a slide presentation) 446, an electronic mail message 448, an image 450, or another document 452.

Context detector 192 illustratively detects the document context. This is indicated by block 454. For instance, it may detect the page that the document is scrolled to, the formatting of the document, or a wide variety of other contextual information.

Action generator 118 then accesses user metric component 134 to identify a user learning metric corresponding to user 112. This is indicated by block 456. By way of example, user metric component 134 can illustratively generate a user metric indicative of how advanced or experienced user 112 is in using the particular application that the user is using, in using the particular device the user is using, in using context-based action system 102, or in using other items. As one example, user metric component may keep track of how many times the user has used formatting features in a given application. It may keep track of which types of features the user has used, how often the user has used system 104, or a wide variety of other things. This can serve as a metric (or a metric can be calculated based on this information) indicative of the user's experience. As the user gains experience in using a given application or system 102, it maybe that the system need not generate as many help prompts for the user. However, if the user is a new user, then it may be that the system wishes to generate more help prompts or to display them more frequently. In any case, generator 118 accesses the user learning metric for the current user 112 as an indication of how experienced or knowledgeable the user is in interacting with the document.

Command identifier component 198 then identifies a context-specific subset of commands and a display frequency based upon the context and the user learning metric. This is indicated by block 458. For instance, it may be that a user is simply viewing a document. In that case, command identifier component 198 may predict that the user may wish to perform one of a first subset of commands or actions. In another example, the user may have selected either a word, phrase, paragraph, object or image in the document. In that case, command identifier component 198 illustratively predicts that the user may desire to perform any of a different subset of commands.

In identifying the subset of commands, component 198 may access a set of command prediction rules, or a command prediction component that predicts the various commands that the user may wish to use. In any case, component 198 identifies a subset of commands that the user may wish to take, based upon the context of the application, the user's context, and the user's experience level (represented by the learning metric). Component 198 may also consider user-specific usage or preference data. This is indicated by block 460. The component 198 will also modify the subset of commands that are identified based upon changes in the metric, context data, etc. This is indicated by block 462. The subset of commands can be identified in other ways as indicated by block 464.

Command identifier component 198 then uses user interface component 130 to display mechanisms for the identified subset of commands. They are displayed at a frequency based upon the user learning metric. The user can then interact with the display mechanisms to perform the subset of commands. Displaying the identified subset of commands for user interaction is indicated by block 466.

The user can interact with one of the display elements, and action generator 118 illustratively uses one of its components to perform the corresponding action or command. This is indicated by blocks 478 and 480 in FIG. 5.

When the user does this, the user may then provide further interaction inputs. In that case, in one example, continuous conversation component 200 in action generator 118 interprets the subsequent inputs in the context of the previous command. This is indicated by block 482. Of course, the commands can be voice commands 484, or other commands 486.

The user may provide more interactions, as indicated by block 492. If this is the case, processing reverts to block 454 where the document context is again detected, the user learning metric is accessed, etc.

Figure 5A:
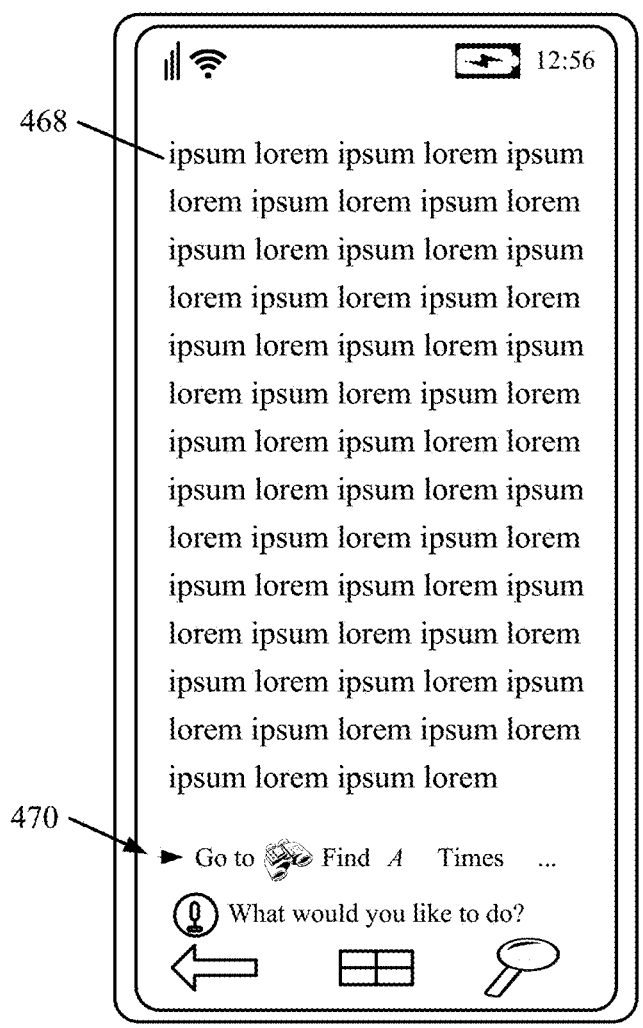
FIGS. 5A-5V show examples of user interface displays.

At block 478, it may be that the user does not ever actuate one of the display elements that is displayed by command identifier component 198 (such as 470 in FIG. 5A). In that case, the system detects whether the user provides any other interaction inputs within the document. This is indicated by block 494. If not, then the display elements corresponding to the identified commands are eventually removed from the display (e.g., they disappear after a certain amount of time). This is indicated by block 496. For instance, if the user is simply viewing a document, and the user does not actuate any of the display elements 470, then after a predetermined period of time, they are removed. The predetermined period of time may vary based upon the user learning metric for this particular user. For instance, if the user is a fairly experienced user of the system, then the system will determine that it need not display the display elements for very long, because the user already knows how to use them. However, if the user is a relatively inexperienced or new user, then the display elements may be displayed for a longer period of time, so that the user can review them, try them, consider various options, etc. In addition, it should be noted that, in one example, the user can access an entire set of commands at any time. For instance, the user can do this by navigating into commanding menus, so the full set of commands may be hidden or buried, but not inaccessible.

If the user does perform another type of interaction (other than actuating one of the display elements) then action generator 118 performs any corresponding action. This is indicated by block 498. Processing then again reverts to block 454. In doing so, the user interaction will be part of the document context that is considered by command identifier component 198 in predicting commands that the user will likely use, and displaying the corresponding display elements.

FIG. 5-1 is a flow diagram illustrating one example of how command set processing component 193 can identify, organize and classify available commands for user interaction (as indicated at blocks 458, 466, 478 and 480 in FIG. 5). It is first assumed that command set identifier 195 has received the context information from context detector 192, indicating a present context of an open application. It then identifies a set of all possible user commands, available in the application, from the present context. This is indicated by block 445. This can, for instance be based on the user's current place in the application, as indicated by block 447. It can also be based on what is currently displayed on the display screen, as indicated by block 449, or based on other context information, as indicated by block 451.

Command analysis component 197 then analyzes the identified set of commands to classify them into various categories. This is indicated by block 453. For instance, component 197 can classify the identified commands into verb commands, as indicated by block 455. It can classify them into a subject category 457, an action category 459, or into other categories 461.

Component 197 then selects a category of commands to display for user interaction, and displays the commands from that category for user interaction. This is indicated by block 463 in FIG. 5-1. The category selection can be done in a number of ways. For instance, the commands may be hierarchical, in which case, the hierarchy may be used to determine which category of commands to display. That is, it may only make sense to display a given category after a command from a higher category is selected.

As an example, assume that the open application is a word processing application and paragraphs and tables are currently being displayed. In such an example, there will exist a set of commands that can be performed on those paragraphs and tables, once they are selected by the user. Thus, command set identifier 195 identifies the available commands as including those that can be performed on the displayed paragraphs and tables. Component 197 then classifies those commands into a verb category, which will include a SELECT command that can be performed to select a paragraph or table, among others, and displays actuators associated with each of the commands in the verb category. When the user actuates (such as taps) the SELECT command actuator, component 197 will then display actuators associated with each command in the subject category, so the user can further define the command, by selecting whether the user wishes to select TABLE or PARAGRAPH. When the user actuates one of the subject actuators, component 197 displays actuators associated with each action in the action category so the user can select an action to perform on what the user has selected (e.g., paragraphs or tables).

Detecting user selection or actuation of a displayed command is indicated by block 465. Determining whether another category is to be displayed before performing an action is indicated by block 467. If so, identifying the next category to display is indicated by block 469. Taking an action is indicated by block 471.

FIGS. 5A-5D show various examples of user interface displays and command display mechanisms. In FIG. 5A, for instance, it can be seen that the user is simply viewing a document in display 468. Therefore, command identifier component 198 identifies a first set of commands that the user may wish to execute, given the fact that the user is simply viewing the document. One example of a subset of commands includes a "go to" command, a "find" command, a formatting "themes" command, among others. It then generates a set of display elements 470, with one display element corresponding to each of the identified subset of commands. Display elements 470 are illustratively user actuatable display elements that can be actuated by the user (such as by tapping on them) to perform the corresponding action or command. Therefore, for instance, if the user actuates the "go to" display element, navigate component 196 will navigate the user to an identified section of the document. If the user actuates the "themes" display element, then action generator 118 will navigate the user through a formatting user experience that allows the user to format the document according to various themes. These are examples only.

Figure 5B:
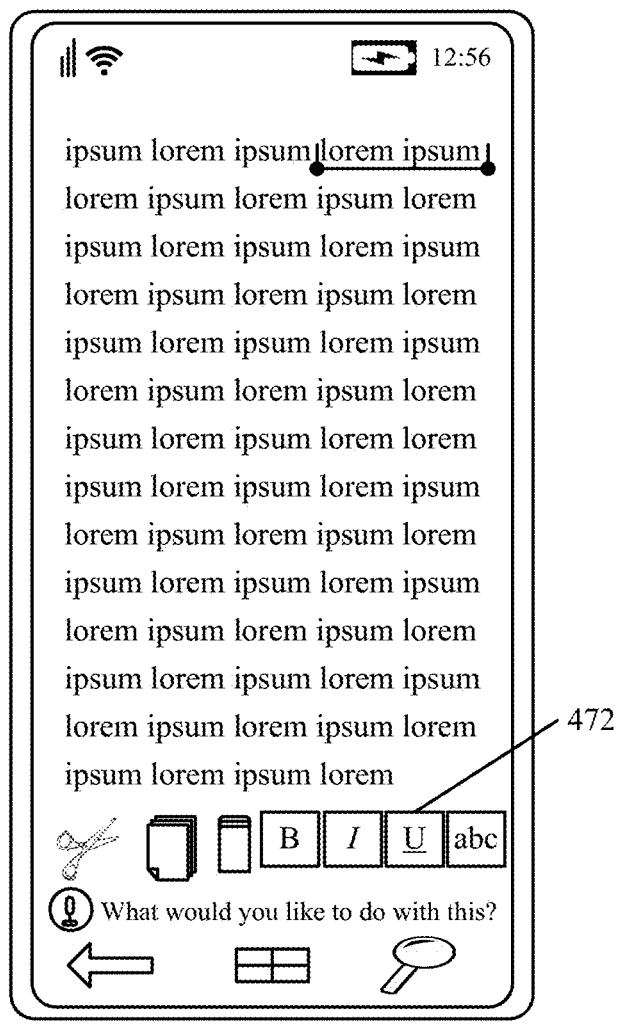

FIG. 5B shows that the user has selected the words "Redmond, Wash.". Thus, command identifier component 198 has identified a second subset of commands and displayed a set of display elements 472 corresponding to those commands. Because the user has selected a set of words, command identifier component 198 has predicted that the user is likely to want to perform different commands than when the user had not selected any words (as shown in FIG. 5A). Thus, the display elements 472 correspond to different commands than the display elements 470.

Figure 5C:
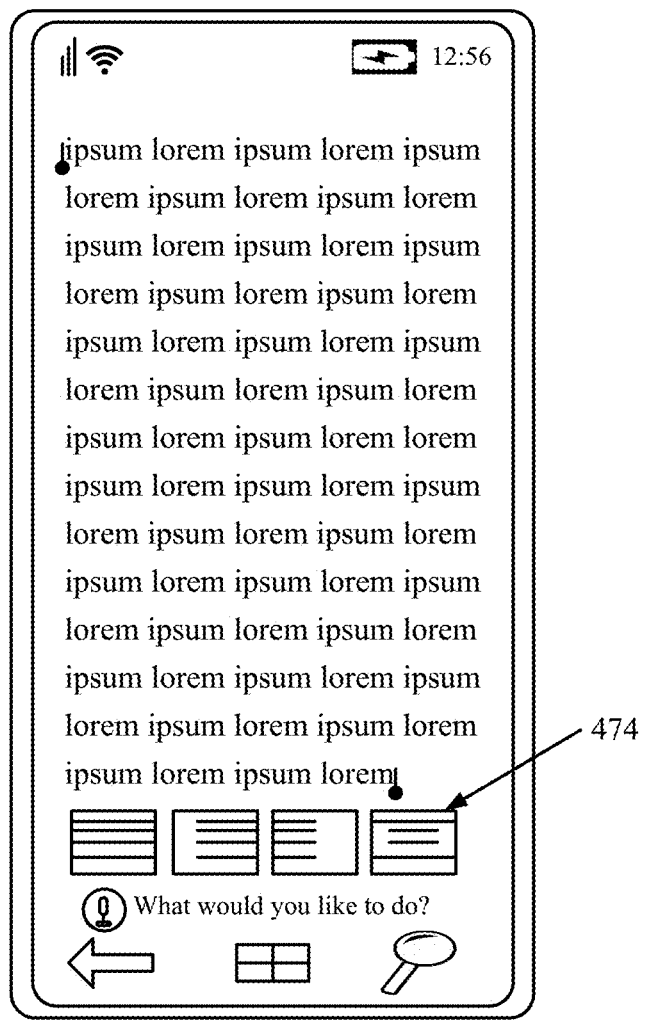

It can be seen in FIG. 5C that the user has now selected an entire paragraph. Therefore, command identifier component 198 has predicted that the user may wish to perform any of yet another subset of commands. Component 198 thus displays another set of display elements 474 corresponding to those commands.

Figure 5D:
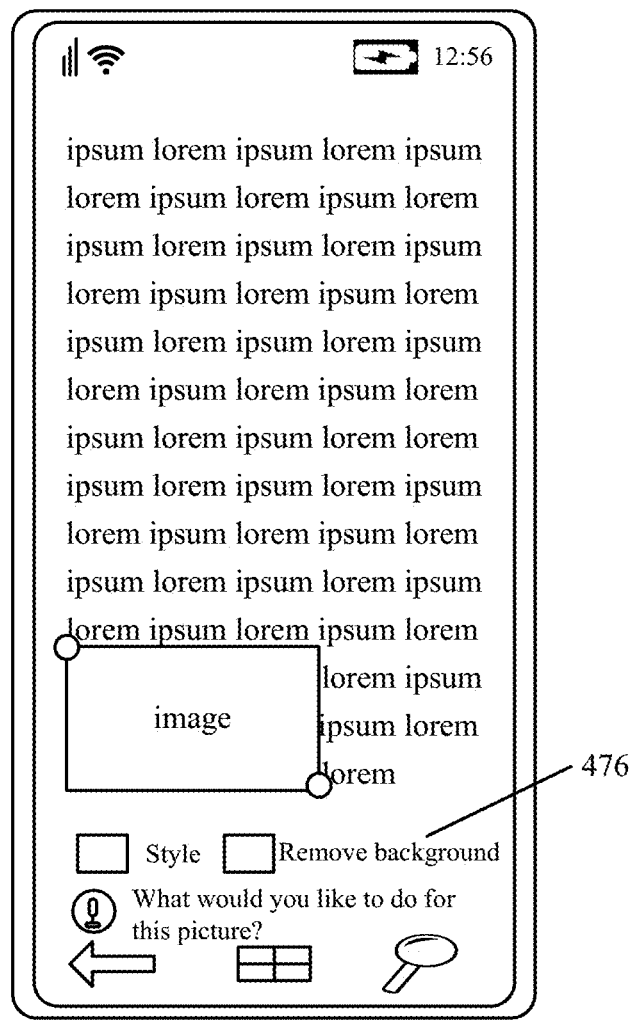
Figure 5E:
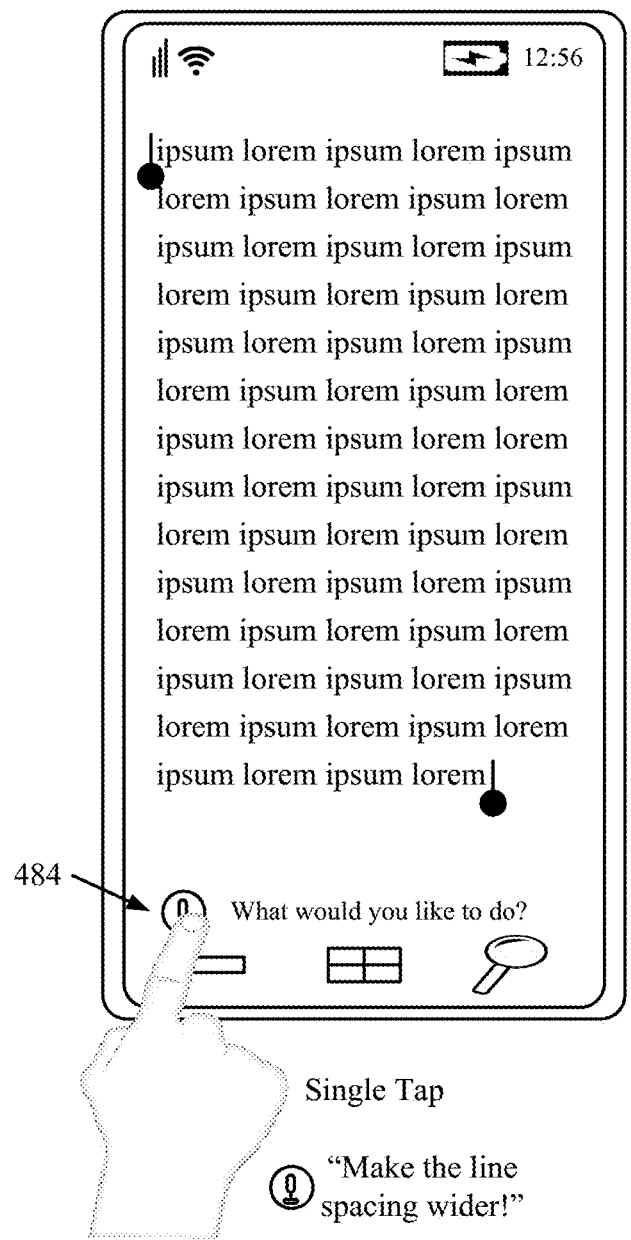

FIG. 5D shows that the user has now selected an image in the document. Based on this fact, command identifier component 198 predicts that the user is likely to perform one of yet a different subset of commands, and it has displayed a different set of display elements 476 corresponding to those commands.

Figure 5F:
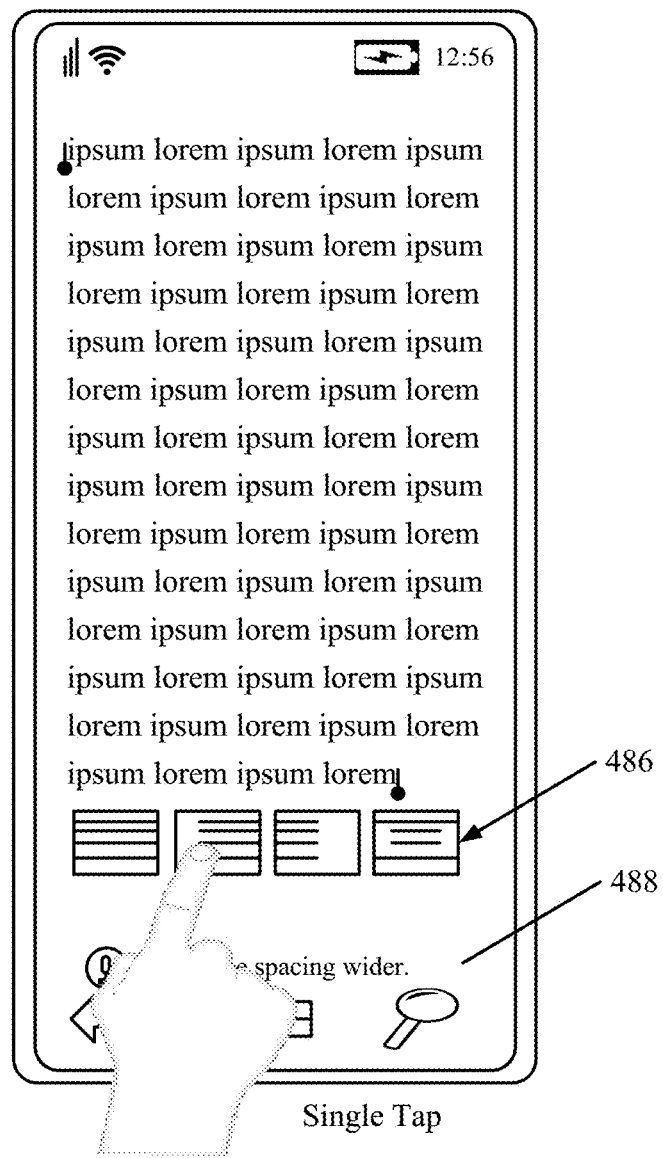

FIGS. 5E-5K illustrate one example of how the system interprets commands in view of previous commands. It can be seen in FIG. 5E that the user has selected all of the text in the document being displayed. The user then actuates user input mechanism 484 indicating that the user is about to provide a voice input. The user then speaks the input "make the line spacing wider". FIG. 5F shows that the textual representation of that utterance is displayed at 488. In response, linguistic processing system 104 identifies the intent as changing the line spacing and provides that along with result 146, to continuous conversation component 200. Command identifier component 198 uses this as context information and identifies a subset of commands that are related to changing line spacing and displays a set of display elements 486 corresponding to those commands.

Figure 5G:
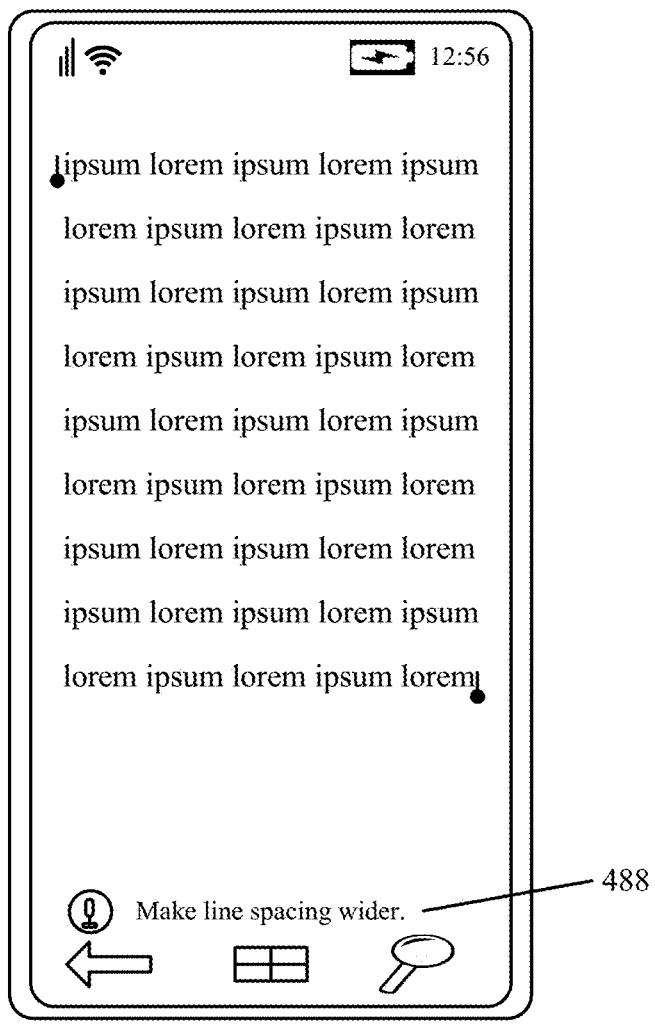
Figure 5H:
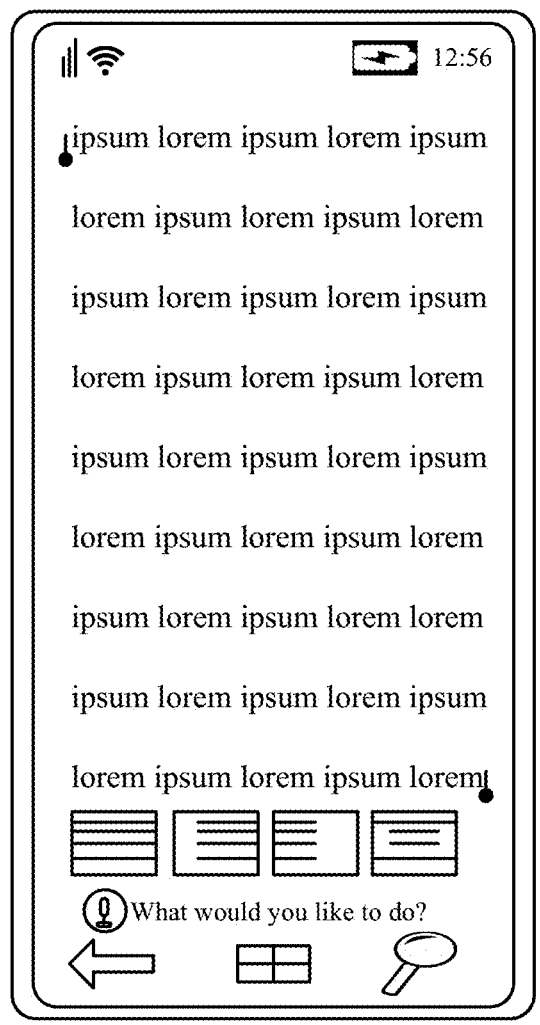
Figure 5I:
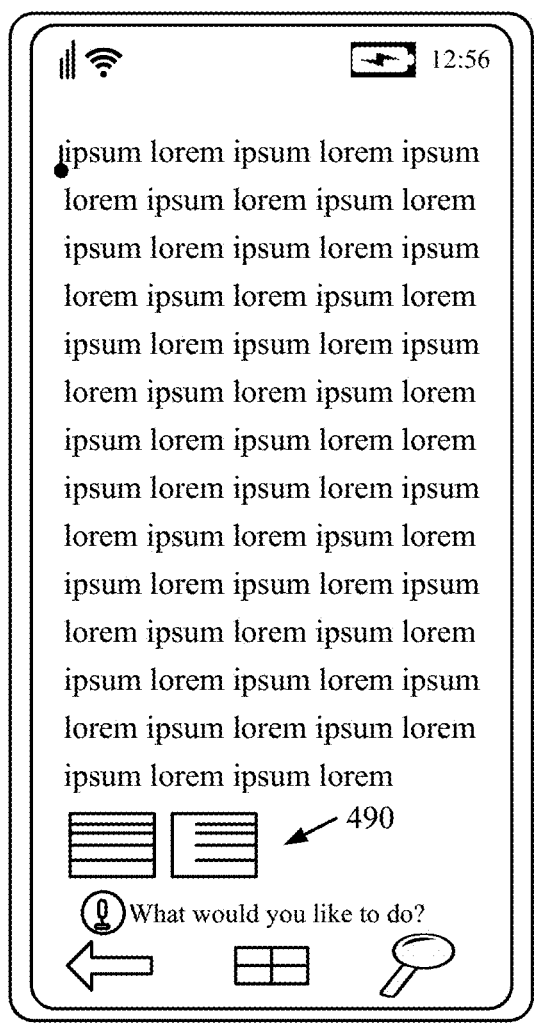
Figure 5J:
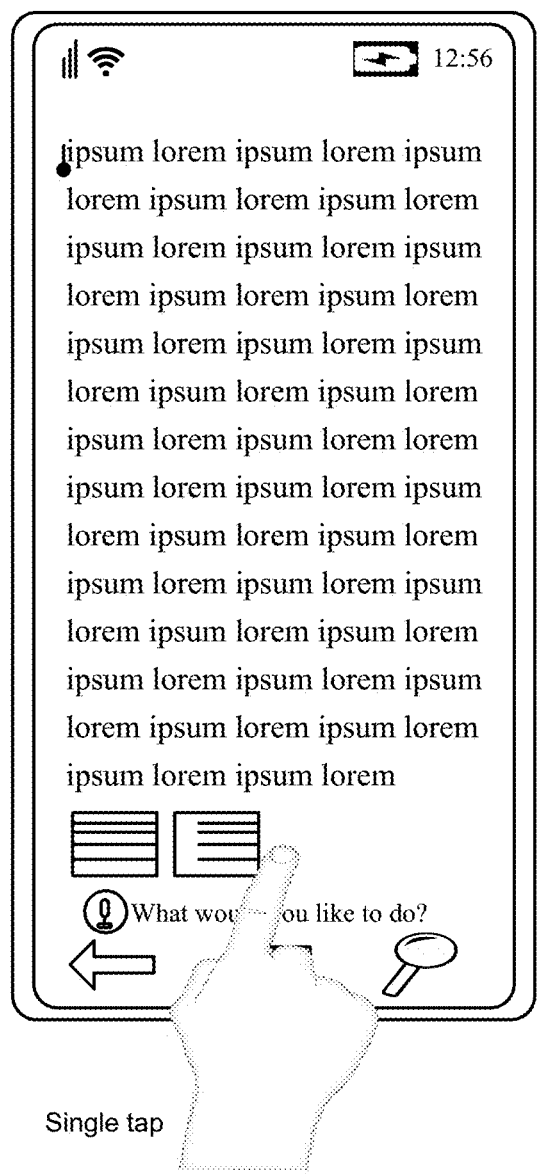
Figure 5K:
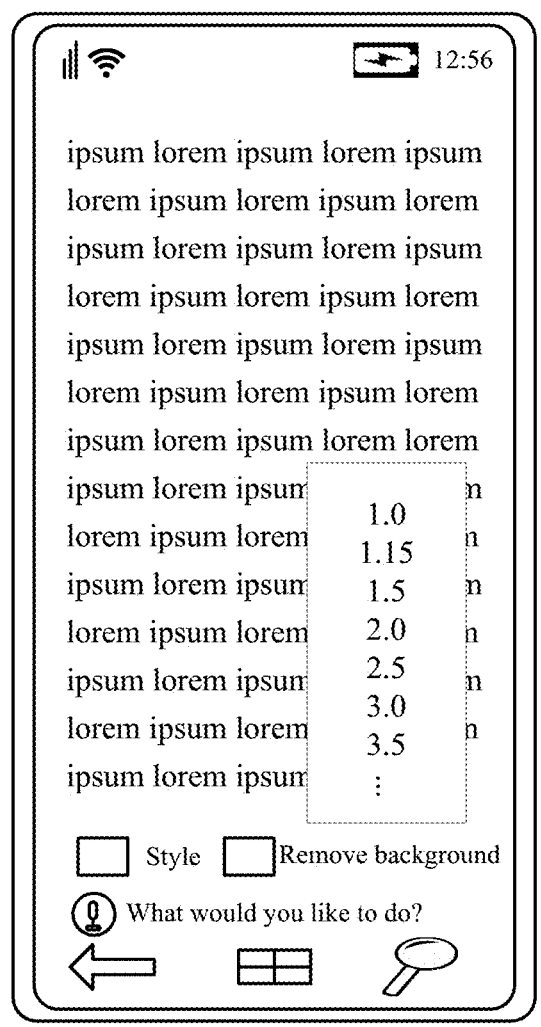

The user taps a display element 486 indicating that the user wishes to make the line spacing wider. Action generator 118 then makes the line spacing wider, as shown in FIG. 5G. The user then provides another voice input "more". This is provided to system 104 where the word is returned as result 146. Component 200 identifies that this is a continued instruction to further increase the line spacing, based upon the previous instruction to increase the line spacing. Thus, it controls action generator 118 to increase the line spacing even more. This is shown in FIG. 5H. FIG. SI shows that command identifier component 198 maintains two display elements 490 that have to do with line spacing. This is because it has been interpreted that the user is still attempting to modify the line spacing. Thus, as shown in FIG. 5J, the user can simply tap one of those user input mechanisms, and action generator 118 performs the corresponding action by navigating the user through another user experience that allows the user to manually set the line spacing to a given level, as indicated by FIG. 5K.

Figure 5L:
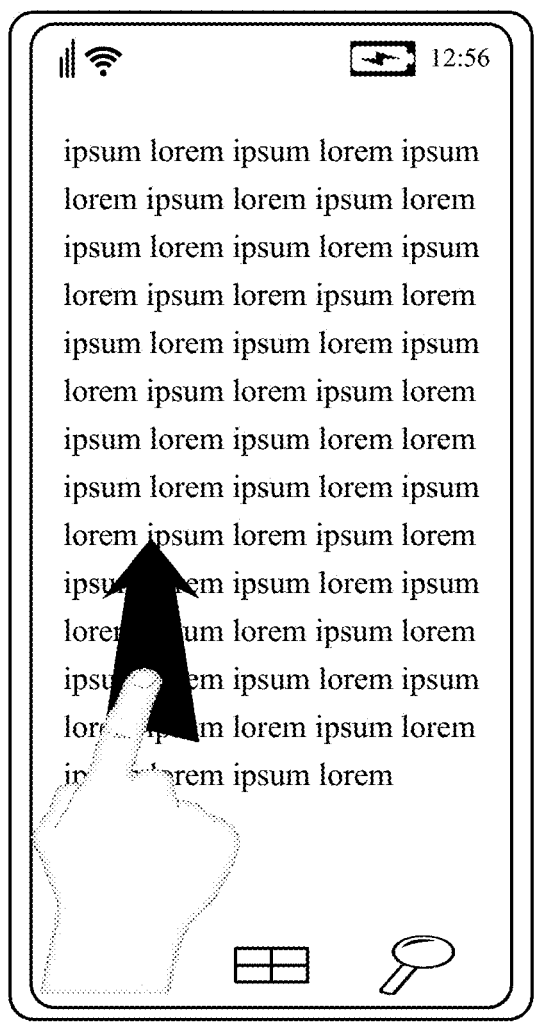
Figure 5M:
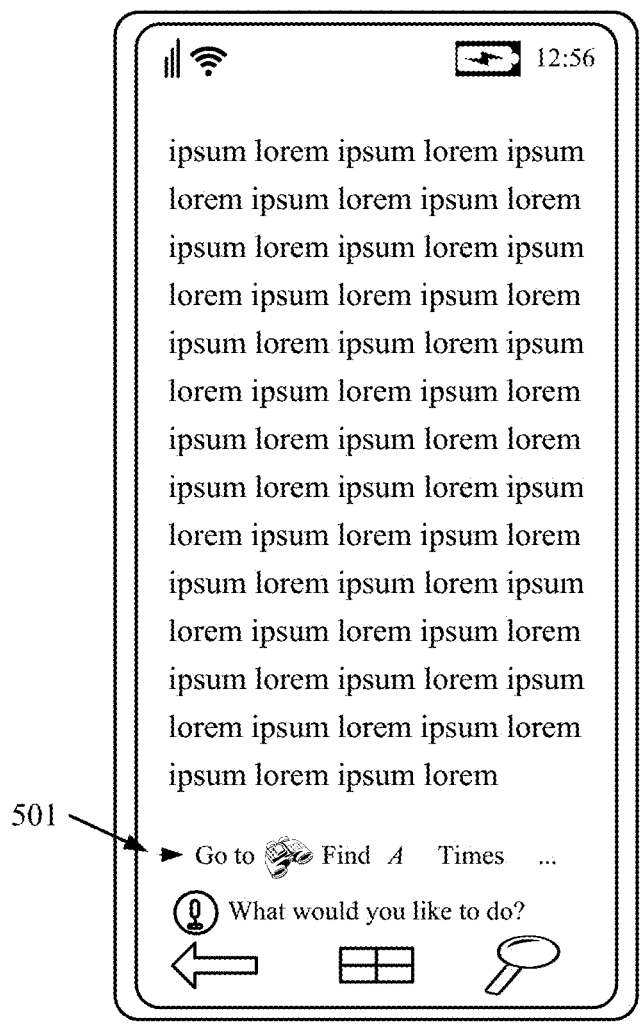
Figure 5N:
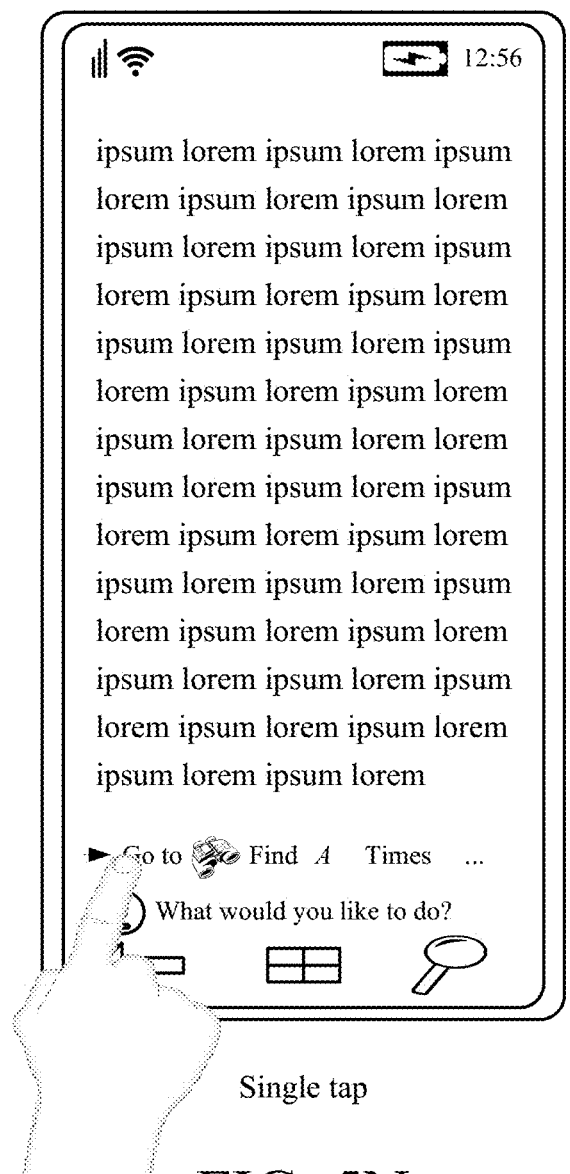
Figure 5O:
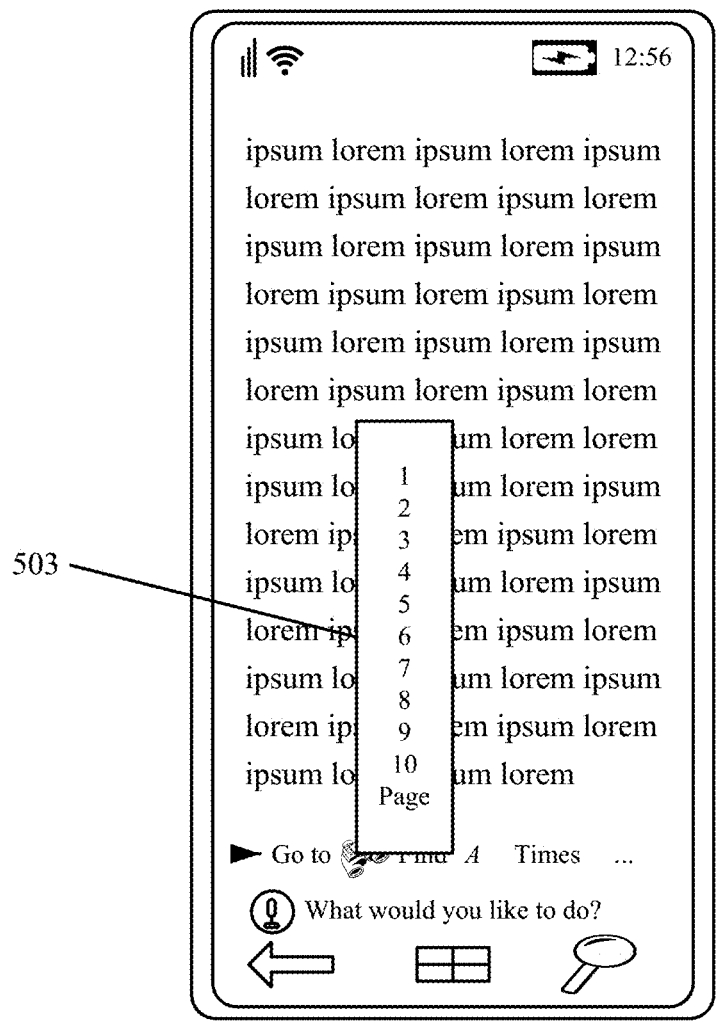

FIGS. 5L-5O illustrate one example of how a user interaction becomes part of the document context. FIG. 5L is similar to FIG. 5A, except that it can be seen that the user is now providing a touch gesture to scroll the document being displayed. Given that user interaction as context information, command identifier component 198 predicts that the user is likely trying to find a particular place in the document. Therefore, command identifier component 198 displays a set of display elements 501 corresponding to commands that would allow the user to do this. For instance, one of the display elements is a "go to page" display element. When the user actuates this, as indicated in FIG. 5N, action generator 118 displays a menu 503 that allows the user to select a particular page of the document that the user wishes to scroll to. Navigation component 196 then navigates the user to that portion of the document. Again, this is but one example, and there are a wide variety of other user actions or interactions that can be used as context information by component 198 to predict likely commands that the user wishes to use.

Figure 5P:
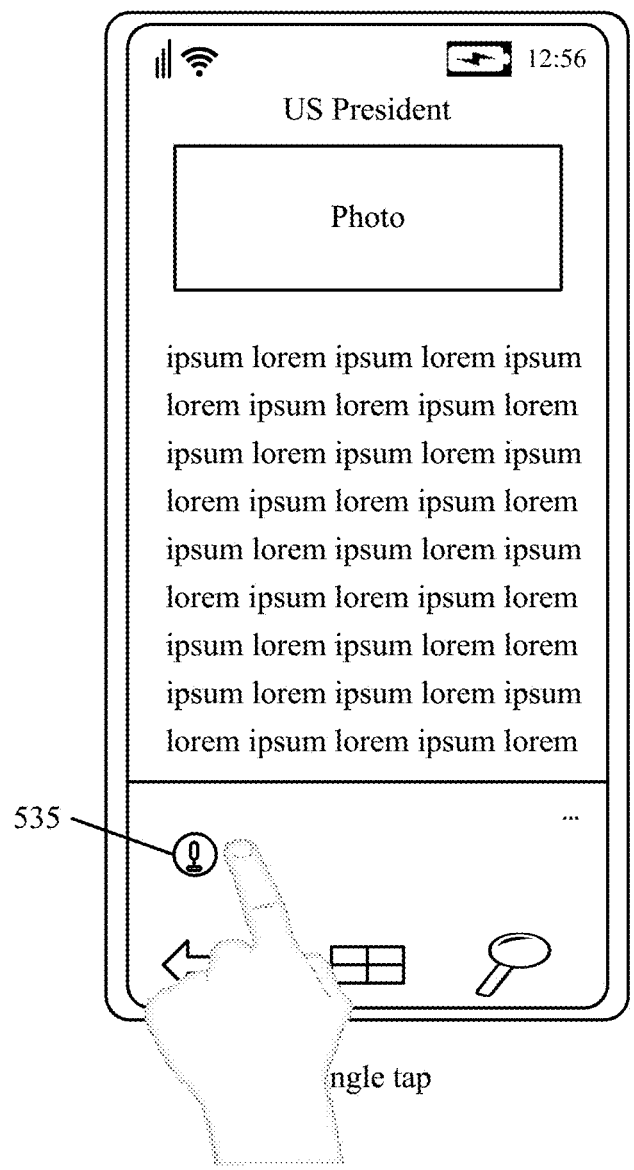
Figure 5Q:
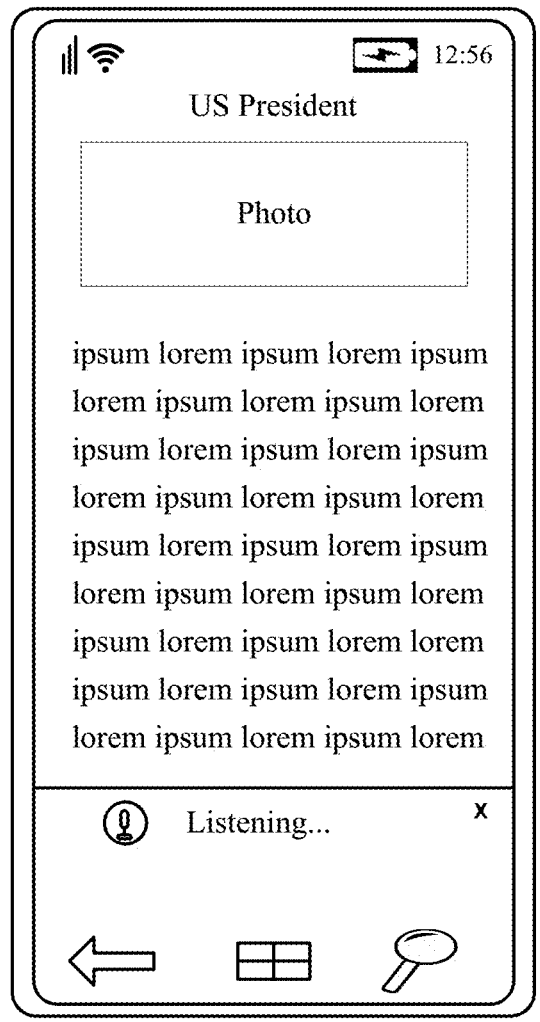
Figure 5R:
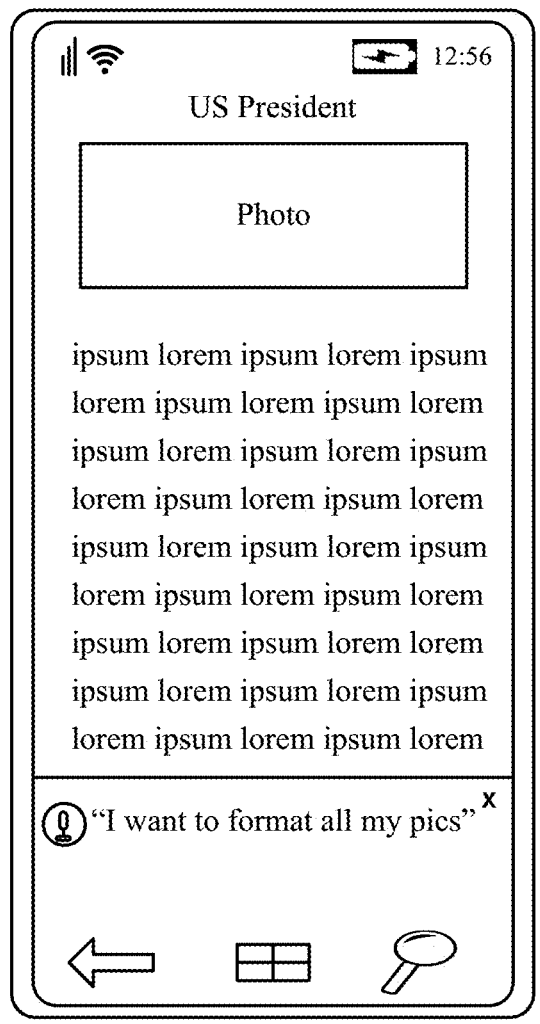
Figure 5S:
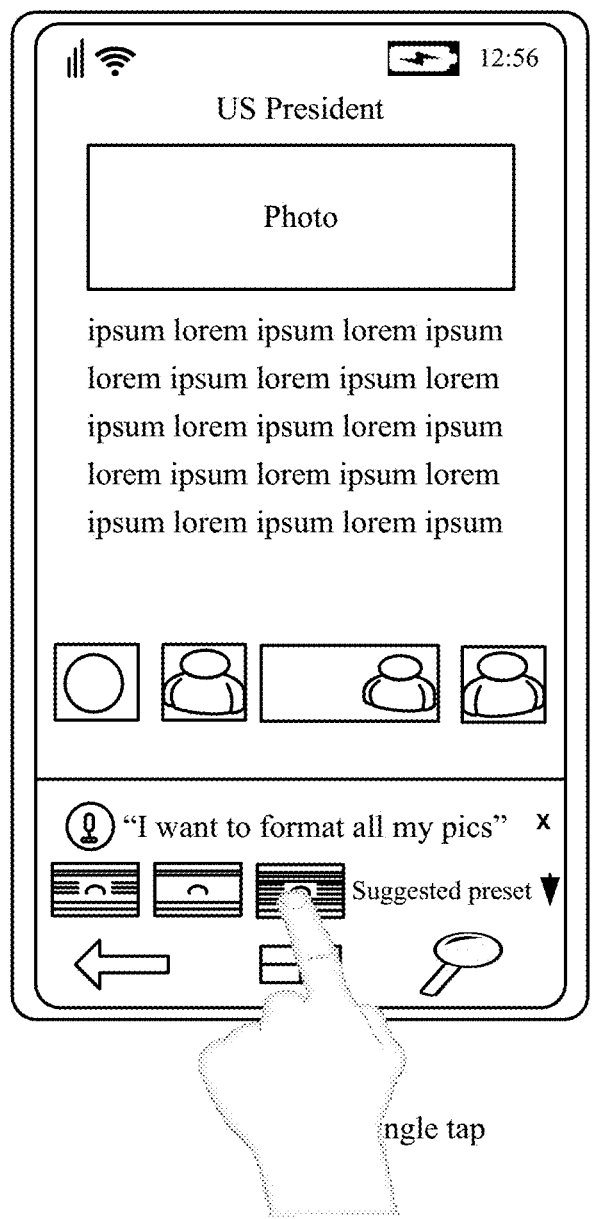
Figure 5T:
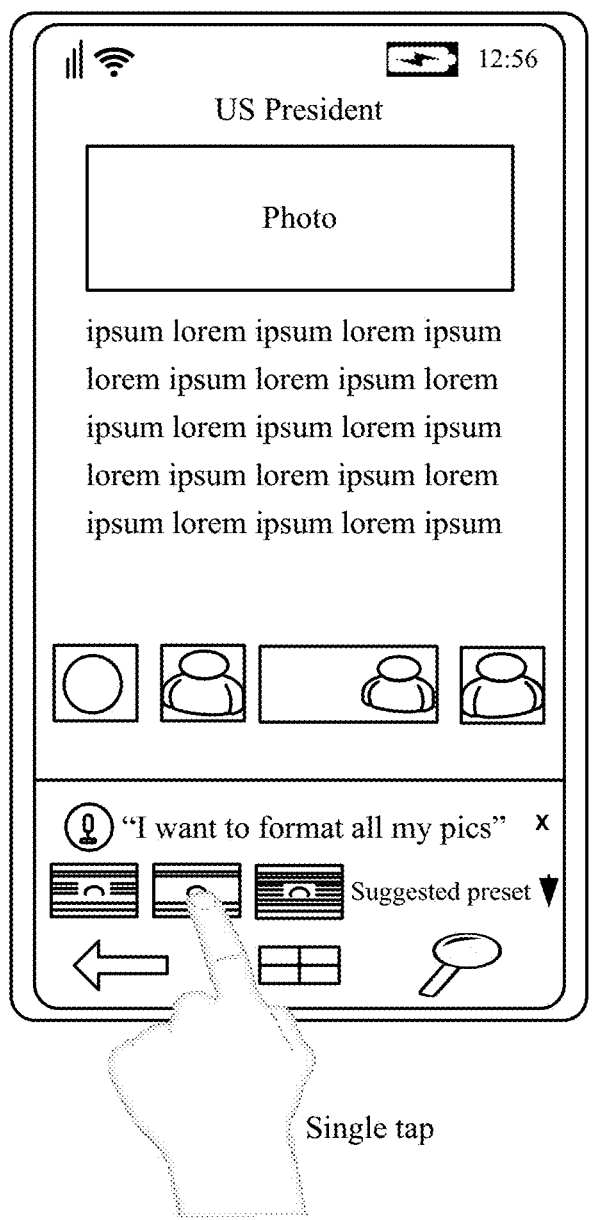
Figure 5U:
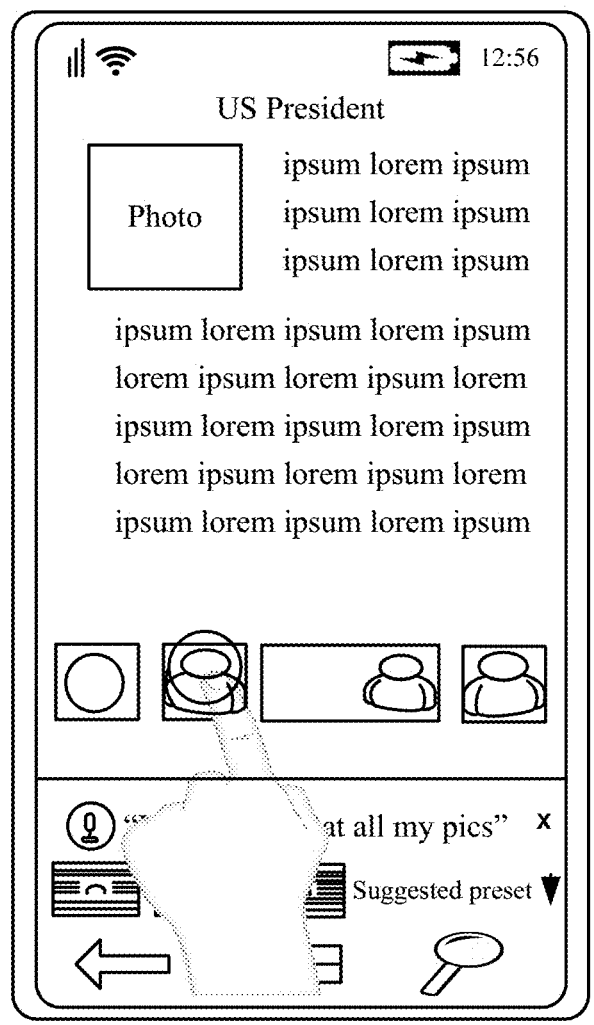
Figure 5V:
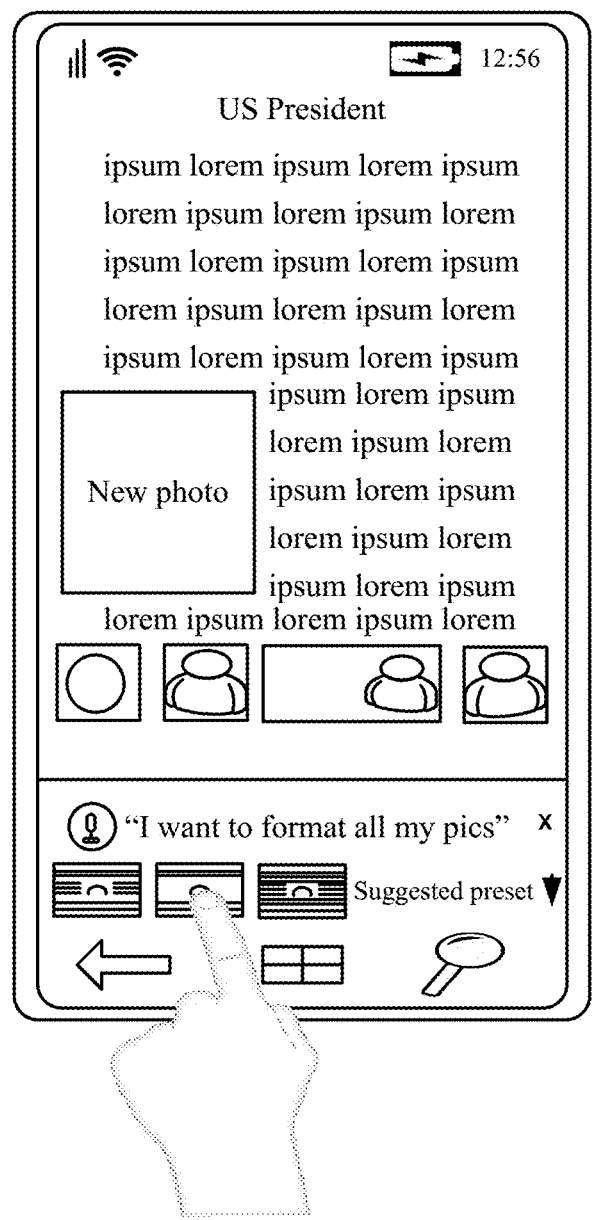

FIGS. 5P-5V show one example of user interactions where the user is selecting different items within a document. Selecting items on a relatively small screen device can be very cumbersome. The user often inadvertently selects the wrong items, or inadvertently selects multiple items when only one is intended. In addition, the user often has to scroll through long documents selecting various items of the same type. FIG. 5P shows that the user is simply viewing a document that has pictures in it. The user actuates a user input mechanism 535 that indicates to the system that the user is about to provide a voice command. FIG. 5Q shows that the user has provided a voice command "I want to format all my pictures". FIG. 5R shows that the system is now displaying the textual representation of that input. FIG. 5S shows that select component 194 has received the result 146 indicating that an intent is that the user wishes to select all of the pictures in the opened document, and format them. Thus, select component 194 automatically locates and selects all of the pictures in the displayed document. Command identifier component 198 also identifies a subset of commands that have to do with formatting pictures and displays display elements corresponding to them. FIG. 5S shows that the user is tapping one of those display elements. The same is shown in FIG. 5T. FIG. 5U shows that the user has selected a different picture to be substituted for the selected pictures, and FIG. 5V shows that the newly selected picture has been inserted.

Figure 6A:
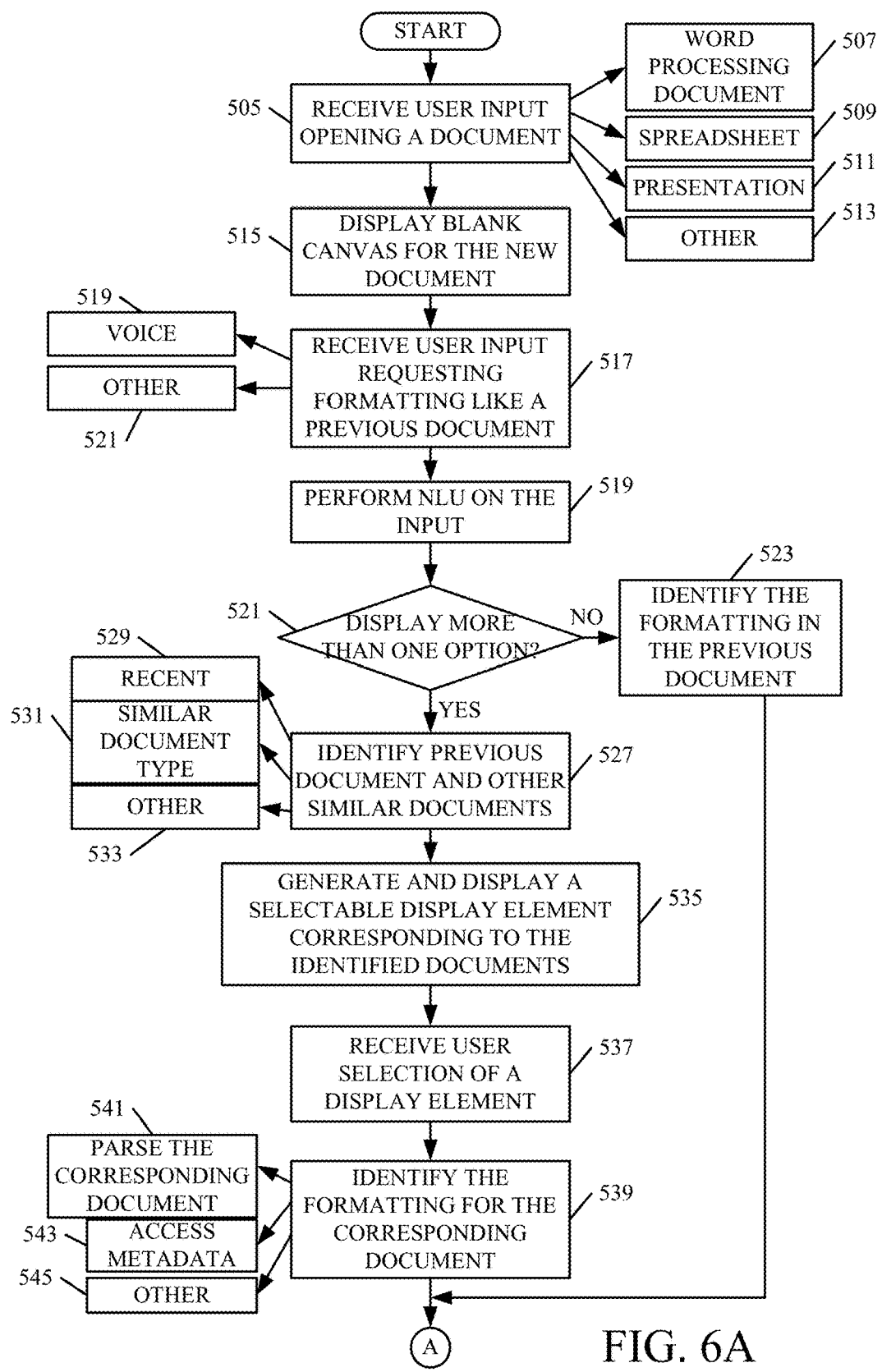
FIGS. 6A-6B (collectively referred to herein as FIG. 6) show a flow diagram illustrating one example of the operation of the architecture shown in FIG. 1 in performing a quick start process.
Figure 6B:
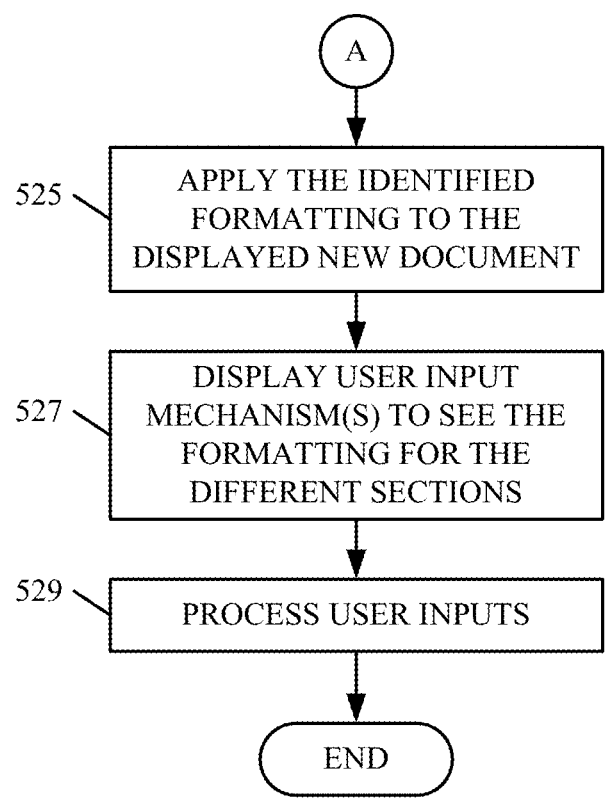
Figure 6C:
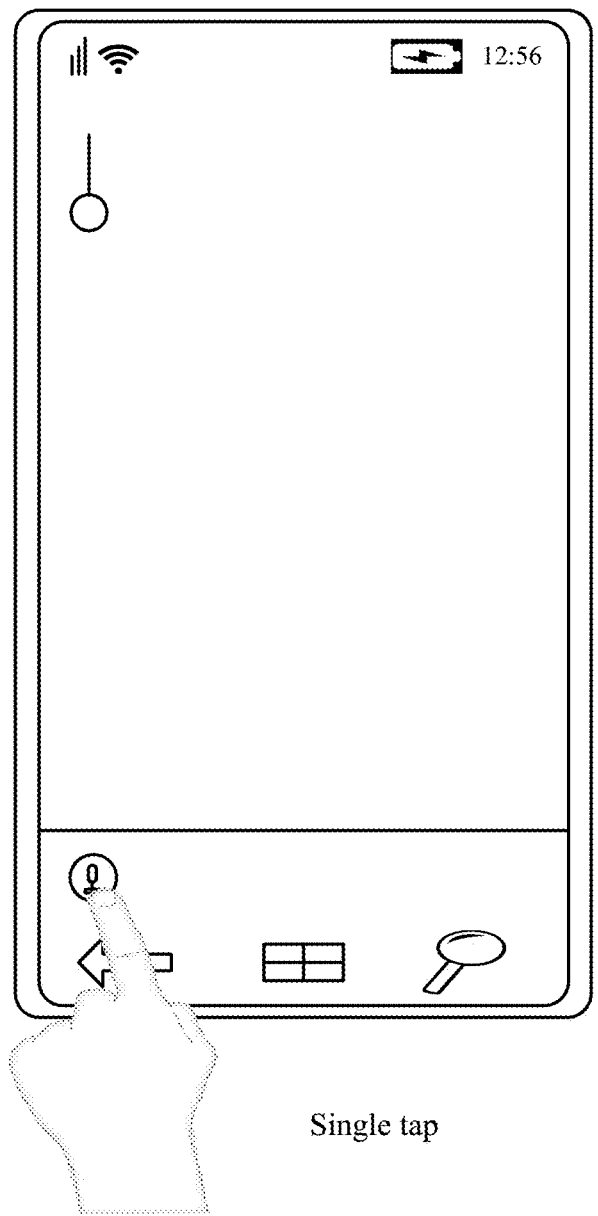
FIGS. 6C-6H show various examples of user interface displays.

FIGS. 6A and 6B (collectively referred to herein as FIG. 6) show a flow diagram illustrating one example of the operation of quick start component 202 in allowing a user to quickly begin authoring a document. It is believed that some users have a difficult time in beginning to author a document, in that they are unsure of how to set up the formatting, etc. Thus, component 202 assists the user in doing this. It first receives a user input opening a new document. This is indicated by block 505. Again, the document can be a word processing document 507, a spreadsheet document 509, a presentation document 511, or a wide variety of other documents 513.

The action generator 120 uses launch/display component 182 to launch the relevant application and to display a blank canvas for the document. This is indicated by block 515. Action generator 118 then receives a user input requesting formatting that is similar to a previous document. This is indicated by block 517. Again, this can be a voice command 519, or another natural language command 521. The system then performs natural language understanding on the input to identify a document, identify its formatting, and apply that formatting to the present document.

Performing natural language understanding on the input is indicated by block 519. In one example, quick start component 202 displays a plurality of different, relevant documents and allow the user to select the particular document from which the formatting is to be identified and applied to the new document. Determining whether the user is to have more than one option is indicated by block 521. This determination can be made based on user preferences, based on administrative set up, or in other ways.

Where the user is not to be presented with a plurality of different options, then the document identified by the user in the user's natural language input is retrieved, and the format settings are identified. This is indicated by block 523. Processing then skips to block 525 where the identified formatting is applied to the displayed, new document.

However, if, at block 521, a plurality of different options are to be provided (or if the natural language processing result is ambiguous and multiple documents are identified) then the system identifies the previous document and other similar documents as indicated by block 527. The documents can be similar because they are recent documents 529, they can be of a similar document type 531, or they can be similar in other ways 533.

For each of the identified documents, quick start component 202 generates and displays a corresponding display element. The display element illustratively identifies the document and displays some content of the document so that the user can have some sense of the formatting that was applied to the underlying document. Generating and displaying a selectable display element corresponding to the identified documents is indicated by block 535.

Component 202 then receives user selection of one of those display elements as indicated by block 537. It identifies the formatting for the corresponding document as indicated by block 539. This can be done by parsing the corresponding document as indicated by block 541, by accessing formatting metadata corresponding to the document as indicated by block 543, or in other ways 545. Then, the identified formatting is applied to the displayed, new document at block 525.

Quick start component 202 can also display a user input mechanism that can be actuated by the user to allow the user to see the particular formatting that has been applied. When this happens, component 202 exposes the formatting information on the new, displayed document, so the user can see how it is formatted. This is indicated by block 527. The system then goes on to process other user inputs, such as further formatting inputs, authoring inputs, or other inputs. This is indicated by block 529.

Figure 6D:
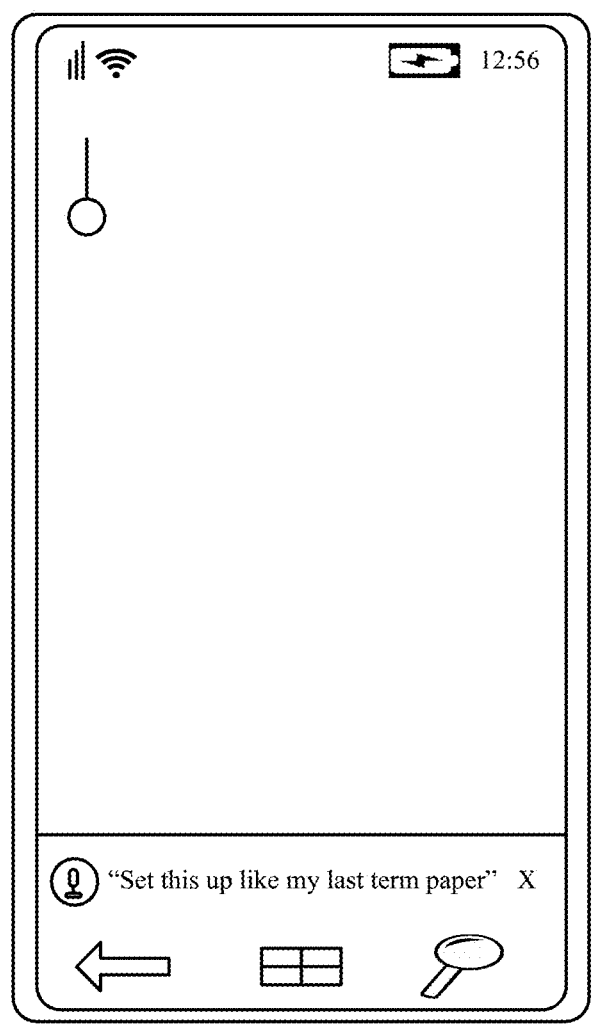

FIGS. 6C-6H show various examples of this. It can be seen in FIG. 6C that the user has opened a document and the corresponding application has displayed a blank canvas. The user then actuates a user input mechanism so that the user can provide a voice command. In FIG. 6D, the user has provided the voice command "set this up like my last term paper". Linguistic processing system 104 generates the textual representation and the natural language understanding for that utterance. The intent is to find the user's last term paper, extract the formatting from that paper and apply it to the newly opened document.

Figure 6E:
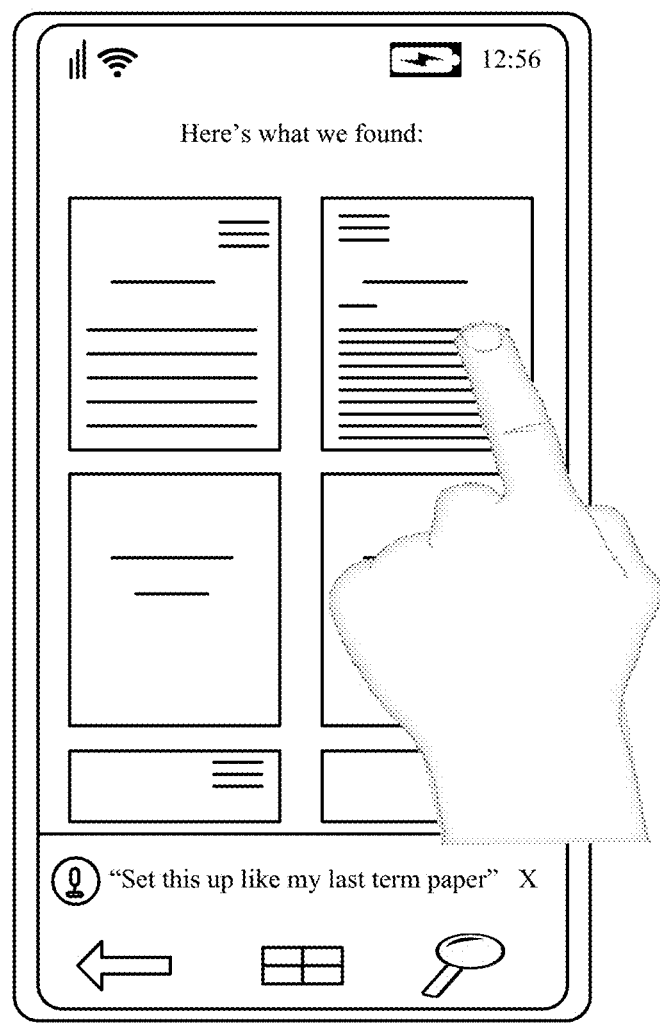
Figure 6F:
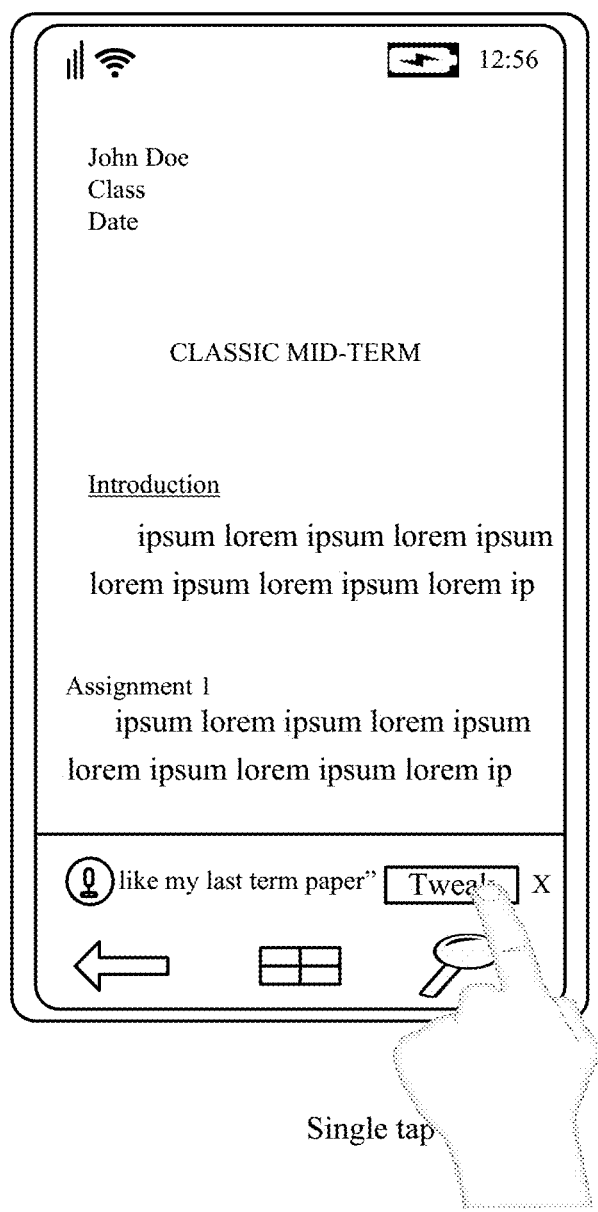
Figure 6G:
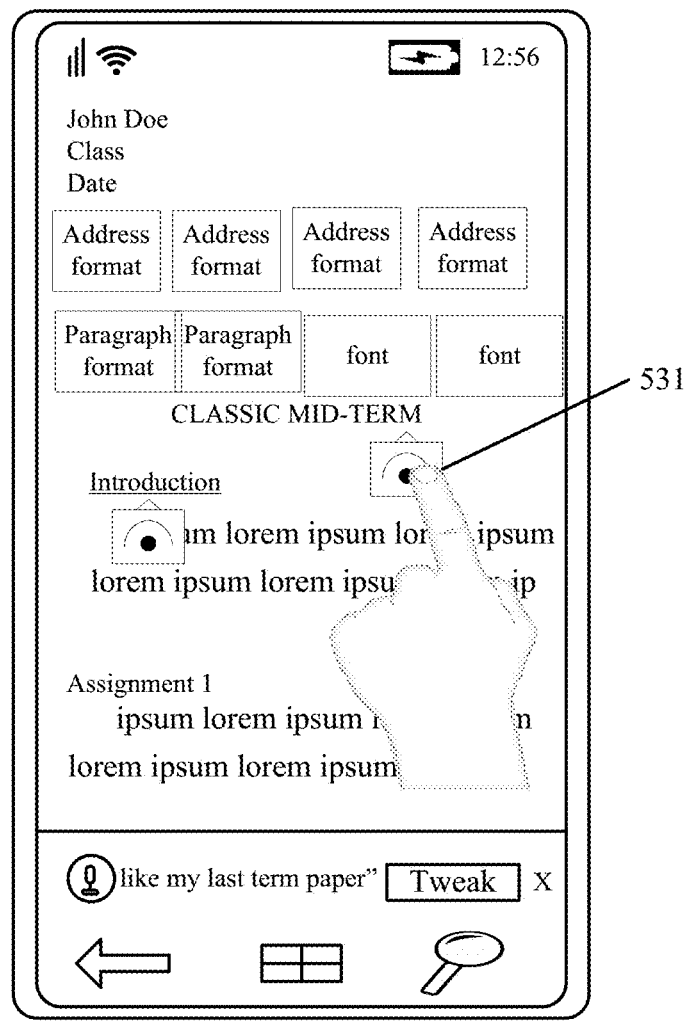
Figure 6H:
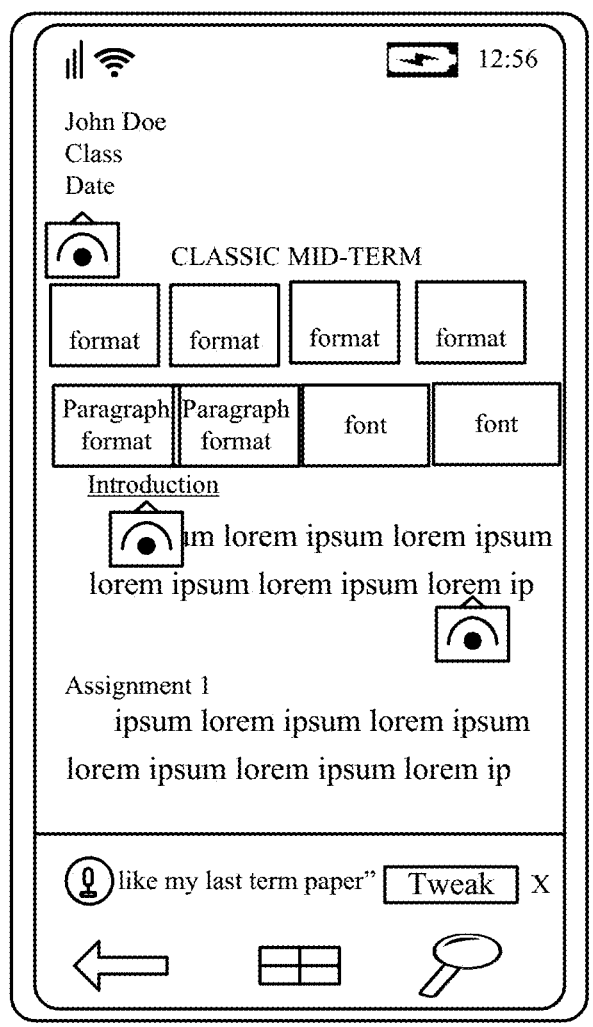

FIG. 6E shows that action generator 118 has used search system 116 to identify a plurality of relevant documents that correspond to the user's query. It displays a display element (such as a thumbnail or other display element) corresponding to each of the relevant documents. FIG. 6E shows that the user is selecting one of them. FIG. 6F shows that the user is providing a user input to apply that formatting to the newly opened document. FIG. 6G shows a user input mechanism 531 that can be actuated by the user to see the formatting of the different sections of the document. When the user actuates user input mechanism 531, the formatting information is displayed. FIG. 6H shows that a plurality of different sections can be displayed separately, with their own format information.

Figure 7:
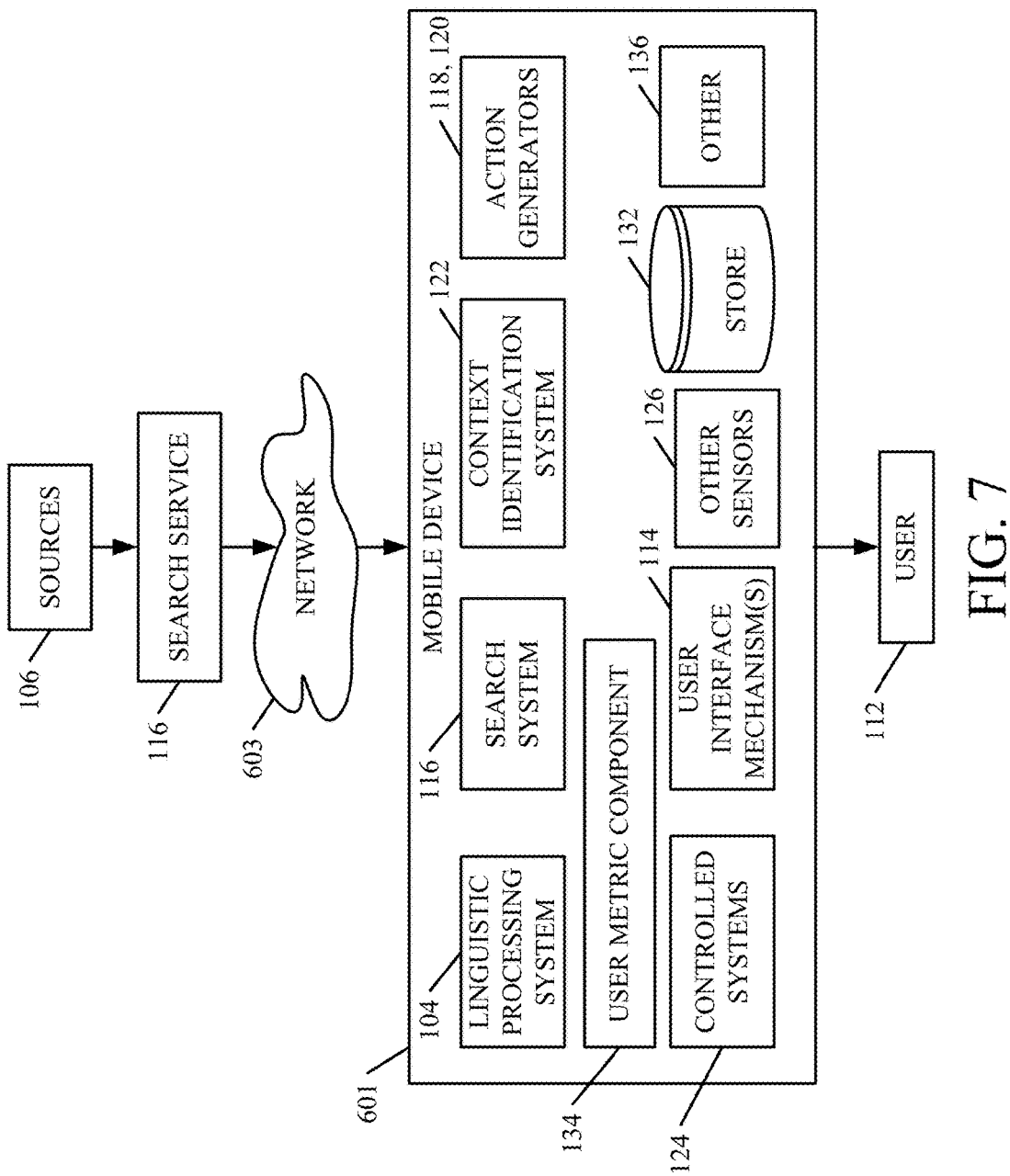
FIG. 7 is block diagram of one example showing some portions of the architecture shown in FIG. 1 in a remote server environment.
Figure 8:
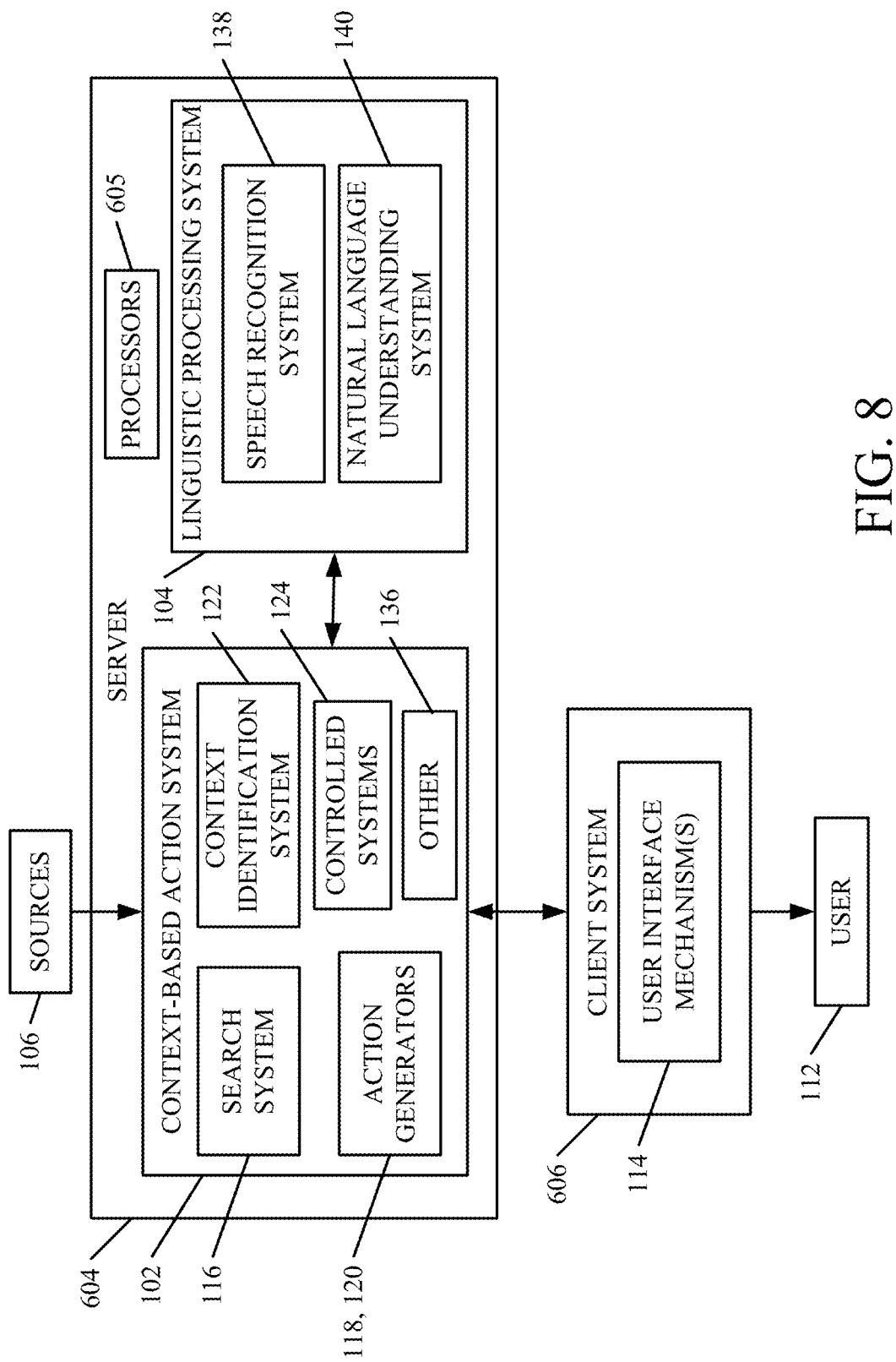
FIG. 8 is a block diagram showing some portions of the architecture illustrated in FIG. 1 in a client/server environment.
Figure 9:
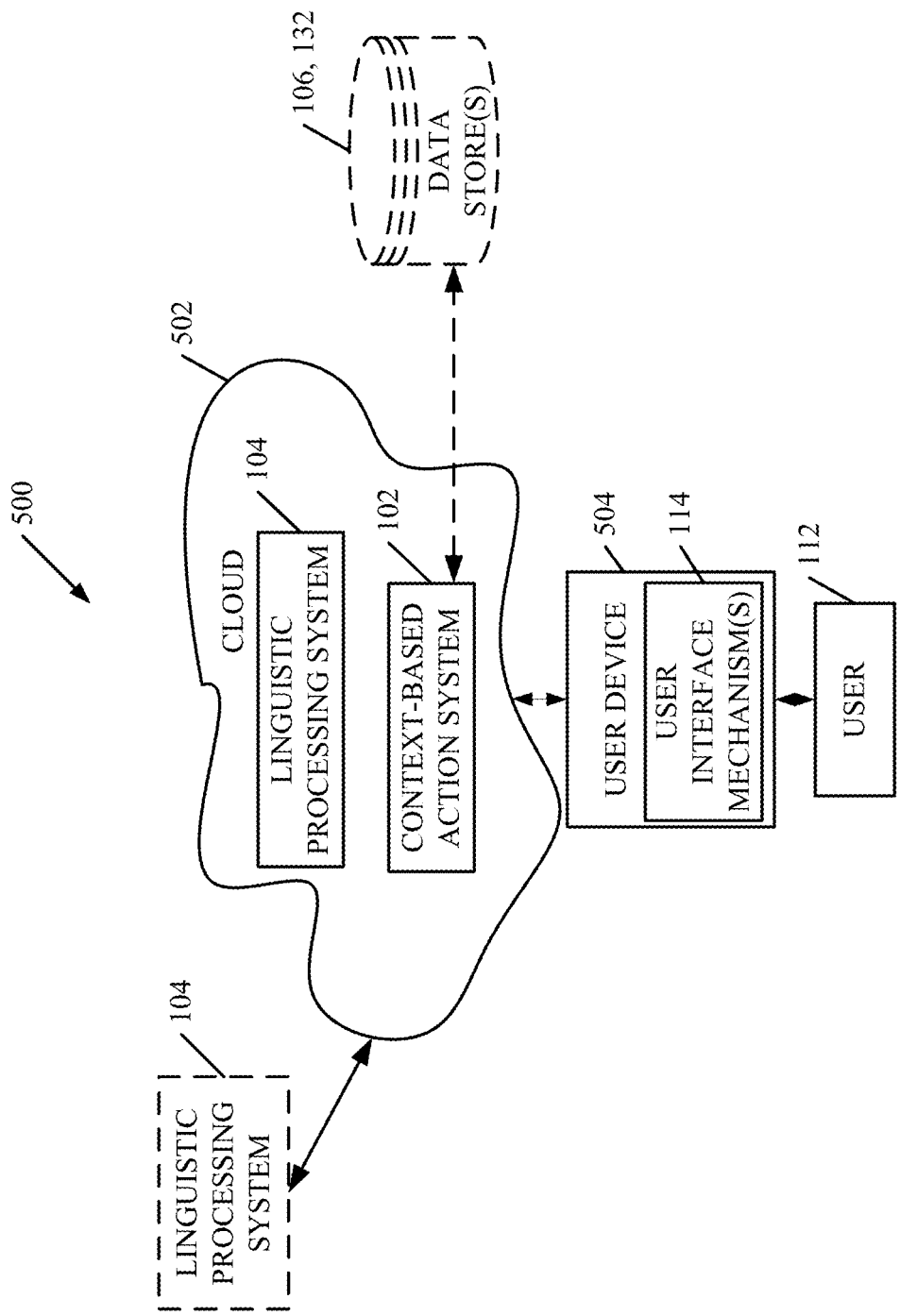
FIG. 9 is a block diagram showing one example of portions of the architecture illustrated in FIG. 1, disposed in a cloud computing architecture.

FIGS. 7-9 show various examples indicating that the components or items in the architecture 100 shown in FIG. 1 can be located in different places. FIG. 7 shows that a variety of the different items are located on a mobile device 601 that is connected to a search service that implements search system 116 over a network 603. Network 603 can be a local area network, a wide area network, a cellular network, a near field communication network, or a wide variety of other networks.

FIG. 8 shows that the items are disposed in a client/server architecture with context-based action system 102 deployed on a server 604, along with linguistic processing system 104. User 112 accesses system 102 on server 604 through a client device 606 that generates the user interface mechanisms 114 for interaction by user 112.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actu- atable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

FIG. 9 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 9, some items are similar to those shown in FIG. 1 and they are similarly numbered. FIG. 9 specifically shows that various items in FIG. 1 can be located in cloud 502 (which can be public, private, or a combination where portions are public while others are private). Therefore, user 112 uses a user device 504 to access those items through cloud 502.

FIG. 9 also depicts another embodiment of a cloud architecture. FIG. 9 shows that it is also contemplated that some elements of architecture 100 can be disposed in cloud 502 while others are not. By way of example, data store 132 and sources 106 can be disposed outside of cloud 502, and accessed through cloud 502. In another example, system 102 or search system 116 or other portions can also be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
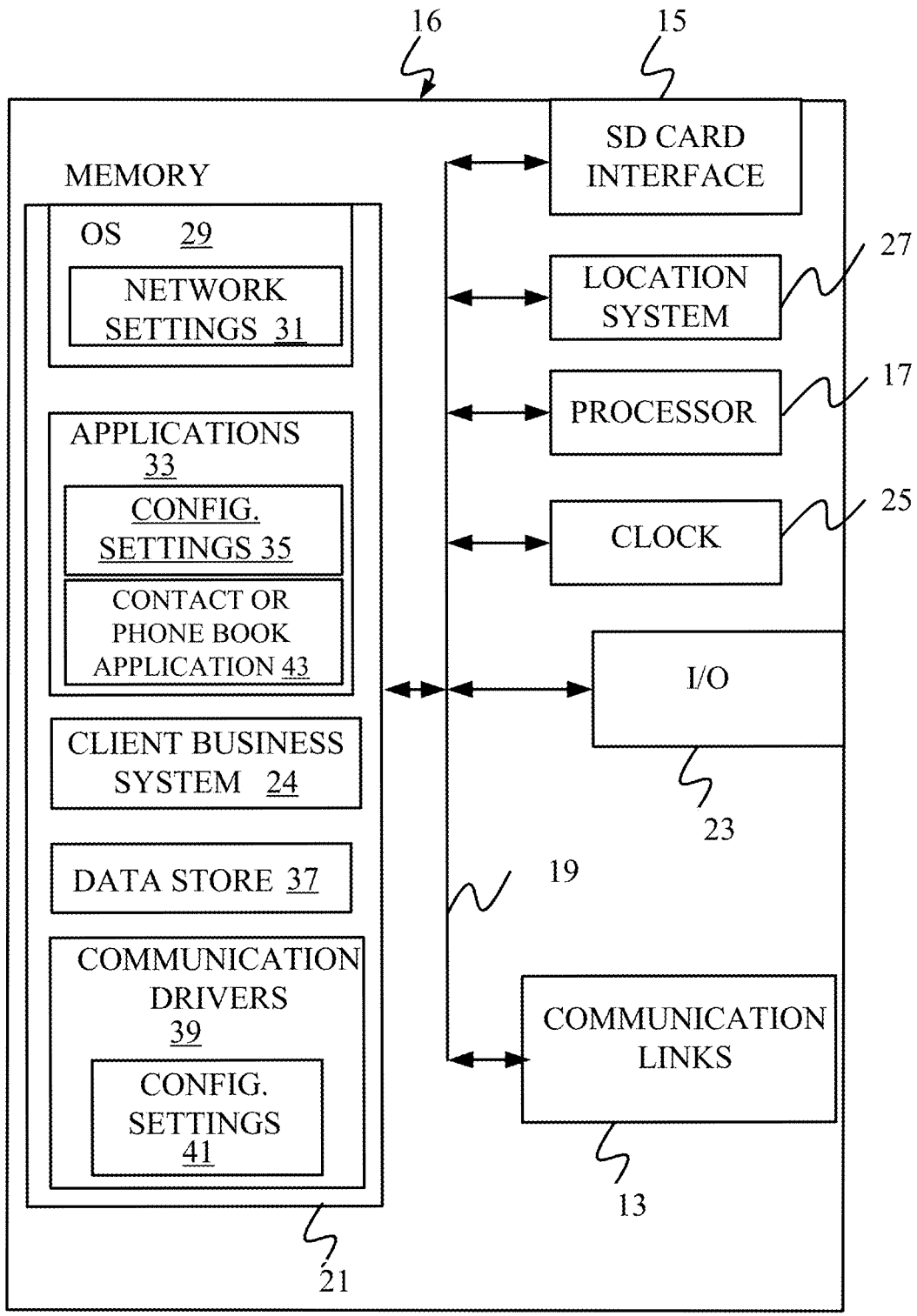
FIGS. 10-12 show various examples of mobile devices.
Figure 11:
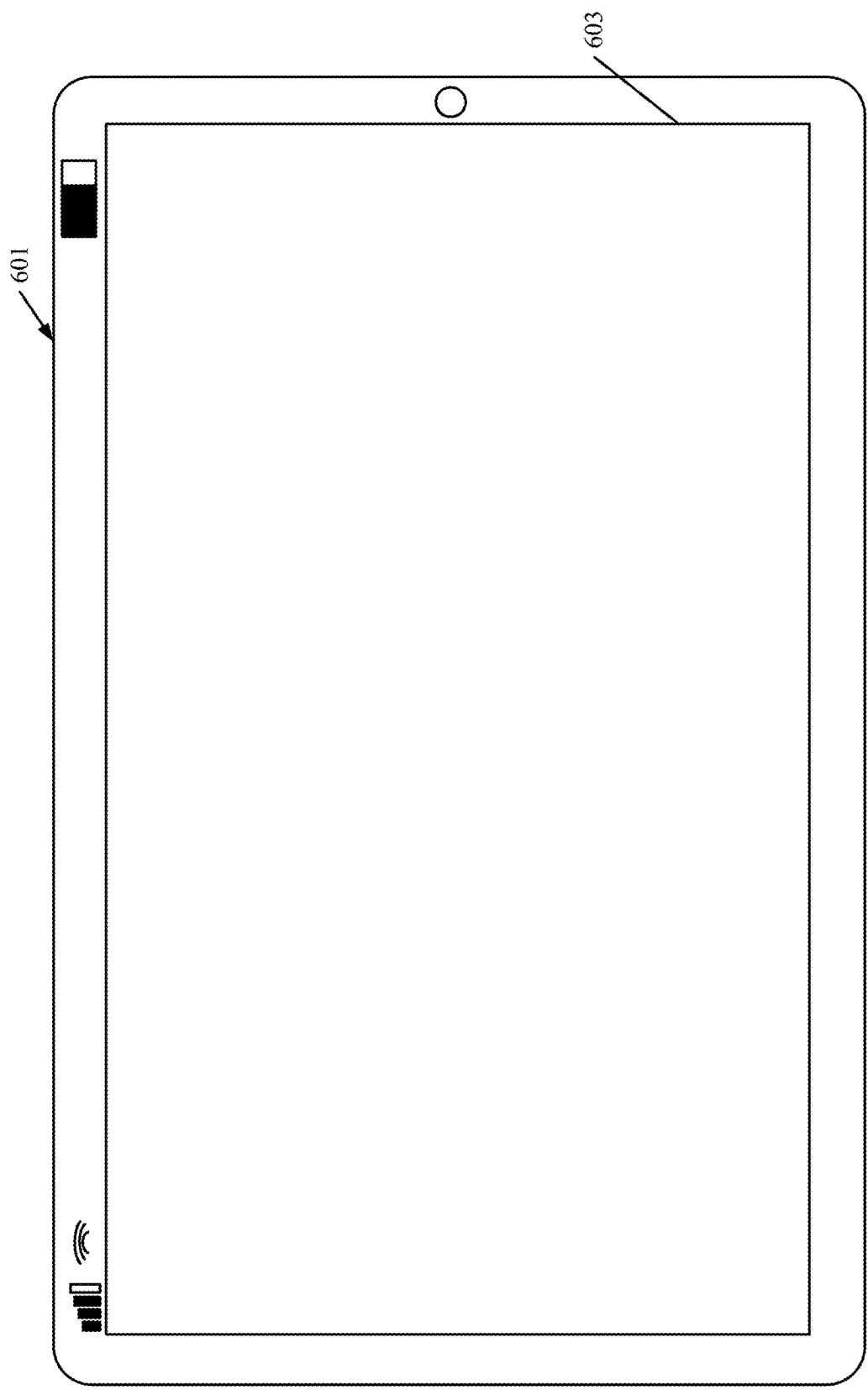
Figure 12:
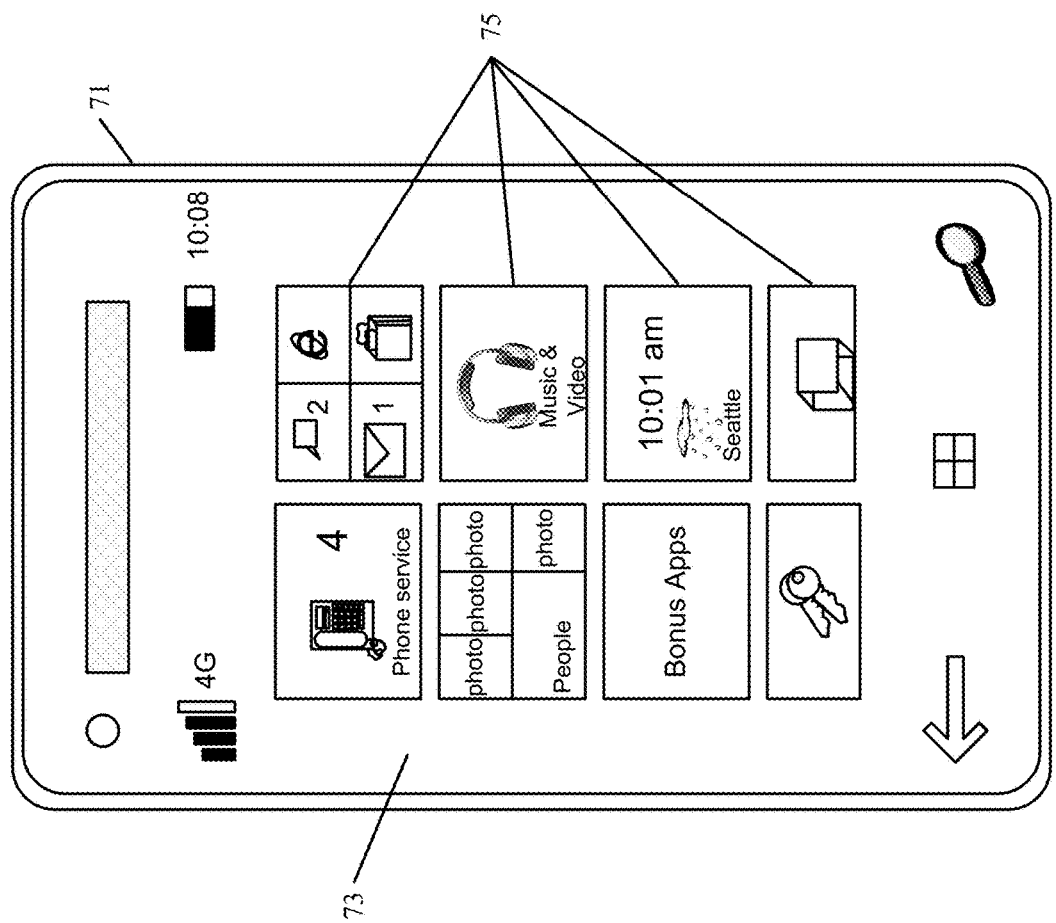

FIG. 10 is a simplified block diagram of one illustrative embodiment of a handheld or mobile computing device that can be used as a user's or client's hand held device 16, in which the present system (or parts of it) can be deployed. FIGS. 11-12 are examples of handheld or mobile devices.

FIG. 10 provides a general block diagram of the components of a client device 16 that can run components of architecture 100 or that interacts with architecture 100, or both. Not all elements of FIG. 1 are shown in device 16 although it is contemplated that they could be disposed on device 16 in the illustrated components, or added to them. In the device 16, a communications link 13 is provided that allows the handheld device to communicate with other computing devices and under some examples provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

Under other examples, applications or systems are received on a removable Secure Digital (SD) card that is connected to a SD card interface 15. SD card interface 15 and communication links 13 communicate with a processor 17 (which can also embody processor 128 or other processors from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Application 154 or the items in data store 156, for example, can reside in memory 21. Similarly, device 16 can have a client business system 24 which can run various business applications or embody parts or all of tenant 104. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 11 shows one example in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be a feature phone, smart phone or mobile phone. The phone includes a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1×rtt, and Short Message Service (SMS) signals. In some examples, the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 12 also shows that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
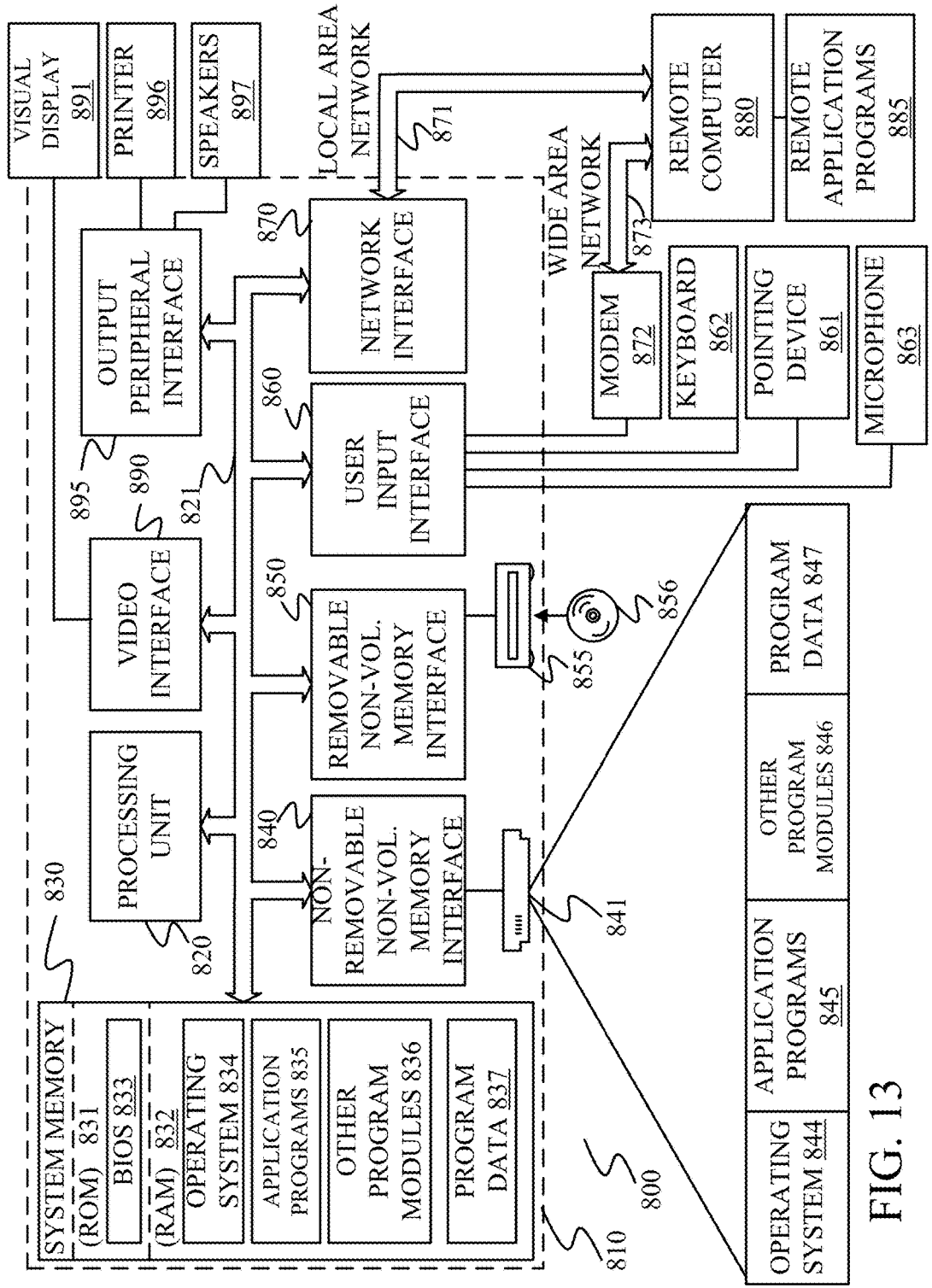
FIG. 13 is a block diagram of one example of a computing system that can be used in the various architectures in the previous figures.

FIG. 13 is one embodiment of a computing environment in which architecture 100, or parts of it, (for example) can be deployed. With reference to FIG. 13, an exemplary system for implementing some embodiments includes a general-purpose computing device in the form of a computer 810. Components of computer 810 may include, but are not limited to, a processing unit 820 (which can comprise processor 128 or those in device 504 or other devices), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during startup, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 13 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 13 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
a user interface mechanism;
a context detector that detects a context of an open application on a mobile device;
a command set identifier configured to identify a set of possible commands in the application, given the detected context; and
a command analysis component that categorizes the possible commands in the set and controls the user interface mechanism to surface a category of the possible commands for user interaction.

Example 2 is the computing system of any or all previous examples wherein user interface mechanism comprises:
a touch sensitive display device on the mobile device, and wherein the command analysis component surfaces the category of the possible commands for touch interaction on the touch sensitive display device on the mobile device.

Example 3 is the computing system of any or all previous examples and further comprising:
a natural language user input mechanism that receives a natural language user input and obtains a command intent based on the natural language user input, the command set identifier identifying the set of possible commands based on the command intent.

Example 4 is the computing system of any or all previous examples wherein the context detector detects, as the context, items currently displayed by the open application on the user interface mechanism.

Example 5 is the computing system of any or all previous examples wherein the context detector detects, as the context, a location of the user, in the application.

Example 6 is the computing system of any or all previous examples wherein the command analysis component is configured to categorize the possible commands into categories according to a dependency structure.

Example 7 is the computing system of any or all previous examples wherein the command analysis component is configured to control the user interface mechanism to surface the categories according to the dependency structure.

Example 8 is the computing system of any or all previous examples wherein the command analysis component is configured to categorize the possible commands in the set into a verb category, a subject category, and an action category.

Example 9 is the computing system of any or all previous examples wherein the user interface mechanism surfaces the category for user interaction by surfacing a user actuatable element associated with each command in the category and further comprising:
an action generator that detects user actuation of a given user actuatable element and performs the associated command.

Example 10 is a mobile device, comprising:
a user interface mechanism;
a context detector that detects a context of an open application on a mobile device;
a command set identifier configured to identify a set of possible commands in the application, given the detected context; and
a command analysis component that categorizes the possible commands in the set into a verb category, a subject category, and an action category and controls the user interface mechanism to surface a category of the possible commands for user interaction.

Example 11 is the mobile device of any or all previous examples wherein user interface mechanism comprises:
a touch sensitive display device on the mobile device, and wherein the command analysis component surfaces the category of the possible commands for touch interaction on the touch sensitive display device on the mobile device.

Example 12 is the mobile device of any or all previous examples and further comprising:
a natural language user input mechanism that receives a natural language user input and obtains a command intent based on the natural language user input, the command set identifier identifying the set of possible commands based on the command intent.

Example 13 is the mobile device of any or all previous examples wherein the context detector detects, as the context, items currently displayed by the open application on the user interface mechanism and a location of the user in the application.

Example 14 is the mobile device of any or all previous examples wherein the command analysis component is configured to categorize the possible commands into categories according to a dependency structure and to control the user interface mechanism to surface the categories according to the dependency structure.

Example 15 is the mobile device of any or all previous examples wherein the user interface mechanism surfaces the category for user interaction by surfacing a user actuatable element associated with each command in the category and further comprising:

an action generator that detects user actuation of a given user actuatable element and performs the associated command.

Example 16 is a computer implemented method, implemented on a mobile device, the computer implemented method comprising:

detecting a context of an open application on the mobile device;

identifying a set of possible commands in the application, given the detected context;

categorizing the possible commands in the set into categories; and controlling a user interface mechanism to surface a category of the possible commands for user interaction.

Example 17 is the computer implemented method of any or all previous examples wherein detecting a context comprises:

detecting items currently displayed by the open application on the user interface mechanism and detecting a location of the user in the application.

Example 18 is the computer implemented method of any or all previous examples categorizing the possible commands comprises:

categorizing the possible commands into categories according to a dependency structure and wherein controlling the user interface mechanism comprises controlling the user interface mechanism to surface the categories according to the dependency structure.

Example 18 is the computer implemented method of any or all previous examples wherein the user interface mechanism surfaces the category for user interaction by surfacing a user actuatable element associated with each command in the category, and further comprising:

detecting user actuation of a given user actuatable element; and performing the associated command.

Example 20 is the computer implemented method of any or all previous examples wherein detecting user actuation comprises:

detecting a user touch gesture on the given user actuatable element.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
at least one processor; and
memory storing instructions executable by the at least one processor, wherein the instructions, when executed, configure the computing system to provide:
a user interface component configured to generate a user interface display for an open application associated with the computing system, the user interface display including a user interface mechanism configured to receive user input that manipulates content in the application;
a context detector configured to detect a content-independent context of the application, the content-independent context being independent of the content in the application;
a command set identifier configured to identify a set of possible commands in the application, based at least in part on the content-independent context; and
a command analysis component configured to:
categorize the possible commands into a set of command categories, each command category including a subset of the possible commands;
select a command category from the set of command categories;
based on the selection, control the user interface component to generate a user actuatable element, in the user interface display, that represents each command in the selected command category and is configured for user interaction; and
an action generator configured to:
receive an indication of user actuation of a particular one of the user actuatable elements; and
perform the command associated with the particular user actuatable element.

2. The computing system of claim 1 wherein the command analysis component is configured to control the user interface component to surface the selected command category for touch interaction on a touch sensitive display device associated with the computing system.

3. The computing system of claim 1, wherein the instructions, when executed, configure the computing system to provide:
a natural language user input mechanism configured to receive an indication of a natural language user input and obtain a command intent based on the natural language user input, the command set identifier identifying the set of possible commands based on the command intent.

4. The computing system of claim 1 wherein the set of possible commands is identified based on both the content-independent context and a content-dependent context that is based on the content.

5. The computing system of claim 4 wherein the content-dependent context is indicative of a location of a user, in the application.

6. The computing system of claim 4, wherein the content-dependent context is based on items currently displayed by the application.

7. The computing system of claim 1 wherein the command analysis component is configured to categorize the possible commands into a verb category, a subject category, and an action category.

8. The computing system of claim 1, wherein the content-independent context is based on at least one of:
determining whether a user is using the application in a work context or a non-work context;
detecting a usage pattern indicative of a pattern of usage of the application, by the user, over time; or
detecting a type of user device being used by the user.

9. The computing system of claim 1 wherein the command analysis component is configured to:
prior to the command being performed, determine whether to display another one of the command categories, and if so, identify the other command category based on a dependency structure and control the user interface mechanism to surface a user actuatable element that represents each command in the other command category.

10. A computing device, comprising:
a user interface mechanism:
a context detector configured to detect a context of an open application on;
a command set identifier configured to identify a set of possible commands in the application, based on the detected context; and a command analysis component configured to:
   categorize the possible commands in the set into a set of command categories including a verb category, a subject category, and an action category, each command category including a subset of the set of possible commands;
   select a command category from the set of command categories; and
   based on the selection, control the user interface mechanism to surface a user actuatable element that represents each command in the selected command category and is configured for user interaction;
an action generator configured to:
   receive an indication of user actuation of a particular one of the user actuatable elements; and
   perform the command associated with the particular user actuatable element using a processor of the mobile device.

11. The computing device of claim 10 wherein the context is based on a usage history of the application by a particular user.

12. The computing device of claim 10 wherein the context is indicative of a usage mode being used by the user.

13. The computing device of claim 10 wherein the context detector is configured to detect, as the context, items currently displayed by the application on the user interface mechanism and a location of the user in the application.

14. The computing device of claim 13 wherein the command analysis component is configured to categorize the possible commands into categories according to a dependency structure and to control the user interface mechanism to surface the categories according to the dependency structure.

15. The computing device of claim 14 wherein the command analysis component is configured to:
   prior to the command being performed,
      determine whether to display another one of the command categories, and
      if so, identify the other command category based on the dependency structure and control the user interface mechanism to surface a user actuatable element that represents each command in the other command category.

16. A method performed by a computing device, the method comprising:
   generating a user interface display for an open application associated with the computing device, the user interface display including a user interface mechanism configured to receive user input that manipulates content in the open application;
   detecting a content-independent context of the application on the computing device, the content-independent context being independent of the content in the application;
   identifying a set of possible commands in the application, based at least in part on the content-independent context;
   categorizing the possible commands into a set of command categories, each command category including one or more of the possible commands;
   selecting a command category from the set of command categories;
   based on the selection, generating a user actuatable element that represents each command in the selected command category and is configured for user interaction;
   receiving an indication of user actuation of a particular one of the user actuatable elements; and
   performing the command associated with the particular user actuatable element.

17. The computer implemented method of claim 16 wherein detecting a context comprises:
   detecting items currently displayed by the open application on the user interface mechanism and detecting a location of the user in the application.

18. The computer implemented method of claim 16 categorizing the possible commands comprises:
   categorizing the possible commands into categories according to a dependency structure and wherein controlling the user interface mechanism comprises controlling the user interface mechanism to surface the categories according to the dependency structure.

19. The computer implemented method of claim 18, and further comprising:
   prior to the command being performed,
      determining whether to display another one of the command categories, and
      if so, identifying the other command category based on the dependency structure and controlling the user interface mechanism to surface a user actuatable element that represents each command in the other command category.

20. The computer implemented method of claim 16 wherein receiving an indication of user actuation comprises:
   receiving an indication of a user touch gesture on the particular user actuatable element.

* * * * *